United States Patent
Nomura et al.

(10) Patent No.: US 9,355,317 B2
(45) Date of Patent: May 31, 2016

(54) VIDEO PROCESSING SYSTEM, VIDEO PROCESSING METHOD, VIDEO PROCESSING DEVICE FOR MOBILE TERMINAL OR SERVER AND CONTROL METHOD AND CONTROL PROGRAM THEREOF

(71) Applicants: Toshiyuki Nomura, Tokyo (JP); Akio Yamada, Tokyo (JP); Kota Iwamoto, Tokyo (JP); Ryota Mase, Tokyo (JP)

(72) Inventors: Toshiyuki Nomura, Tokyo (JP); Akio Yamada, Tokyo (JP); Kota Iwamoto, Tokyo (JP); Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 14/362,561

(22) PCT Filed: Dec. 4, 2012

(86) PCT No.: PCT/JP2012/081409
§ 371 (c)(1),
(2) Date: Jun. 3, 2014

(87) PCT Pub. No.: WO2013/088994
PCT Pub. Date: Jun. 20, 2013

(65) Prior Publication Data
US 2014/0376815 A1 Dec. 25, 2014

(30) Foreign Application Priority Data
Dec. 14, 2011 (JP) .................. 2011-273938

(51) Int. Cl.
*G06K 9/46* (2006.01)
*G06K 9/00* (2006.01)
(Continued)

(52) U.S. Cl.
CPC ...... *G06K 9/00744* (2013.01); *G06F 17/30784* (2013.01); *G06K 9/4604* (2013.01); *G06K 9/6232* (2013.01)

(58) Field of Classification Search
None
See application file for complete search history.

(56) References Cited

U.S. PATENT DOCUMENTS 6,711,293 B1  3/2004  Lowe
7,184,593 B2 *  2/2007  Sakamoto ............... G11B 27/28
                                          382/165
(Continued)

FOREIGN PATENT DOCUMENTS

JP  2005-148851 A   6/2005
JP  2006-065399 A   3/2006
(Continued)

OTHER PUBLICATIONS

Fujiyoshi, Hironobu, "Gradient-Based Feature Extraction—Sift and HOG—", IEICE Technical Report, vol. 107, No. 206, pp. 211-224 (Aug. 27, 2007).

(Continued)

*Primary Examiner* — Daniel Mariam
(74) *Attorney, Agent, or Firm* — Wilmer Cutler Pickering Hale and Dorr LLP

(57) ABSTRACT

The present invention is to notify a recognition result with respect to a recognition object in a video in real time while maintaining recognition accuracy. A recognition object and m-number of first local characteristic quantities which are respectively 1-dimensional to i-dimensional characteristic vectors are stored in association with each other, and n-number of second local characteristic quantities which are respectively 1-dimensional to j-dimensional characteristic vectors are generated for n-number of local areas respectively including n-number of characteristic points from an image in a video. In addition, a smaller dimension is selected from the dimension i and the dimension j, a recognition that the recognition object exists in an image in the video is made when it is determined that a prescribed proportion or more of the m-number of first local characteristic quantities which are characteristic vectors up to the selected number of dimensions correspond to the n-number of second local characteristic quantities which are characteristic vectors up to the selected number of dimensions, and information representing the recognition object is displayed in superposition on an image in which the recognition object exists in the video.

22 Claims, 42 Drawing Sheets

(51) Int. Cl.
  *G06F 17/30* (2006.01)
  *G06K 9/62* (2006.01)

(56) References Cited

U.S. PATENT DOCUMENTS

| | | | |
|---|---|---|---|
| 2008/0268876 A1* | 10/2008 | Gelfand | G06Q 30/02 455/457 |
| 2009/0103814 A1 | 4/2009 | Nakamura et al. | |
| 2011/0035406 A1 | 2/2011 | Petrou et al. | |
| 2011/0038512 A1 | 2/2011 | Petrou et al. | |
| 2011/0125735 A1 | 5/2011 | Petrou | |

FOREIGN PATENT DOCUMENTS

| | | |
|---|---|---|
| JP | 2009-104244 A | 5/2009 |
| JP | 2011-008507 A | 1/2011 |
| JP | 2011-198130 A | 10/2011 |
| JP | 2011-210111 A | 10/2011 |
| JP | 2011-221688 A | 11/2011 |
| JP | 2011-242861 A | 12/2011 |
| WO | WO-2011017557 A1 | 2/2011 |
| WO | WO-2011017558 A1 | 2/2011 |
| WO | WO-2011017653 A1 | 2/2011 |

OTHER PUBLICATIONS

Hondo, Takayuki and Kise, Koichi, "Inspection of Memory Reduction Methods for Specific Object Recognition", IPSG SIG Technical Reports, No. 29, pp. 171-176 (Mar. 6, 2009).

Inoue, et al., "Experimental Investigation of a Memory Reduction Method for 3D Object Recognition Based on Selection of Local Features", The IEICE Transactions on Information and Systems (Japanese Edition), vol. J92-D, No. 9, pp. 1686-1689 (Sep. 1, 2009).

International Search Report Issued by the Japanese Patent Office for International Application No. PCT/JP2012/08109 mailed Feb. 5, 2013 (2 pgs.).

Lowe, David G., "Distinctive image features from scale—invariant key points", International Journal of Computer Vision, pp. 91-110 (2004).

* cited by examiner

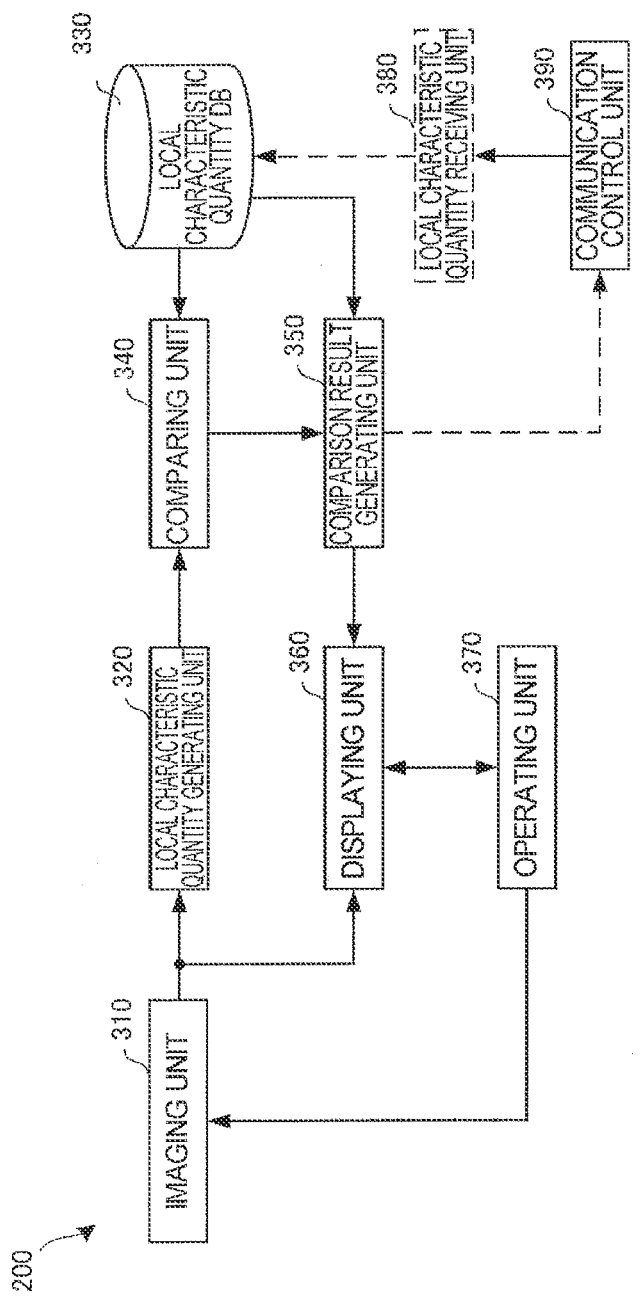

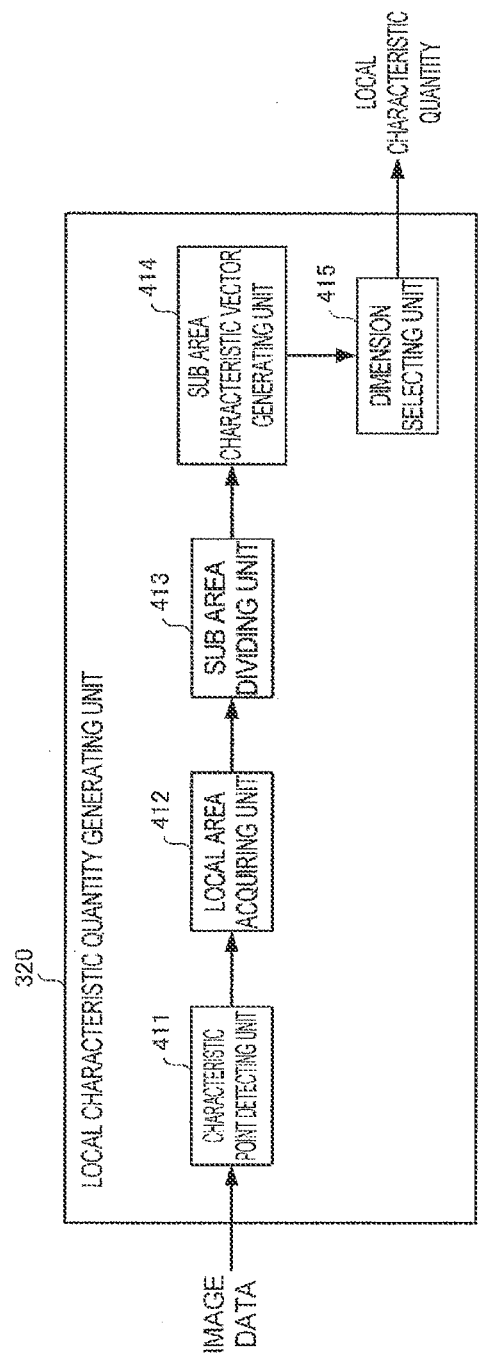

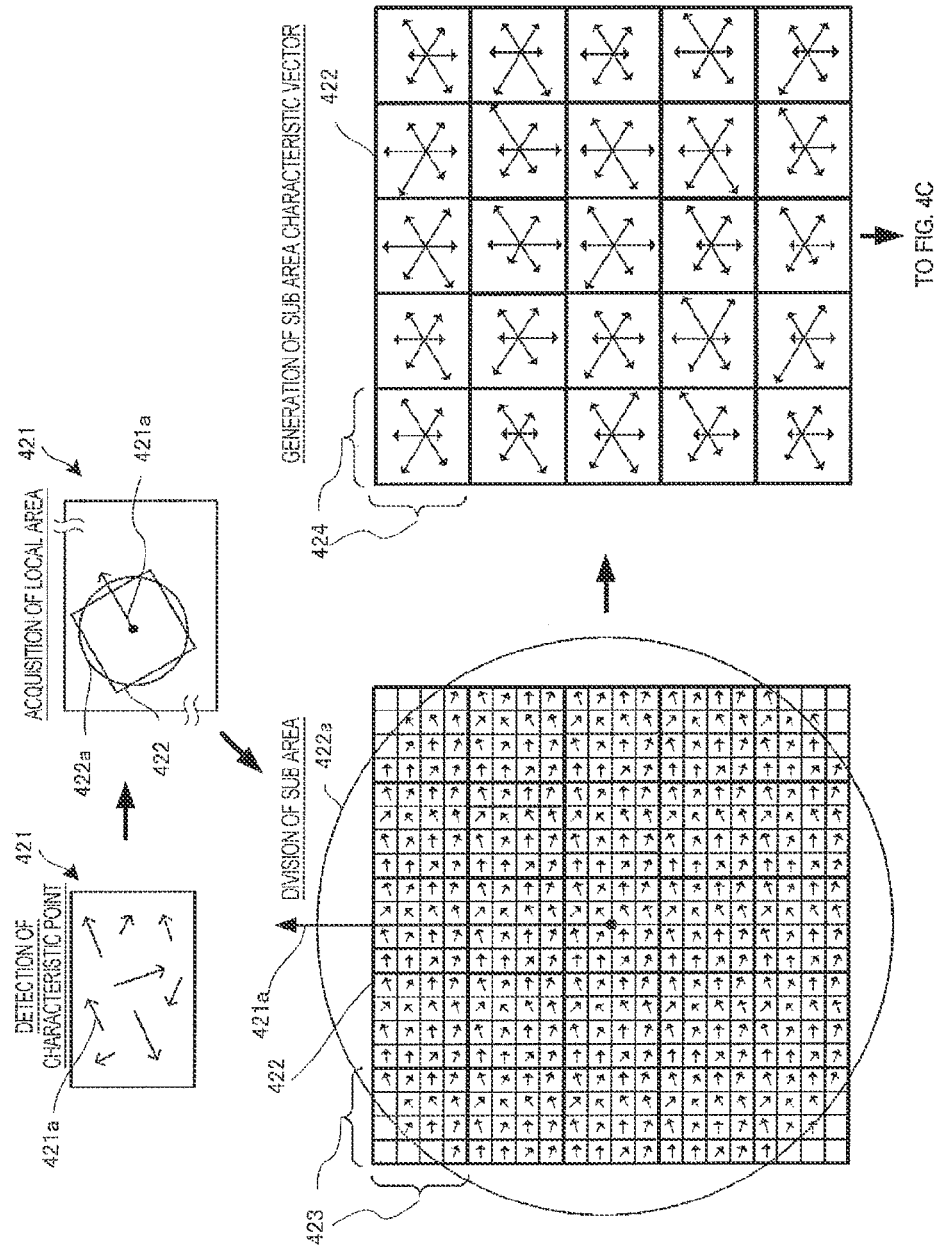

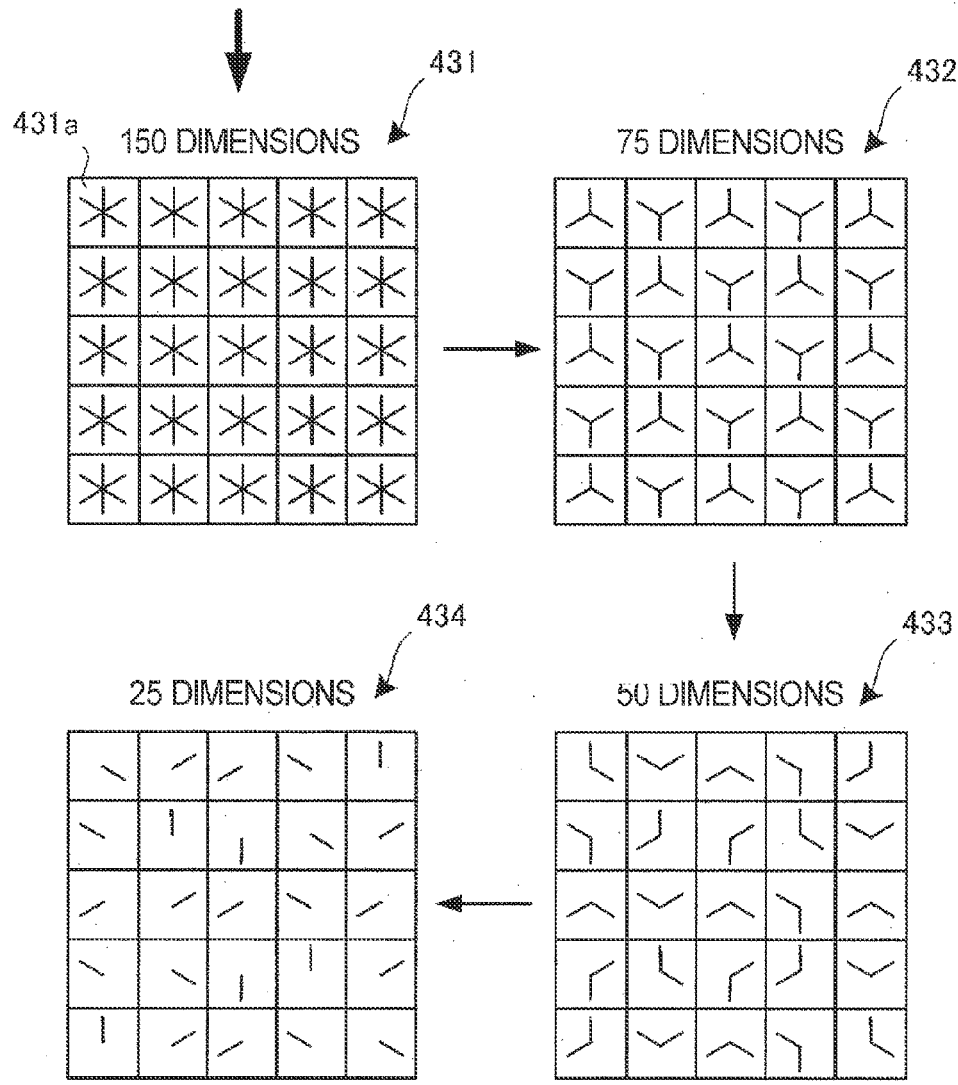

Fig. 4D
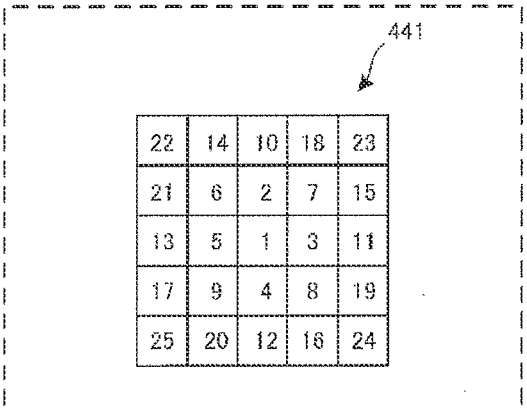
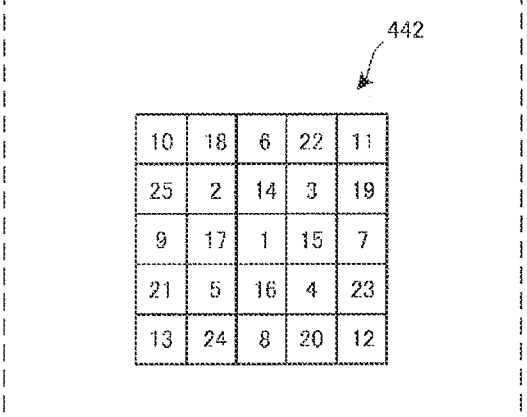
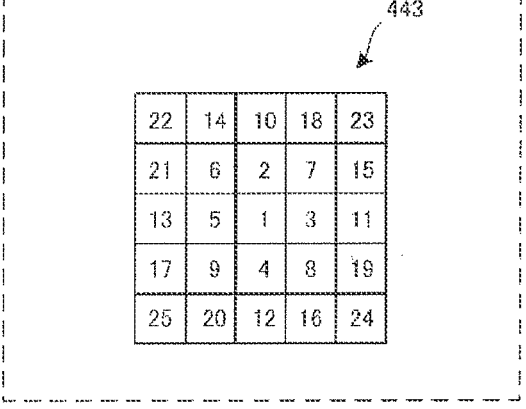

Fig. 4F

| | 471 | 472 | 473 | 474 | 475 | 476 |
|---|---|---|---|---|---|---|
| 25 | 76 45 83 105 67 36 50 108 98 16 88 126 64 7 55 143 95 23 115 127 35 2 24 146 120 |
| 50 | 74 43 81 103 71 40 48 112 96 14 86 134 62 11 59 141 93 21 119 131 33 0 28 144 124 |
| 75 | 72 47 79 107 69 38 52 110 100 12 84 132 60 9 57 139 91 19 117 129 31 4 26 148 122 |
| 100 | 75 46 80 106 66 41 49 113 97 15 87 135 63 6 54 140 92 20 114 126 32 1 29 145 125 |
| 125 | 73 42 82 102 68 39 53 111 101 13 85 133 61 8 56 142 94 22 116 128 34 5 27 149 123 |
| 150 | 77 44 78 104 70 37 51 109 99 17 89 137 65 10 58 138 90 18 118 130 30 3 25 147 121 |

461 ↗

25 DIMENSIONS

Fig. 12

| RECOGNITION OBJECT ID | RECOGNITION OBJECT NAME | RELATED DISPLAY DATA | RELATED AUDIO DATA | ... |
|---|---|---|---|---|
| 00001 | BLACK CICADA | | | |
| ... | | | | |
| 01001 | SUNFLOWER | | | |
| ... | | | | |
| 10001 | ABC TREE | | | |
| ... | | | | |

1201  1202  1203  1204

1110

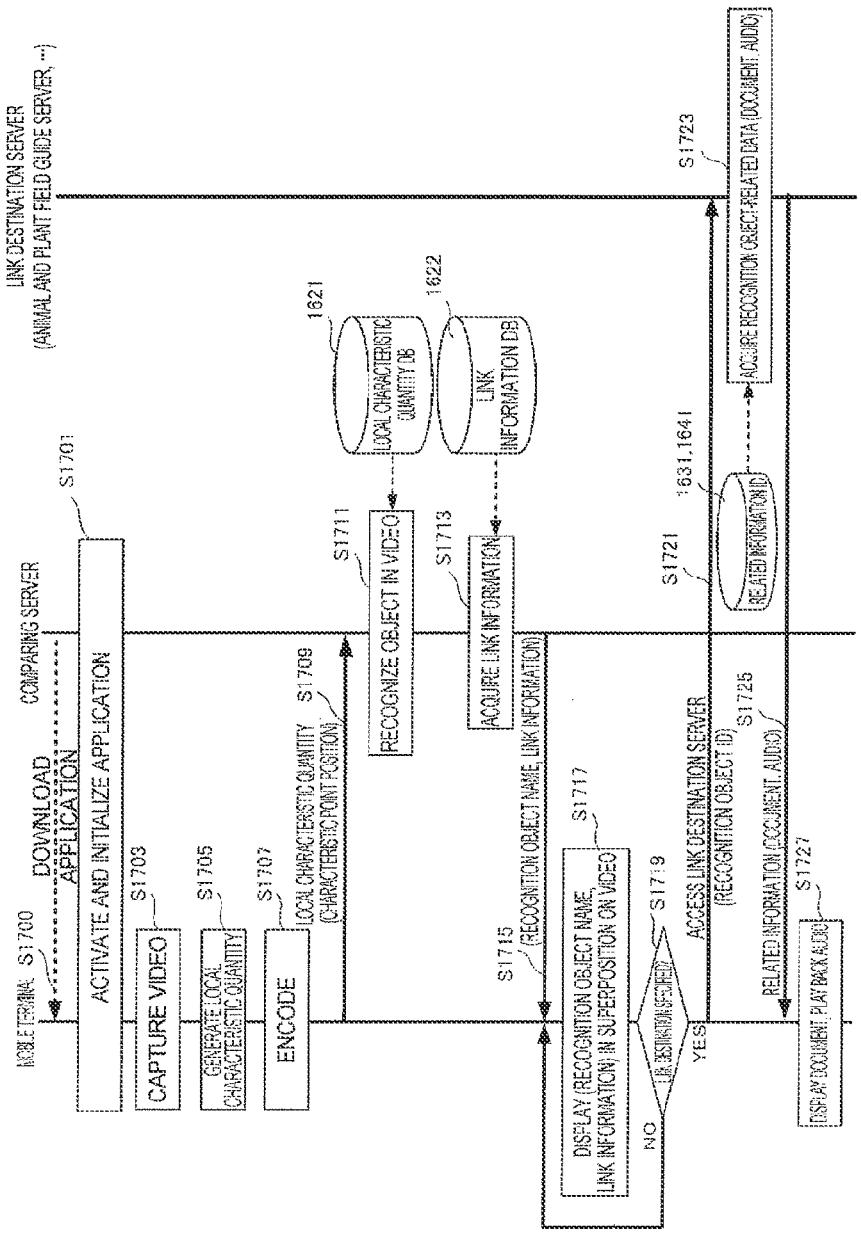

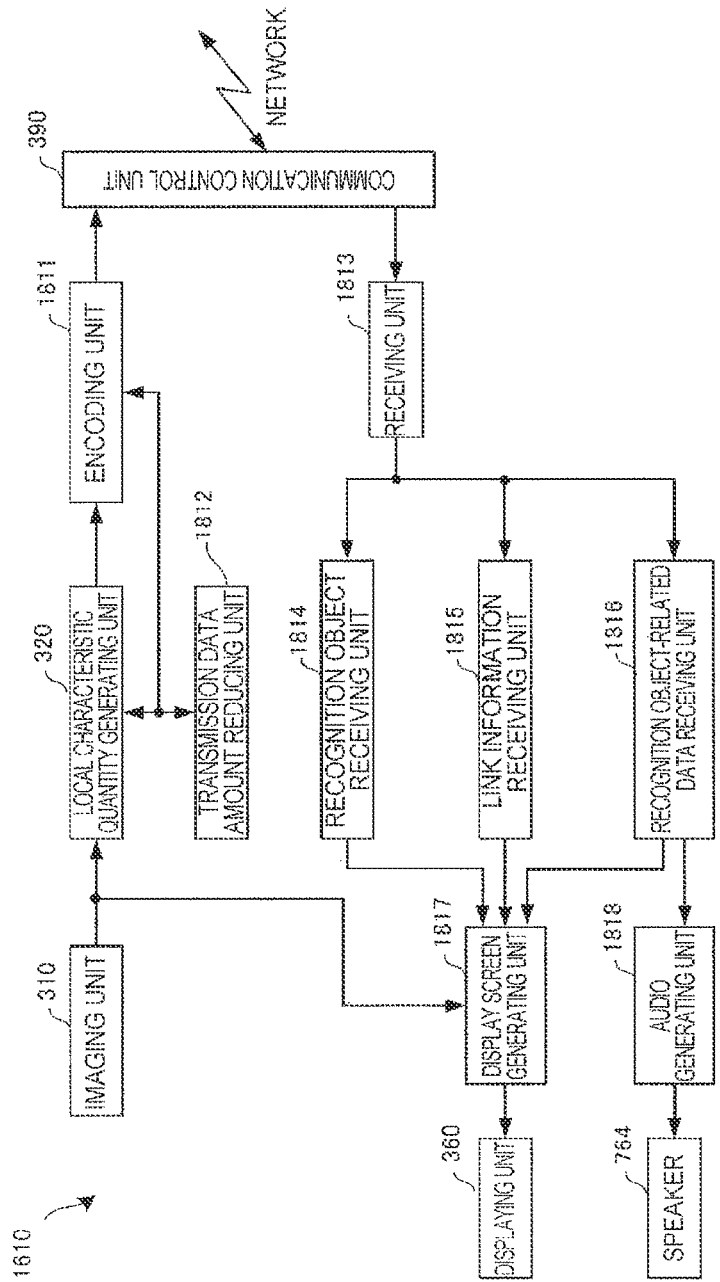

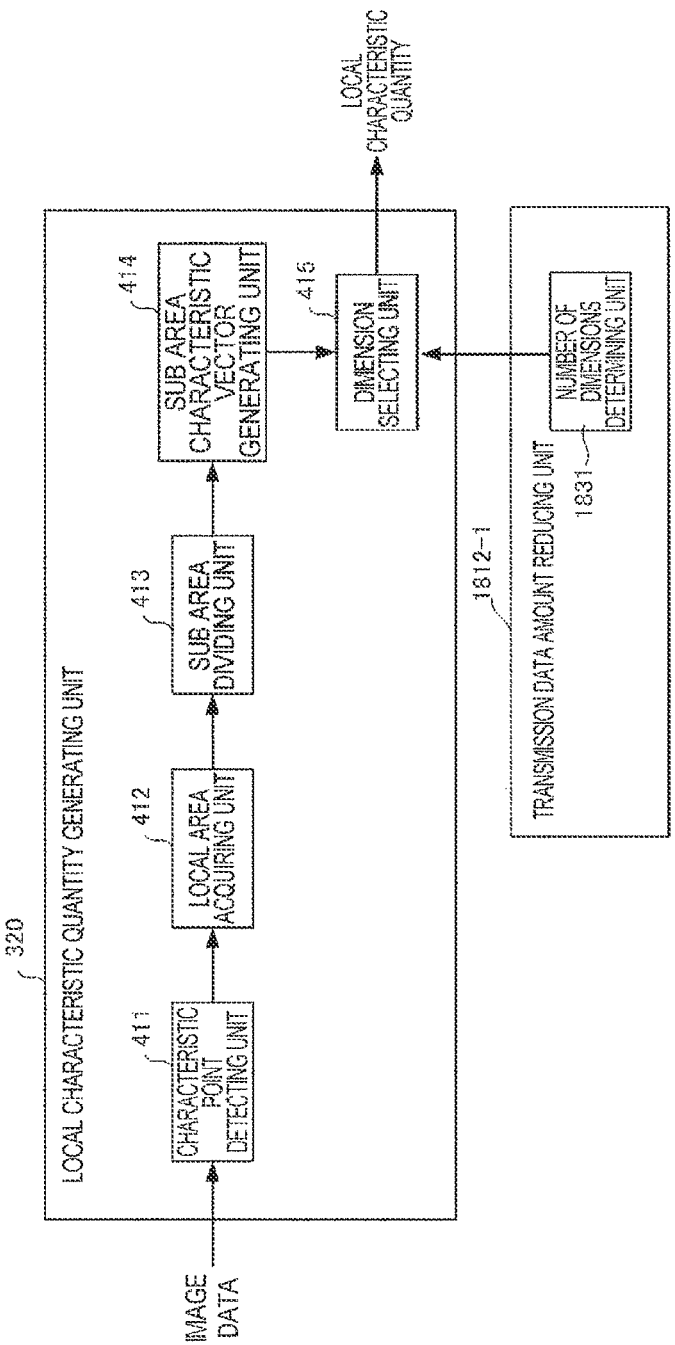

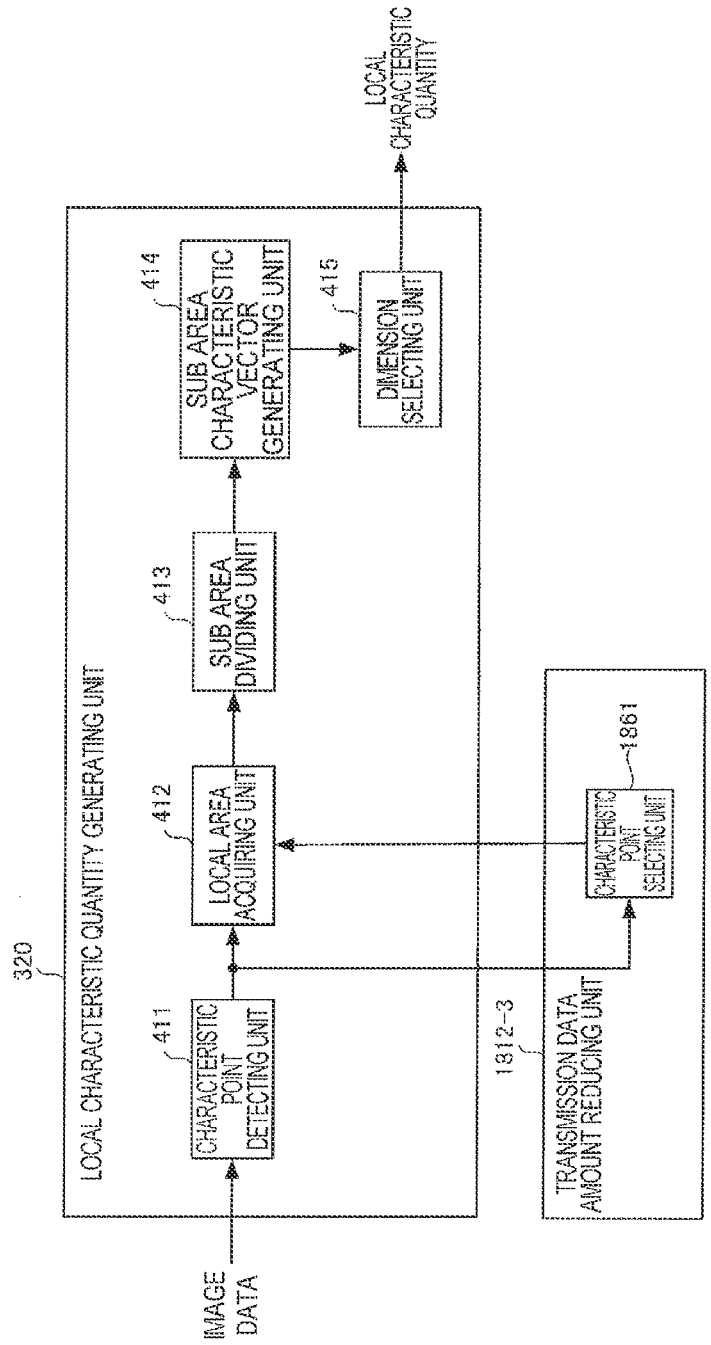

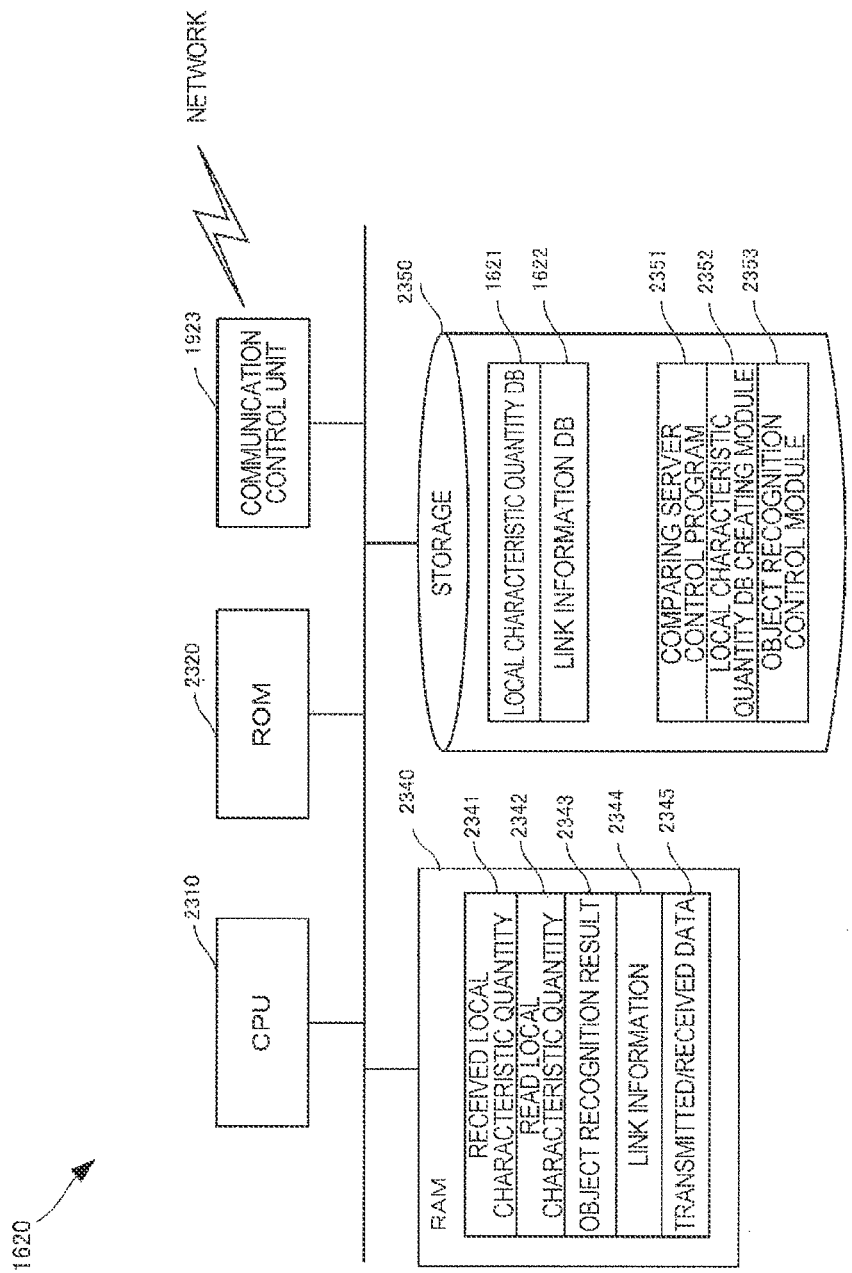

1622

| RECOGNITION OBJECT ID (2401) | RECOGNITION OBJECT NAME (2402) | LINK DESTINATION INFORMATION (2403) ||
|---|---|---|---|
| | | LINK DESTINATION DISPLAY DATA | LINK DESTINATION ADDRESS |
| 00001 | BLACK CICADA | | |
| 00002 | EVENING CICADA | | |
| ⋮ | | | |
| 01001 | SUNFLOWER | | |
| 01002 | CORN POPPY | | |
| ⋮ | | | |
| 10001 | ABC TREE | | |
| 10002 | DEF BUILDING | | |
| ⋮ | | | |
| 11001 | GHI RAILWAYS ELEVATED TRACKS | | |
| ⋮ | | | |

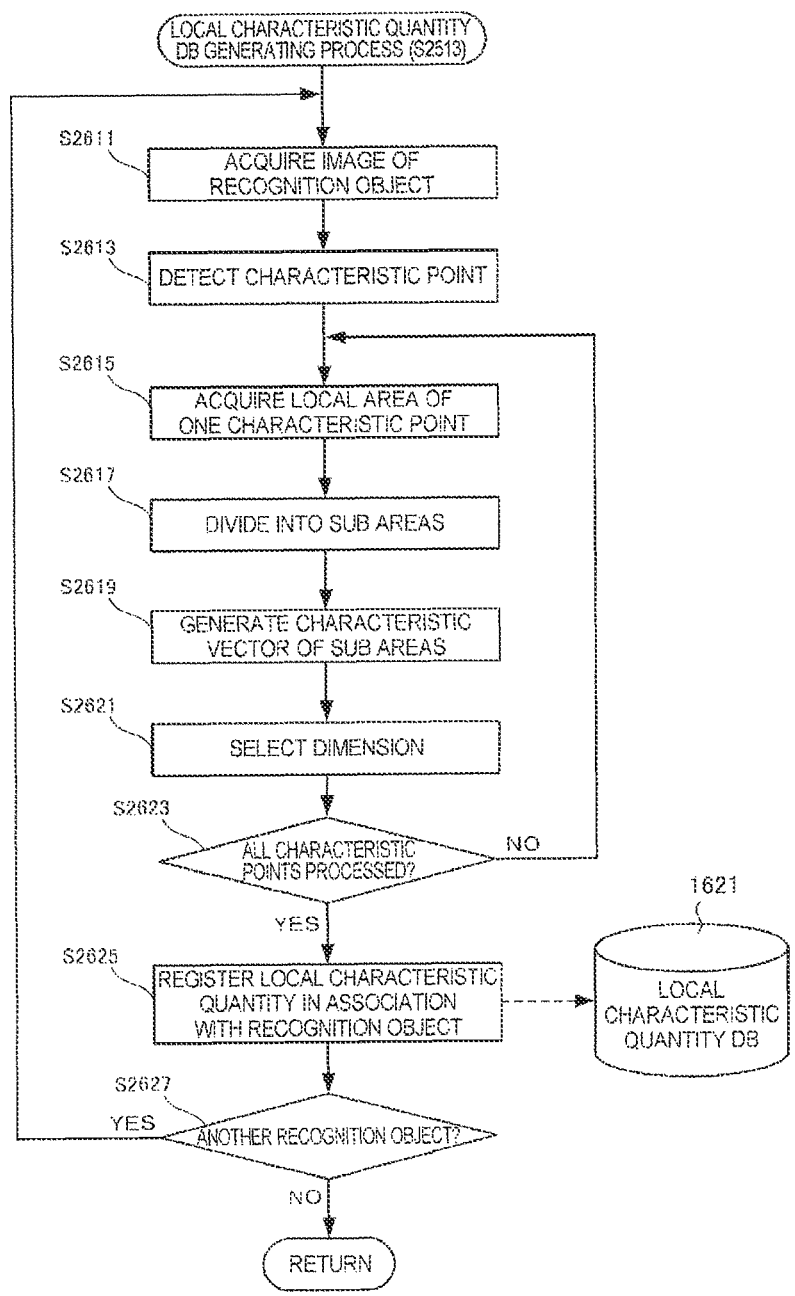

VIDEO PROCESSING SYSTEM, VIDEO PROCESSING METHOD, VIDEO PROCESSING DEVICE FOR MOBILE TERMINAL OR SERVER AND CONTROL METHOD AND CONTROL PROGRAM THEREOF

CROSS-REFERENCE TO RELATED APPLICATIONS

The present application is a national stage application of International Application No. PCT/JP2012/081409 entitled "Video Processing system, Video Processing Method, Video Processing Device for Mobile Terminal or Server and Control Method and Control Program Thereof," filed on Dec. 4, 2012, which claims the benefit of priority from Japanese Patent Application No. 2011-273938, filed on Dec. 14, 2011, the disclosures of which are incorporated herein in their entirety by reference thereto.

BACKGROUND

The present invention relates to a technique for recognizing an object existing in a video in real time.

In the technical field described above, Patent Document 1 describes a technique for improving recognition speed by clustering characteristic amounts when recognizing a query image using a model dictionary generated from a model image in advance.

[Patent Document 1] Patent Publication JP-A-2011-22168

SUMMARY

However, the improvement in recognition speed due to the technique described in the above document does not enable a recognition result with respect to a recognition object in a query image in a video to be notified in real time.

An object of the present invention is to provide a technique for solving the problem described above.

In order to achieve the object described above, a device according to the present invention has:

a first local characteristic quantity storing unit that stores a recognition object and m-number of first local characteristic quantities which are respectively 1-dimensional to i-dimensional characteristic vectors and which are respectively generated for n-number of local areas respectively including m-number of characteristic points in an image of the recognition object, with the recognition object and m-number of first local characteristic quantities being associated with each other;

a second local characteristic quantity generating unit which extracts n-number of characteristic points from an image in a video and which generates n-number of second local characteristic quantities respectively which are 1-dimensional to j-dimensional characteristic vectors for n-number of local areas respectively including the n-number of characteristic points;

a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a displaying unit that displays information representing the recognition object recognized by the recognizing unit in an image in which the recognition object exists in the video.

In order to achieve the object described above, a method according to the present invention is a control method of a video processing device including a first local characteristic quantity storing unit that stores a recognition object and m-number of first local characteristic quantities which are respectively 1-dimensional to i-dimensional characteristic vectors and which are respectively generated for m-number of local areas respectively including m-number of characteristic points in an image of the recognition object, with the recognition object and m-number of first local characteristic quantities being associated with each other, the control method of a video processing device having:

a second local characteristic quantity generating step of extracting n-number of characteristic points from an image in a video and generating n-number of second local characteristic quantities which are respectively 1-dimensional to j-dimensional characteristic vectors for n-number of local areas respectively including the n-number of characteristic points;

a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a displaying step of displaying information representing the recognition object recognized in the recognizing step in superposition on an image in which the recognition object exists in the video.

In order to achieve the object described above, a program according to the present invention is a control program for executing a control method in a video processing device including a first local characteristic quantity storing unit that stores m-number of first local characteristic quantities which are respectively 1-dimensional to i-dimensional characteristic vectors and which are respectively generated for m-number of local areas respectively including m-number of characteristic points in an image of a recognition object, with the m-number of first local characteristic quantities being associated with the recognition object, the control method including:

a second local characteristic quantity generating step of extracting n-number of characteristic points from an image in a video and generating n-number of second local characteristic quantities respectively which are 1-dimensional to j-dimensional characteristic vectors for n-number of local areas respectively including the n-number of characteristic points;

a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a displaying step of displaying information representing the recognition object recognized in the recognizing step in superposition on an image in which the recognition object exists in the video.

In order to achieve the object described above, a system according to the present invention is a video processing system including a video processing device for a mobile terminal and a video processing device for a server which are connected to each other via a network, the video processing system having:

a first local characteristic quantity storing unit that stores m-number of first local characteristic quantities which are respectively which are 1-dimensional to i-dimensional characteristic vectors and which are respectively generated for m-number of local areas respectively including m-number of characteristic points in an image of a recognition object, with the m-number of first local characteristic quantities being associated with the recognition object;

a second local characteristic quantity generating unit which extracts n-number of characteristic points from an image in a video and which generates n-number of second local characteristic quantities which are respectively 1-dimensional to j-dimensional characteristic vectors for n-number of local areas respectively including the n-number of characteristic points;

a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are by characteristic vectors up to the selected number of dimensions and which are stored in the first local characteristic quantity storing unit correspond to the n-number of second local characteristic quantities which are characteristic vectors up to the selected number of dimensions and which are generated by the second local characteristic quantity generating unit; and a displaying unit that displays information representing the recognition object recognized by the recognizing unit in superposition on an image in which the recognition object exists in the video.

In order to achieve the object described above, a method according to the present invention is A video processing method in a video processing system which includes a video processing device a for a mobile terminal and a video processing device for a server which are connected to each other via a network and which includes a first local characteristic quantity storing unit that stores a recognition object and m-number of first local characteristic quantities which are respectively 1-dimensional to i-dimensional characteristic vectors and which are respectively generated for m-number of local areas respectively including m-number of characteristic points in an image of the recognition object, with the first local characteristic quantities being associated with the recognition object, the video processing method comprising:

a second local characteristic quantity generating step of extracting n-number of characteristic points from an image in a video and generating n-number of second local characteristic quantities which are respectively 1-dimensional to j-dimensional characteristic vectors for n-number of local areas respectively including the n-number of characteristic points;

a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions and which are stored in the first local characteristic quantity storing unit correspond to the n-number of second local characteristic quantities which are characteristic vectors up to the selected number of dimensions and which are generated by the second local characteristic quantity generating unit; and a displaying unit that displays information representing the recognition object recognized by the recognizing unit in superposition on an image in which the recognition object exists in the video.

According to the present invention, a recognition result with respect to a recognition object in a video can be notified in real time while maintaining recognition accuracy.

DESCRIPTION OF DRAWINGS

FIG. 3 is a block diagram showing a functional configuration of the video processing device according to the second embodiment of the present invention;

FIG. 4A is a block diagram showing a configuration of a local characteristic quantity generating unit according to the second embodiment of the present invention;

FIG. 4B is a diagram showing processes performed by the local characteristic quantity generating unit according to the second embodiment of the present invention;

FIG. 4C is a diagram showing processes performed by the local characteristic quantity generating unit according to the second embodiment of the present invention;

FIG. 4D is a diagram showing processes performed by the local characteristic quantity generating unit according to the second embodiment of the present invention;

FIG. 4F is a diagram showing processes performed by the local characteristic quantity generating unit according to the second embodiment of the present invention;

FIG. 12 is a diagram showing a configuration of a related information DB according to the third embodiment of the present invention;

FIG. 17 is a sequence diagram showing a video processing procedure of the video processing system according to the fifth embodiment of the present invention;

FIG. 18A is a block diagram showing a functional configuration of a video processing device for a mobile terminal according to the fifth embodiment of the present invention;

FIG. 18C is a block diagram showing a first configuration of a transmission data amount reducing unit according to the fifth embodiment of the present invention;

FIG. 18F is a block diagram showing a third configuration of the transmission data amount reducing unit according to the fifth embodiment of the present invention;

FIG. 23 is a block diagram showing a hardware configuration of the video processing device for a server according to the fifth embodiment of the present invention;

FIG. 26A is a flow chart showing a processing procedure of a local characteristic quantity DB generating process according to the fifth embodiment of the present invention.

DETAILED DESCRIPTION

Hereinafter, embodiments of the present invention will be described in detail by way of example with reference to the drawings. However, it is to be understood that components described in the following embodiments are merely examples and are not intended to limit the technical scope of the present invention to such components.

First Embodiment

A video processing device 100 as a first embodiment of the present invention will be described with reference to FIG. 1. The video processing device 100 is a device for recognizing an object existing in a video in real time.

Figure 1:
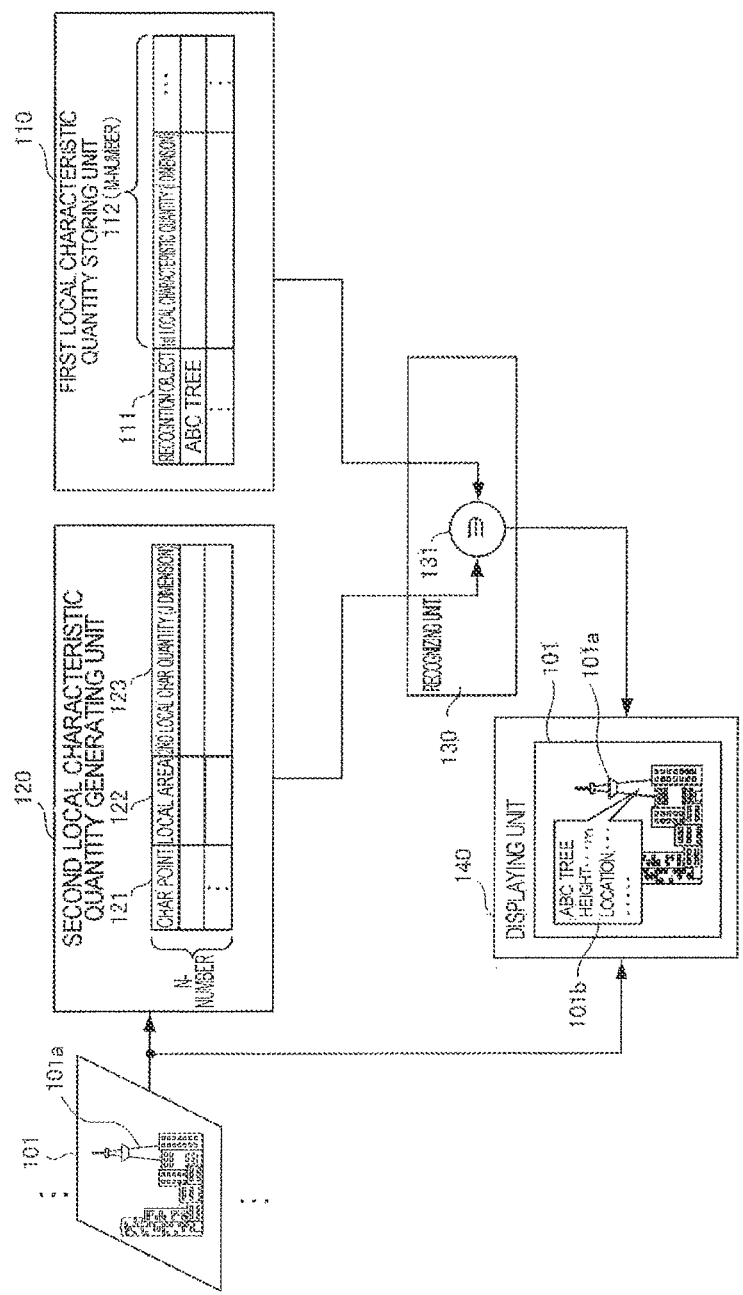
FIG. 1 is a block diagram showing a configuration of a video processing device according to a first embodiment of the present invention.

As shown in FIG. 1, the video processing device 100 includes a first local characteristic quantity storing unit 110, a second local characteristic quantity generating unit 120, a recognizing unit 130, and a displaying unit 140. The first local characteristic quantity storing unit 110 stores a recognition object 111 and m-number of first local characteristic quantities 112 in association with each other. The m-number of first local characteristic quantities 112 are respectively 1-dimensional to i-dimensional characteristic vectors generated for each of m-number of local areas that include each of m-number of characteristic points in an image of the recognition object. The second local characteristic quantity generating unit 120 extracts n-number of characteristic points 121 from an image 101 in a video and generates n-number of second local characteristic quantities 123 which are respectively 1-dimensional to j-dimensional characteristic vectors for n-number of local areas 122 including each of the n-number of characteristic points 121.

The recognizing unit 130 selects a smaller number of dimensions among the number of dimensions i of characteristic vectors of the first local characteristic quantities and the number of dimensions j of the characteristic vectors of the second local characteristic quantities. The recognizing unit 130 determines whether or not a prescribed proportion or more of the nm-number of first local characteristic quantities 112 which are characteristic vectors up to the selected number of dimensions correspond to the n-number of second local characteristic quantities 123 which are characteristic vectors up to the selected number of dimensions. When the recognizing unit 130 determines a correspondence of the specified proportion or more, the recognizing unit 130 recognizes that the recognition object exists in the image 101 in the video. The displaying unit 140 displays information representing the recognition object recognized by the recognizing unit 130 in an image in which the recognition object exists in the video.

According to the present embodiment, a recognition result with respect to a recognition object in a video can be notified in real time while maintaining recognition accuracy.

Second Embodiment

Next, a video processing device according to a second embodiment of the present invention will be described. In the present embodiment, video processing will be described in which a video processing device as a mobile terminal recognizes an object in a video being captured and displays a recognition result with respect to a recognition object in the video in real time. In the present embodiment, an example in which a name of a recognition object is displayed in real time will be described. Moreover, while processing with respect to a video captured by a mobile terminal will be described in the present embodiment, the video can be similarly applied to a playback process of video contents or to viewing of a broadcasted program.

According to the present embodiment, when a user is viewing a video, a recognition result with respect to an object in the video can be notified in the video in real time to the user while maintaining recognition accuracy.

<<Description of Video Processing According to Present Embodiment>>

Figure 2:
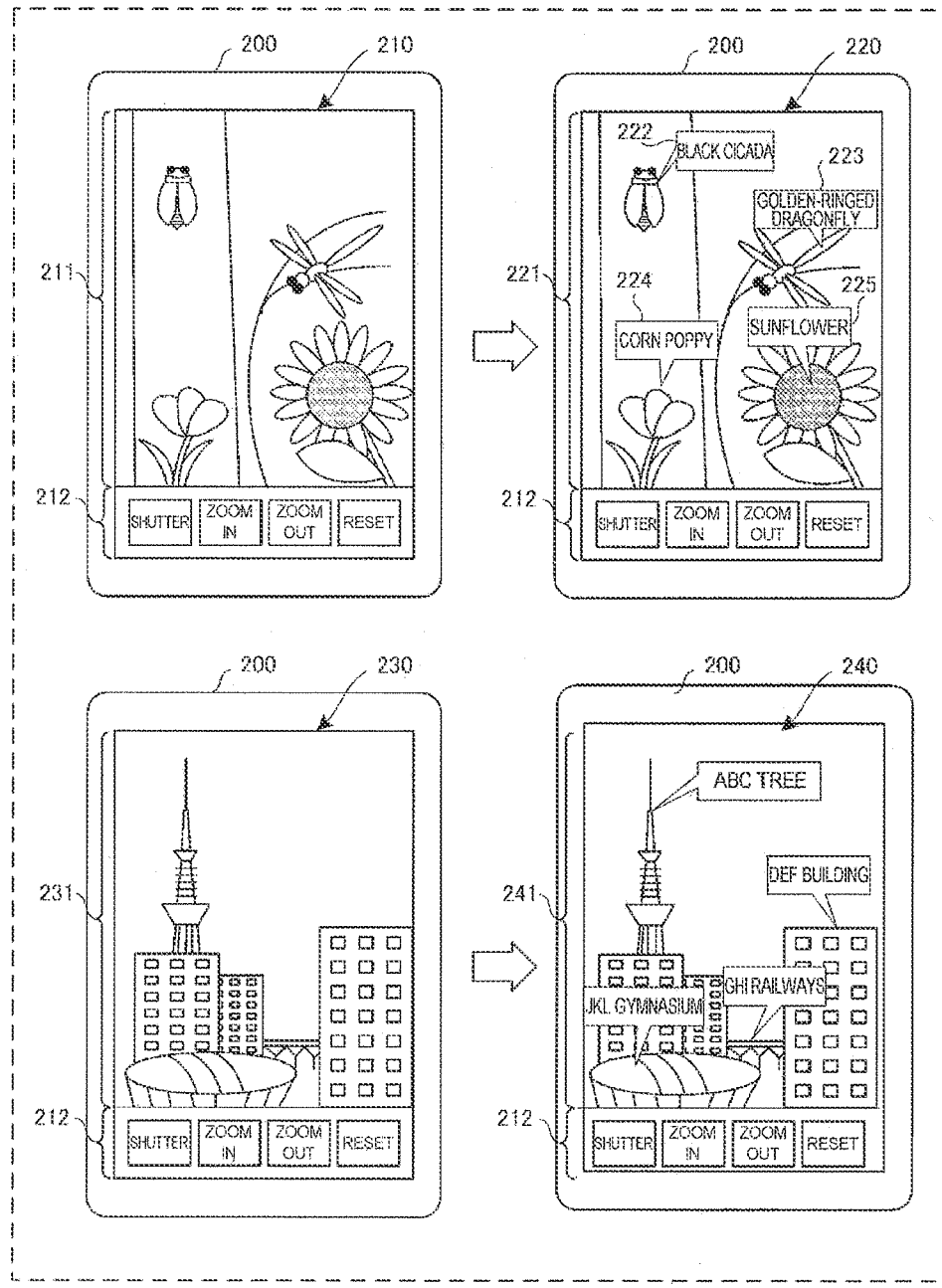
FIG. 2 is a diagram describing video processing by a video processing device according to a second embodiment of the present invention.

FIG. 2 is a diagram illustrating video processing by a video processing device 200 according to the present embodiment. While two processing examples are shown in FIG. 2, these processing examples are not restrictive.

First, an upper half of FIG. 2 shows an example in which children playing in the fields capture a video of animals and plants with a mobile terminal, insects and flowers that exist in the video are recognized in real time, and names of the insects and flowers that are recognition objects are displayed. As shown in a left diagram in the upper half of FIG. 2, a video display area 211 of a video being captured and an instructing button display area 212 of a touch panel are displayed on a display screen 210 of the video processing device 200 as a mobile terminal. The insects and flowers displayed in the video display area 211 represent a video being captured that is displayed as-is and not a still image (photograph). In the present embodiment, a real-time recognizing process is performed on the displayed video and names 222 to 225 of the respective insects and flowers are displayed in a video display area 221 in a right display screen 220. The children can find out the names of the animals and plants in a natural setting without having to collect the animals and plants in the natural setting and look at a field guide or the like at home or without having to carry the field guide out into the field. Moreover, the present embodiment is not limited to animals and plants and can also be applied to non-biological natural material such as minerals or artificial material such as vehicles.

A lower half of FIG. 2 shows an example in which the user such as a tourist captures a video including a recognition object with a mobile terminal when desiring to find out about an architectural structure such as a tower or a building in a field of view or desiring to find out about a destination or a current position of the user. As shown in a left diagram in the lower half of FIG. 2, a video display area 231 of a video being captured and an instructing button display area 212 of a touch panel are displayed on a display screen 230 of the video processing device 200 as a mobile terminal. The architectural structures displayed in the video display area 231 represent a video being captured that is displayed as-is and not a still image (photograph). In the present embodiment, a real-time recognizing process is performed on the displayed video and names 242 to 245 of the respective architectural structures are displayed in a video display area 241 in a right display screen 240. From the video display area 241, for example, the user is able to find out about a destination or a current position of the user even without tourist guidance.

<<Functional Configuration of Video Processing Device>>

FIG. 3 is a block diagram showing a functional configuration of the video processing device 200 according to the present embodiment.

The video processing device 200 includes an imaging unit 310 that acquires videos. A captured video is displayed on a displaying unit 360 and inputted to a local characteristic quantity generating unit 320. The local characteristic quantity generating unit 320 generates a local characteristic quantity from the captured video (for details, refer to FIG. 4A). A local characteristic quantity DB 330 stores local characteristic quantities generated in advance by a similar algorithm to the local characteristic quantity generating unit 320 from individual recognition objects including single objects such as the insects, the flowers, the towers, and the buildings shown in FIG. 2 in association with the recognition objects. Contents of the local characteristic quantity DB 330 may be received by a local characteristic quantity receiving unit 380 via a communication control unit 390.

A comparing unit 340 performs comparison to determine whether or not there is data corresponding to local characteristic quantities stored in the local characteristic quantity DB 330 in the local characteristic quantities generated by the local characteristic quantity generating unit 320 from a captured video. When there is corresponding data, the comparing unit 340 determines that a recognition object exists in the captured video. Moreover, a correspondence of local characteristic quantities may not only refer to the presence of the same local characteristic quantity but may also include determining whether or not an order or an arrangement of local characteristic quantities can be acquired from a same object (refer to FIG. 4G and FIG. 4H).

A comparison result generating unit 350 generates data to be displayed on the displaying unit 360 from a comparison result of the comparing unit 340. The data includes a name of a recognition object and data such as a recognition error. The displaying unit 360 displays a comparison result by superimposing the comparison result in a video captured by the imaging unit 310. In addition, data generated by the comparison result generating unit 350 may be transmitted to the outside via the communication control unit 390. An operating unit 370 includes keys or a touch panel (such as the instructing buttons shown in FIG. 2) of the video processing device 200 and manipulates operations of the video processing device 200 such as the imaging unit 310.

Moreover, the video processing device 200 according to the present embodiment is not limited to a video being captured and can be applied to a video being played back and a video being broadcasted. In such cases, the imaging unit 310 need only be replaced with a video playback unit or a video receiving unit.

<<Local Characteristic Quantity Generating Unit>>

FIG. 4A is a block diagram showing a configuration of the local characteristic quantity generating unit 320 according to the present embodiment.

The local characteristic quantity generating unit 320 is configured to include a characteristic point detecting unit 411, a local area acquiring unit 412, a sub area dividing unit 413, a sub area characteristic vector generating unit 414, and a dimension selecting unit 415.

The characteristic point detecting unit 411 detects a large number of characteristic points (characteristic points) from image data and outputs a coordinate position, a scale (size), and an angle of each characteristic point.

The local area acquiring unit 412 acquires a local area to be subjected to characteristic amount extraction from the coordinate position, the scale, and the angle of each detected characteristic point.

The sub area dividing unit 413 divides the local area into sub areas. For example, the sub area dividing unit 413 is capable of dividing a local area into 16 blocks (4×4 blocks) or dividing a local area into 25 blocks (5×5 blocks). Moreover, the number of divisions is not limited. In the present embodiment, a case where a local area is divided into 25 blocks (5×5 blocks) will be hereinafter described as a representative example.

The sub area characteristic vector generating unit 414 generates a characteristic vector for each sub area of a local area. For example, a gradient direction histogram can be used as a characteristic vector of a sub area.

Based on a positional relationship among sub areas, the dimension selecting unit 415 selects (for example, by thinning) a dimension to be outputted as a local characteristic quantity so that a correlation between characteristic vectors of adjacent sub areas is reduced. In addition, besides simply selecting a dimension, the dimension selecting unit 415 is capable of determining a priority of selection. In other words, the dimension selecting unit 415 can prioritize and select a dimension so that, for example, dimensions in a same gradient direction are not selected between adjacent sub areas. Furthermore, the dimension selecting unit 415 outputs a characteristic vector constituted by the selected dimension as a local characteristic quantity. Moreover, the dimension selecting unit 415 can output a local characteristic quantity in a state where dimensions are sorted according to priority.

<<Processes Performed by Local Characteristic Quantity Generating Unit>>

FIGS. 4B to 4F are diagrams showing processes performed by the local characteristic quantity generating unit 320 according to the present embodiment.

First, FIG. 4B is a diagram showing a series of processes including characteristic point detection, local area acquisition, sub area division, and characteristic vector generation performed by the local characteristic quantity generating unit 320. For information on the series of processes, please refer to U.S. Pat. No. 6,711,293 and David G. Lowe, "Distinctive Image Features from Scale-invariant Key Points", (U.S.A.), International Journal of Computer Vision, 60(2), 2004, p. 91-110.

(Characteristic Point Detecting Unit)

An image 421 shown in FIG. 4B is an image representing a state where the characteristic point detecting unit 411 in FIG. 4A has detected a characteristic point from an image on a video. Hereinafter, generation of a local characteristic quantity will be described using a single piece of characteristic point 421a as a representative example. An origin of an arrow denoting the characteristic point 421a represents a coordinate position of a characteristic point, a length of the arrow represents a scale (size) of the characteristic point, and a direction of the arrow represents an angle of the characteristic point. In this case, brightness, chroma, hue, or the like can be selected as the scale (size) and direction depending on an object video.

Moreover, while a case of 6 directions at 60-degree intervals will be described in the example shown in FIG. 4B, the present invention is not limited thereto.

(Local Area Acquiring Unit)

The local area acquiring unit 412 shown in FIG. 4A generates, for example, a Gaussian window 422a centered on the origin of the characteristic point 421a and generates a local area 422 that substantially includes the Gaussian window 422a. While the local area acquiring unit 412 generates a square local area 422 in the example shown in FIG. 4B, the local area may be circular or have another shape. This local area is acquired for each characteristic point. A circular local area produces an effect of improved robustness in an imaging direction.

(Sub Area Dividing Unit)

Next, a state is shown where the sub area dividing unit 413 has divided the scale and the angle of each pixel included in the local area 422 of the characteristic point 421a into sub areas 423. Moreover, FIG. 4B shows an example of a division into 5×5=25 sub areas respectively being 4×4=16 pixels. Alternatively, there may be 4×4=16 sub areas, or other shapes and other numbers of divisions may be adopted.

(Sub Area Characteristic Vector Generating Unit)

The sub area characteristic vector generating unit 414 quantizes the scale of each pixel in the sub area into angle units of 8 directions by generating a histogram to obtain sub area characteristic vectors 424. In other words, these 8 directions are directions normalized with respect to angles outputted by the characteristic point detecting unit 411. In addition, the sub area characteristic vector generating unit 414 sums up frequencies in 8 directions quantized for each sub area and generates a histogram. In this case, the sub area characteristic vector generating unit 414 outputs a characteristic vector constituted by a histogram of 25 sub area blocks×6 directions=150 dimensions which is generated for each characteristic point. Furthermore, quantization of the gradient direction is not limited to 8 directions, and the gradient direction may alternatively be quantized into an arbitrary number of quantizations such as 4 directions, 8 directions, and 10 directions. When the gradient direction is quantized in D-number of directions, if a gradient direction prior to quantization is denoted by G (0 to $2\pi$ radian), a gradient direction quantization value $Qq$ ($q=0, \ldots, D-1$) can be calculated using, but not limited to, Expressions (1) and (2) below.

$$Qq = \text{floor}(G \times D/2\pi) \quad (1)$$

$$Qq = \text{round}(G \times D/2\pi) \bmod D \quad (2),$$

where floor( ) denotes a function for truncating a fractional part, round( ) denotes a rounding function, and mod denotes an operation for calculating a remainder. Alternatively, when generating a gradient histogram, the sub area characteristic vector generating unit 414 may sum up frequencies by adding a magnitude of a gradient instead of simply summing up frequencies. Alternatively, when summing up a gradient histogram, the sub area characteristic vector generating unit 414 may add weight values not only to a sub area to which a pixel belongs but also to nearby sub areas (such as adjacent blocks) in accordance with a distance between sub areas. Alternatively, the sub area characteristic vector generating unit 414 may also add weight values in gradient directions preceding and following the quantized gradient direction. Moreover, the characteristic vector of a sub area is not limited to a gradient direction histogram and may be any information having a plurality of dimensions (components) such as color information. In the present embodiment, a description of using a gradient direction histogram as a characteristic vector of a sub area will be given.

(Dimension Selecting Unit)

Next, processes of the dimension selecting unit 415 in the local characteristic quantity generating unit 320 will be described with reference to FIGS. 4C to 4F.

Based on a positional relationship among sub areas, the dimension selecting unit 415 selects (thins) a dimension (component) to be outputted as a local characteristic quantity so that a correlation between characteristic vectors of adjacent sub areas is reduced. More specifically, the dimension selecting unit 415 selects a dimension so that, for example, at least one gradient direction differs between adjacent sub areas. Moreover, while the dimension selecting unit 415 mainly uses adjacent sub areas as nearby sub areas in the present embodiment, nearby sub areas are not limited to adjacent sub areas. For example, sub areas within a prescribed distance from an object sub area may be used as nearby sub areas.

FIG. 4C is a diagram showing an example of a case where a dimension is selected from a characteristic vector 431 of a 150-dimensional gradient histogram generated by dividing a local area into sub areas of 5×5 blocks and quantizing a gradient direction into 6 directions 431*a*. In the example shown in FIG. 4C, a dimension is selected from a 150-dimensional (5×5 sub area blocks×6 directions) characteristic vector.

(Dimension Selection of Local Area)

FIG. 4C is a diagram showing a selecting process of the number of dimensions of a characteristic vector by the local characteristic quantity generating unit 320.

As shown in FIG. 4C, the dimension selecting unit 415 selects a characteristic vector 432 of a 75-dimensional gradient histogram having half the number of dimensions from the characteristic vector 431 with the 150-dimensional gradient histogram. In this case, dimensions can be selected so that dimensions of a same gradient direction are not selected between sub area blocks that are adjacent to each other in horizontal and vertical directions.

In this example, when the quantized gradient directions in the gradient direction histogram are expressed as q (q=0, 1, 2, 3, 4, 5), a block for which components q=0, 2, 4 are selected and a sub area block for which components q=1, 3, 5 are selected are alternately arranged. In addition, in the example shown in FIG. 4C, gradient directions selected for the adjacent sub area blocks add up to a total of 6 directions.

In addition, the dimension selecting unit 415 selects a characteristic vector 433 of a 50-dimensional gradient histogram from the characteristic vector 432 of the 75-dimensional gradient histogram. In this case, a dimension can be selected so that only one direction is the same (a remaining one direction is different) between sub area blocks positioned at an oblique 45 degrees with respect to each other.

Furthermore, when selecting a characteristic vector 434 of a 25-dimensional gradient histogram from the characteristic vector 433 of the 50-dimensional gradient histogram, the dimension selecting unit 415 can select a dimension so that selected gradient directions are not consistent between sub area blocks positioned at an oblique 45 degrees with respect to each other. In the example shown in FIG. 4C, the dimension selecting unit 415 selects one gradient direction from each sub area from 1 dimension to 25 dimension, two gradient directions from each sub area from 26 dimension to 50 dimension, and three gradient directions from each sub area from 51 dimension to 75 dimension.

In this manner, gradient directions are desirably selected so that gradient directions do not overlap each other between adjacent sub area blocks and that all gradient directions are equally selected. At the same time, desirably, as in the example shown in FIG. 4C, dimensions are equally selected from an entire local area. It should be noted that the dimension selection method shown in FIG. 4C is simply an example and selection methods are not limited thereto.

(Priority of Local Area)

FIG. 4D is a diagram showing an example of a selection order of characteristic vectors from sub areas in the local characteristic quantity generating unit 320.

Instead of simply selecting dimensions, the dimension selecting unit 415 is also capable of determining a priority of selection so that dimensions with greater contributions to a characteristic of a characteristic point are selected first. In other words, the dimension selecting unit 415 can prioritize and select a dimension so that, for example, dimensions in a same gradient direction are not selected between adjacent sub area blocks. Furthermore, the dimension selecting unit 415 outputs a characteristic vector constituted by the selected dimension as a local characteristic quantity. Moreover, the dimension selecting unit 415 can output a local characteristic quantity in a state where dimensions are sorted according to priority.

In other words, between 1 to 25 dimensions, 26 to 50 dimensions, and 51 to 75 dimensions, for example, the dimension selecting unit 415 can select dimensions so as to add dimensions in an order of sub area blocks shown in a 441 in FIG. 4D. When using the priority shown in the 441 in FIG. 4D, the dimension selecting unit 415 can select gradient directions by giving a higher priority to sub area blocks near the center.

Figure 4E:
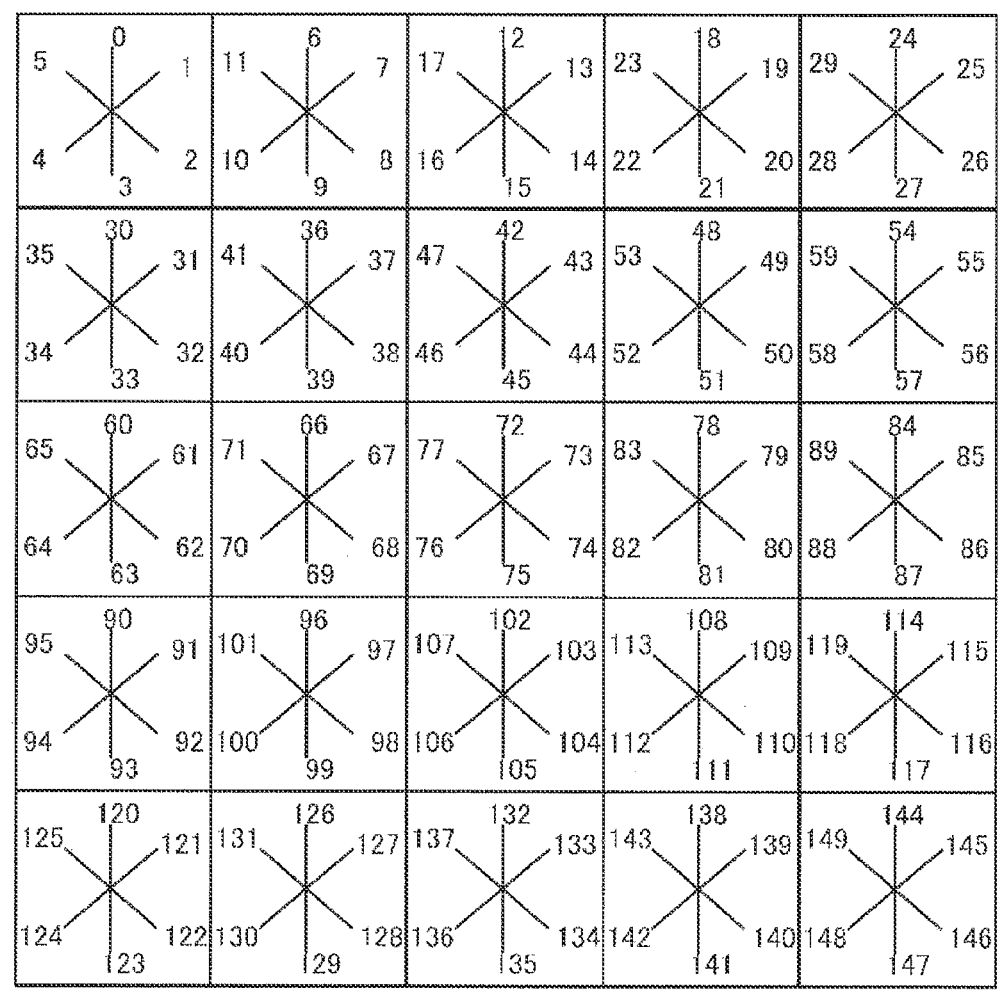
FIG. 4E is a diagram showing processes performed by the local characteristic quantity generating unit according to the second embodiment of the present invention.

A matrix 451 shown in FIG. 4E is a diagram showing examples of the number of components of a 150-dimensional characteristic vector on the basis of the order of selection in FIG. 4D. In this example, when 5×5=25 blocks are expressed by numbers p (p=0, 1, . . . , 25) in a raster-scanning order and quantized gradient directions are expressed as q (q=0, 1, 2, 3, 4, 5), the number of a component of the characteristic vector is expressed as 6×p+q.

A matrix 461 in FIG. 4F is a diagram showing hierarchization of orders of 150 dimensions according to the selection order shown in FIG. 4E in units of 25 dimensions. In other words, the 461 in FIG. 4F is a diagram showing a configuration example of local characteristic quantities obtained by selecting the components shown in FIG. 4E according to the priority represented by the 441 in FIG. 4D. The dimension selecting unit 415 can output dimension components in the order shown in FIG. 4F. Specifically, for example, when outputting local characteristic quantities of 150 dimensions, the dimension selecting unit 415 can output components of all 150 dimensions in the order shown in FIG. 4F. In addition, for example, when outputting the local characteristic quantity of the 25 dimension, the dimension selecting unit 415 can output a 1st row (76th, 45th, 83rd, . . . , 120th) component 471 shown in FIG. 4F in the order (left to right) shown in FIG. 4F. Furthermore, for example, when outputting the local characteristic quantity of the 50 dimension, the dimension selecting unit 415 can output a 2nd row component 472 shown in FIG. 4F in the order (left to right) shown in FIG. 4F in addition to the 1st row shown in FIG. 4F.

In the example shown in FIG. 4F, local characteristic quantities have a hierarchical structure. In other words, for example, with the 25-dimensional local characteristic quantity and the 150-dimensional local characteristic quantity, an arrangement of the components 471 to 476 of the local characteristic quantities of the first 25 dimensions is the same. In this manner, by hierarchically (progressively) selecting dimensions, the dimension selecting unit 415 can extract and output a local characteristic quantity of an arbitrary number of dimensions or, in other words, a local characteristic quantity with an arbitrary size in accordance with an application, communication capacity, terminal specifications, or the like. In addition, as a result of the dimension selecting unit 415 hierarchically selecting dimensions and sorting and outputting the dimensions based on priority, images can be compared using local characteristic quantities with different numbers of dimensions. For example, when images are compared using the 75-dimensional local characteristic quantity and the 50-dimensional local characteristic quantity, a distance between local characteristic quantities can be calculated using only the first 50 dimensions.

Moreover, the priorities shown in the 441 in FIG. 4D to FIG. 4F are simply examples and an order applied when selecting dimensions is not limited thereto. For example, as the order of blocks, orders represented by the 442 in FIG. 4D or the matrix 443 in FIG. 4D may be adopted in addition to the example of the 441 in FIG. 4D. In addition, for example, a priority may be set so that dimensions are evenly selected from all sub areas. Alternatively, by placing importance on a vicinity of a center of the local area, a priority may be set so that sub areas near the center have a higher selection frequency. Furthermore, for example, information representing a selection order of dimensions may be defined in a program or may be stored in a table or the like (a selection order storing unit) that is referenced upon execution of a program.

Alternatively, the dimension selecting unit 415 may select dimensions by selecting every other sub area block. In other words, the 6 dimension is selected for one sub area while the 0 dimension is selected for another sub area near the one sub area. Even in such cases, it can be said that a dimension is selected for each sub area so that a correlation between nearby sub areas is reduced.

In addition, a shape of a local area or a sub area is not limited to a square and may be an arbitrary shape. For example, the local area acquiring unit 412 may be configured to acquire a circular local area. In this case, for example, the sub area dividing unit 413 can concentrically divide the circular local area into 9 or 17 sub areas having a plurality of local areas. Even in this case, the dimension selecting unit 415 can select a dimension for each sub area.

As described above and as shown in FIGS. 4B to 4F, with the local characteristic quantity generating unit 320 according to the present embodiment, dimensions of a generated characteristic vector are hierarchically selected while maintaining an amount of information of a local characteristic quantity. Due to this process, real-time object recognition and displaying of a recognition result can be performed while maintaining recognition accuracy. Moreover, the configuration and processes of the local characteristic quantity generating unit 320 are not limited to those in the present example. It is obvious that other processes that enable real-time object recognition and displaying of a recognition result to be performed while maintaining recognition accuracy can also be applied.

<<Comparing Unit>>

Figure 4G:
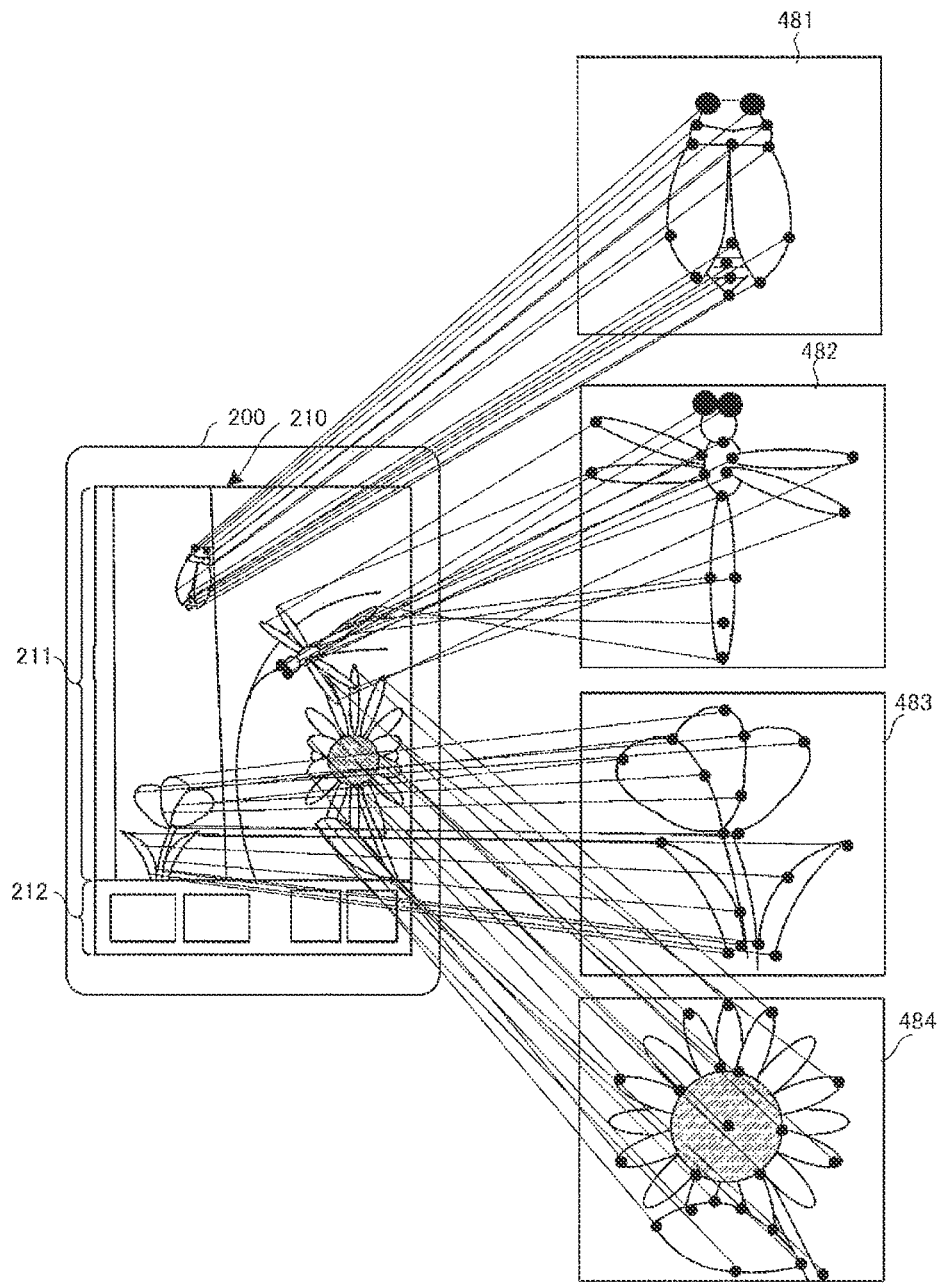
FIG. 4G is a diagram showing processes performed by a comparing unit according to the second embodiment of the present invention.
Figure 4H:
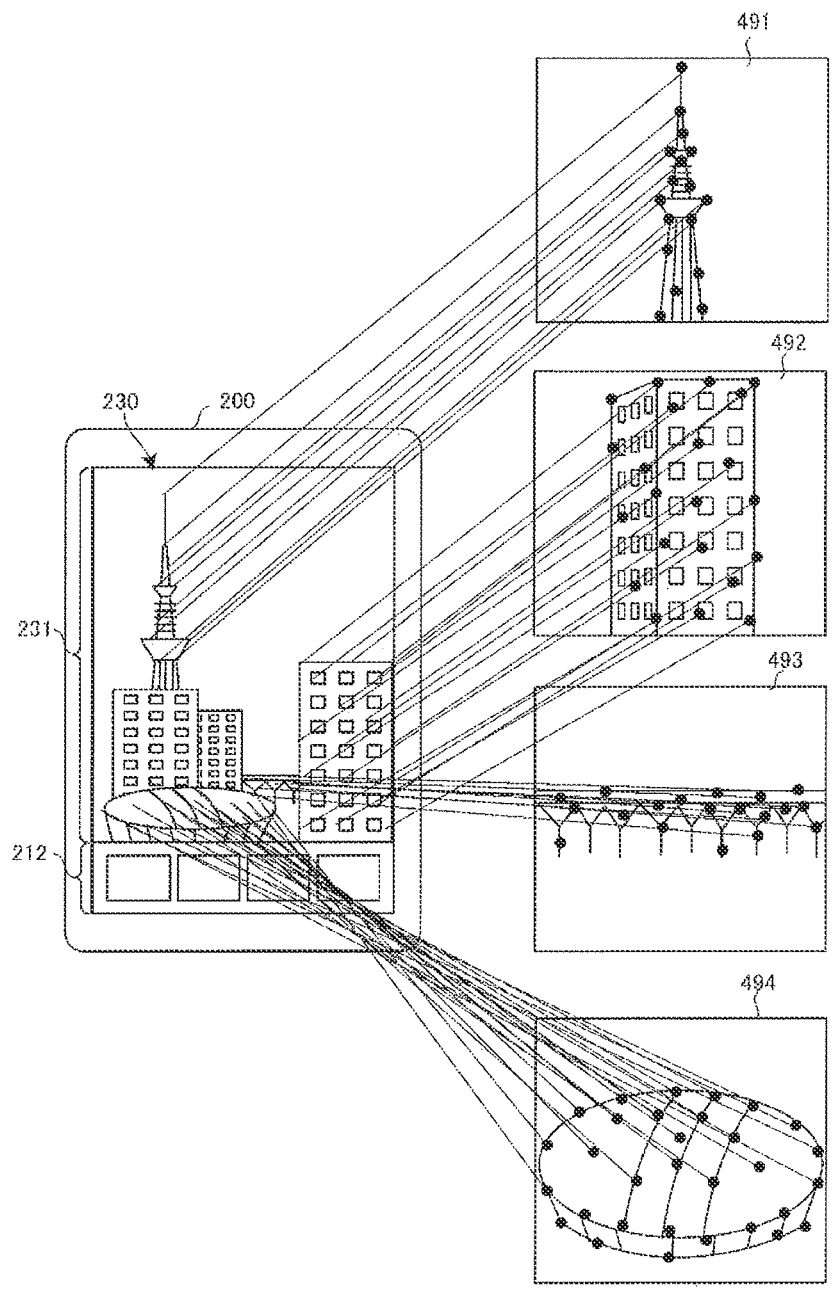
FIG. 4H is a diagram showing processes performed by the comparing unit according to the second embodiment of the present invention.

FIGS. 4G and 4H are diagrams showing processes performed by the comparing unit 340 according to the present embodiment.

FIG. 4G is a diagram showing a comparison example of recognizing the animals and plants in the video in the upper half of FIG. 2. Local characteristic quantities generated in advance according to the present embodiment from the recognition objects (in the present example, animals and plants including a black cicada, a golden-ringed dragonfly, a corn poppy, and a sunflower) are stored in the local characteristic quantity DB 330. Meanwhile, local characteristic quantities are generated according to the present embodiment from the video display area 211 in the display screen 210 of the video processing device 200 as a mobile terminal shown in the left diagram. Subsequently, each local characteristic quantity stored in the local characteristic quantity DB 330 is compared to determine whether the local characteristic quantity is included in the local characteristic quantities generated from the video display area 211.

As shown in FIG. 4G, the comparing unit 340 associates each characteristic point at which the local characteristic quantities 481 to 484 stored in the local characteristic quantity DB 330 and the local characteristic quantities match as depicted by the fine lines. Moreover, the comparing unit 340 determines a match of a characteristic point when a prescribed proportion or more of the local characteristic quantities are consistent. Subsequently, the comparing unit 340 recognizes a recognition object when a positional relationship between sets of characteristic points associated with each other is a linear relationship. Such recognition can be performed even in cases of different sizes or orientations (different viewpoints) or in cases of inversion or the like. In addition, since recognition accuracy is obtained as long as there are a prescribed number or more of associated characteristic points, a recognition object can be recognized even if a part of the recognition object is hidden from view.

FIG. 4H is a diagram showing a comparison example of recognizing the architectural structures in the video in the lower half of FIG. 2. Local characteristic quantities generated in advance according to the present embodiment from the recognition objects (in the present example, buildings including ABC Tree, DEF Building, GHI Railways, and JKL Gymnasium) are stored in the local characteristic quantity DB 330.

Meanwhile, local characteristic quantities are generated according to the present embodiment from the video display area 231 in the display screen 230 of the video processing device 200 as a mobile terminal shown in the left diagram. Subsequently, each local characteristic quantity stored in the local characteristic quantity DB 330 is compared to determine whether the local characteristic quantity is included in the local characteristic quantities generated from the video display area 231.

As shown in FIG. 4H, each characteristic point at which the local characteristic quantities 491 to 494 stored in the local characteristic quantity DB 330 and the local characteristic quantities match is associated as depicted by the fine lines. Moreover, a match of a characteristic point is determined when a prescribed proportion or more of the local characteristic quantities are consistent. Subsequently, a recognition object is recognized when a positional relationship between associated characteristic points is a linear relationship. At this point, match conditions of local characteristic quantities and conditions of the number of characteristic points set for the recognition may be the same as those in FIG. 4G or different conditions may be set since recognition objects differ.

Moreover, while comparison is performed based on characteristic point coordinates and local characteristic quantities in the comparing process performed by the comparing unit 340 according to the present embodiment, recognition can also be performed solely based on a linear relationship of arrangement orders between local characteristic quantities generated from a matching recognition object and local characteristic quantities generated from an image in a video.

Furthermore, while the description in the present embodiment is based on a two-dimensional image, similar processing can be performed using three-dimensional characteristic point coordinates.

(Local Characteristic Quantity Generating Data)

Figure 5:
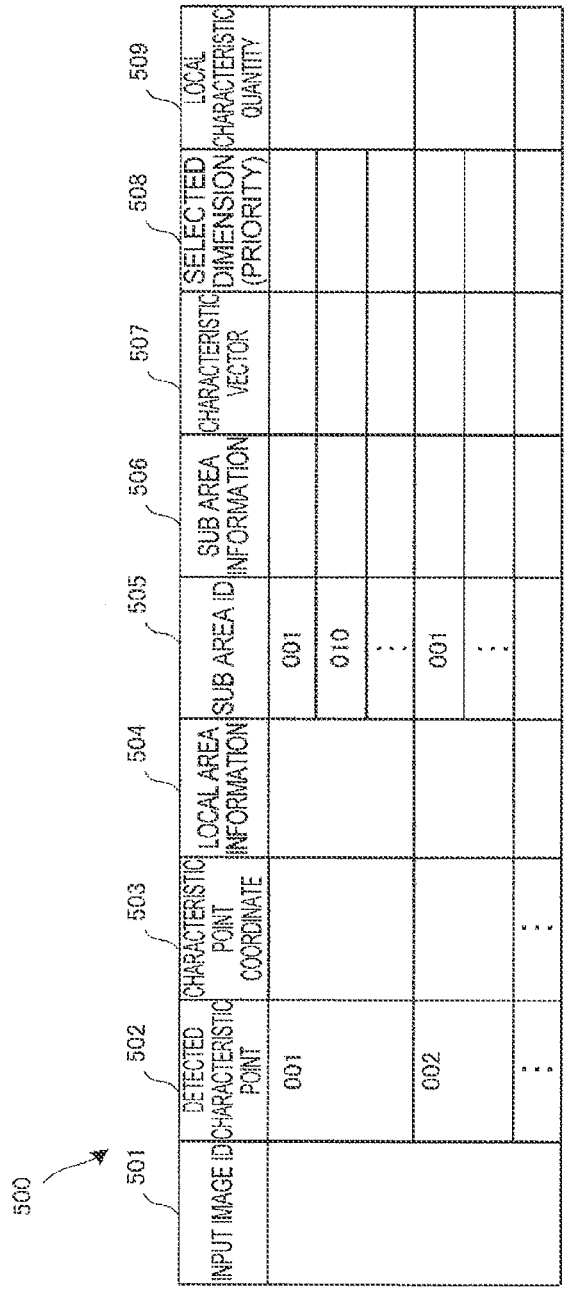
FIG. 5 is a diagram showing a configuration of local characteristic quantity generating data according to the second embodiment of the present invention.

FIG. 5 is a diagram showing a configuration of local characteristic quantity generating data 500 according to the present embodiment. The data is stored and retained in a RAM 740 shown in FIG. 7.

The local characteristic quantity generating data 500 stores, in association with an input image ID 501, a plurality of detected characteristic points 502, characteristic point coordinates 503, and local area information 504 corresponding to the characteristic points. In addition, a plurality of sub area IDs 505, sub area information 506, a characteristic vector 507 corresponding to each sub area, and a selected dimension 508 including a priority are stored in association with each detected characteristic point 502, each characteristic point coordinate 503, and each piece of local area information 504.

A local characteristic quantity 509 generated with respect to each detected characteristic point 502 from the data described above is stored.

(Local Characteristic Quantity DB)

Figure 6:
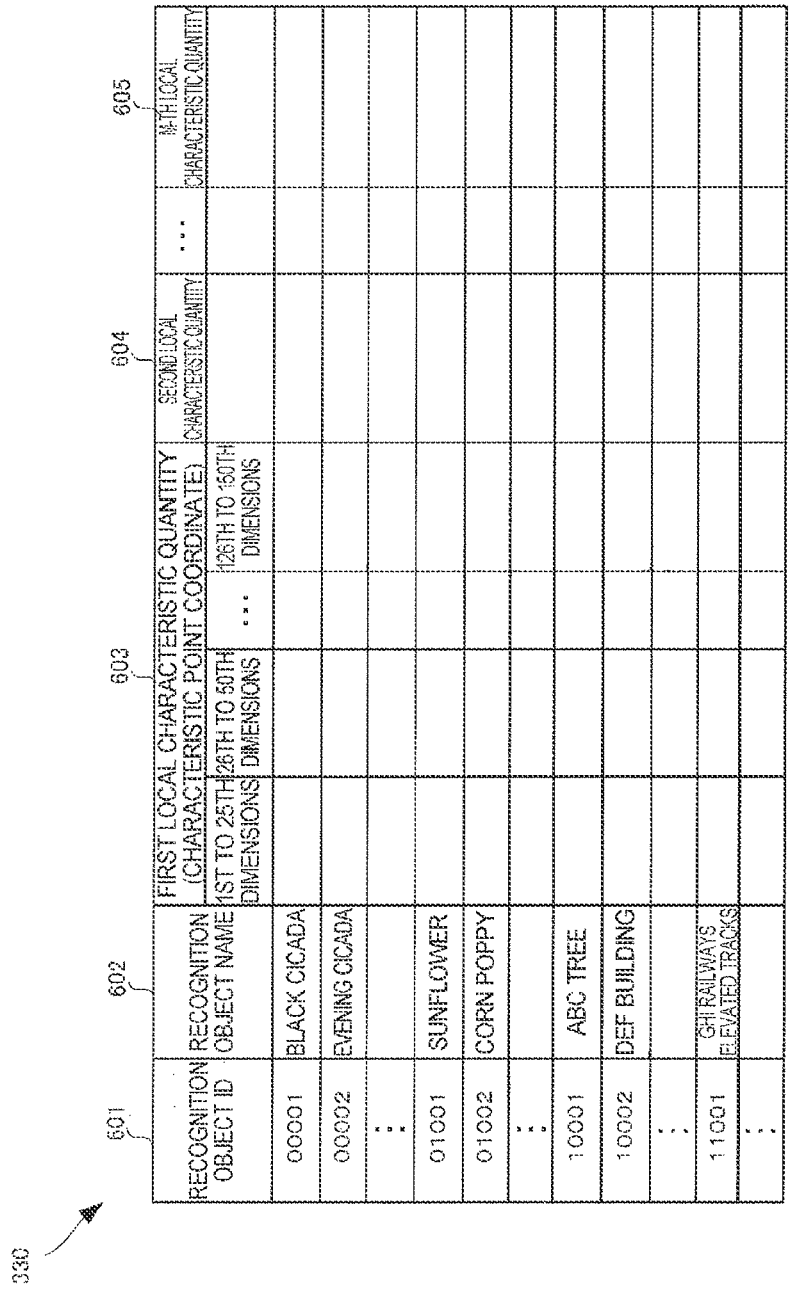
FIG. 6 is a diagram showing a configuration of a local characteristic quantity DB according to the second embodiment of the present invention.

FIG. 6 is a diagram showing a configuration of the local characteristic quantity DB 330 according to the present embodiment.

The local characteristic quantity DB 330 stores a first local characteristic quantity 603, a second local characteristic quantity 604, . . . , and an m-th local characteristic quantity 605 in association with a recognition object ID 601 and a recognition object name 602. The respective local characteristic quantities store characteristic vectors constituted by 1-dimensional to 150-dimensional components that are hierarchized every 25 dimensions in correspondence with 5×5 sub areas shown in FIG. 4F.

Moreover, m denotes a positive integer and may be a number that differs according to the recognition object. In addition, in the present embodiment, a characteristic point coordinate used for a comparing process is stored together with each local characteristic quantity.

<<Hardware Configuration of Video Processing Device>>

Figure 7:
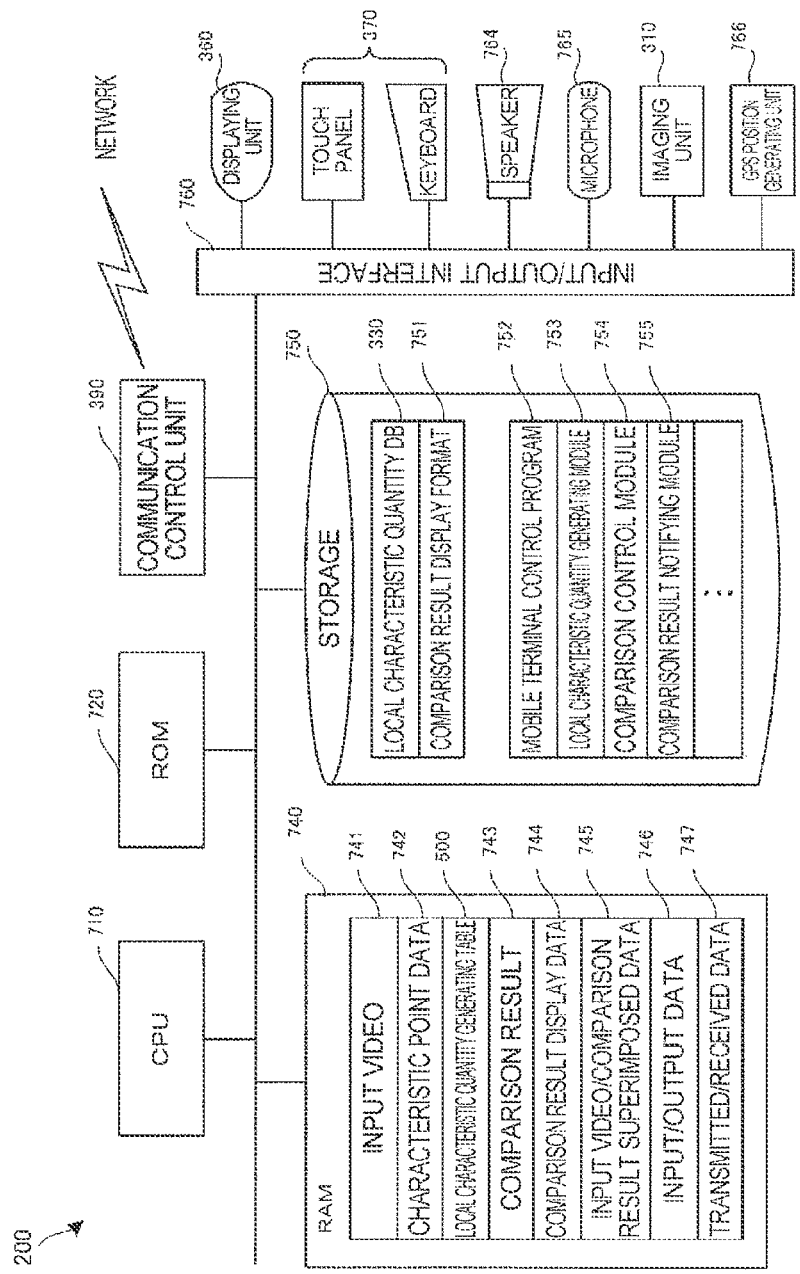
FIG. 7 is a block diagram showing a hardware configuration of a video processing device according to the second embodiment of the present invention.

FIG. 7 is a block diagram showing a hardware configuration of the video processing device 200 according to the present embodiment.

In FIG. 7, a CPU 710 is an arithmetic control processor which realizes respective functional components of a video processing device 200 that is a mobile terminal by executing a program. A ROM 720 stores initial data, fixed data of the program and the like, and the program. In addition, the communication control unit 390 is a communication control unit which, in the present embodiment, communicates with other devices via a network. Moreover, the CPU 710 is not limited to one unit. Alternatively, a plurality of CPUs may be provided or a GPU (Graphics Processing Unit) for image processing may be provided.

A RAM 740 is a random access memory used by the CPU 710 as a work area for temporary storage. An area for storing data necessary to realize the present embodiment is secured in the RAM 740. An input video 741 represents an area for storing an input video captured and inputted by the imaging unit 310. Characteristic point data 742 represents an area for storing characteristic point data which is detected from the input video 741 and which includes a characteristic point coordinate, a scale, and an angle. A local characteristic quantity generating table 500 represents an area for storing the local characteristic quantity generating table shown in FIG. 5.

A comparison result 743 represents an area for storing a comparison result that is recognized by a comparison between a local characteristic quantity generated from an input image and a local characteristic quantity stored in the local characteristic quantity DB 330. Comparison result display data 744 represents an area for storing comparison result display data for notifying the comparison result 743 to the user. Moreover, when audio output is to be provided, comparison result audio data may be included. Input video/comparison result superimposed data 745 represents an area for storing input video/comparison result superimposed data which is obtained by superimposing the comparison result 743 on the input video 741 and which is displayed on the displaying unit 360. Input/output data 746 represents an area for storing input/output data that is inputted and outputted via an input/output interface 760. Transmitted/received data 747 represents an area for storing transmitted/received data that is transmitted and received via the communication control unit 390.

A storage 750 stores databases and various parameters as well as the following data and programs necessary for realizing the present embodiment. The local characteristic quantity DB 330 represents an area for storing the local characteristic quantity DB shown in FIG. 6. A comparison result display format 751 represents an area for storing a comparison result display format used to generate a format for displaying a comparison result.

The storage 750 stores the following program. A mobile terminal control program 752 represents an area for storing a mobile terminal control program that controls the entire present video processing device 200. A local characteristic quantity generating module 753 represents an area for storing a local characteristic quantity generating module that generates a local characteristic quantity according to FIGS. 4B to 4F from an input video in the mobile terminal control program 752. A comparison control module 754 represents an area for storing a comparison control module that compares a local characteristic quantity generated from an input video and a local characteristic quantity stored in the local characteristic quantity DB 330 with each other in the mobile terminal control program 752. A comparison result notifying module 755 represents an area for storing a comparison result notifying module that notifies a comparison result to the user by display or audio.

The input/output interface 760 provides an interface between input and output devices with respect to input/output data. The displaying unit 360, a touch panel or a keyboard that constitutes the operating unit 370, a speaker 764, a microphone 765, and the imaging unit 310 are connected to the input/output interface 760. Examples of input/output devices are not limited to those mentioned above. In addition, a GPS (Global Positioning System) position generating unit 766 acquires a current position based on a signal from a GPS satellite.

Moreover, FIG. 7 only shows data and a program essential to the present embodiment and does not illustrate data and programs unrelated to the present embodiment.

<<Processing Procedure of Video Processing Device>>

Figure 8:
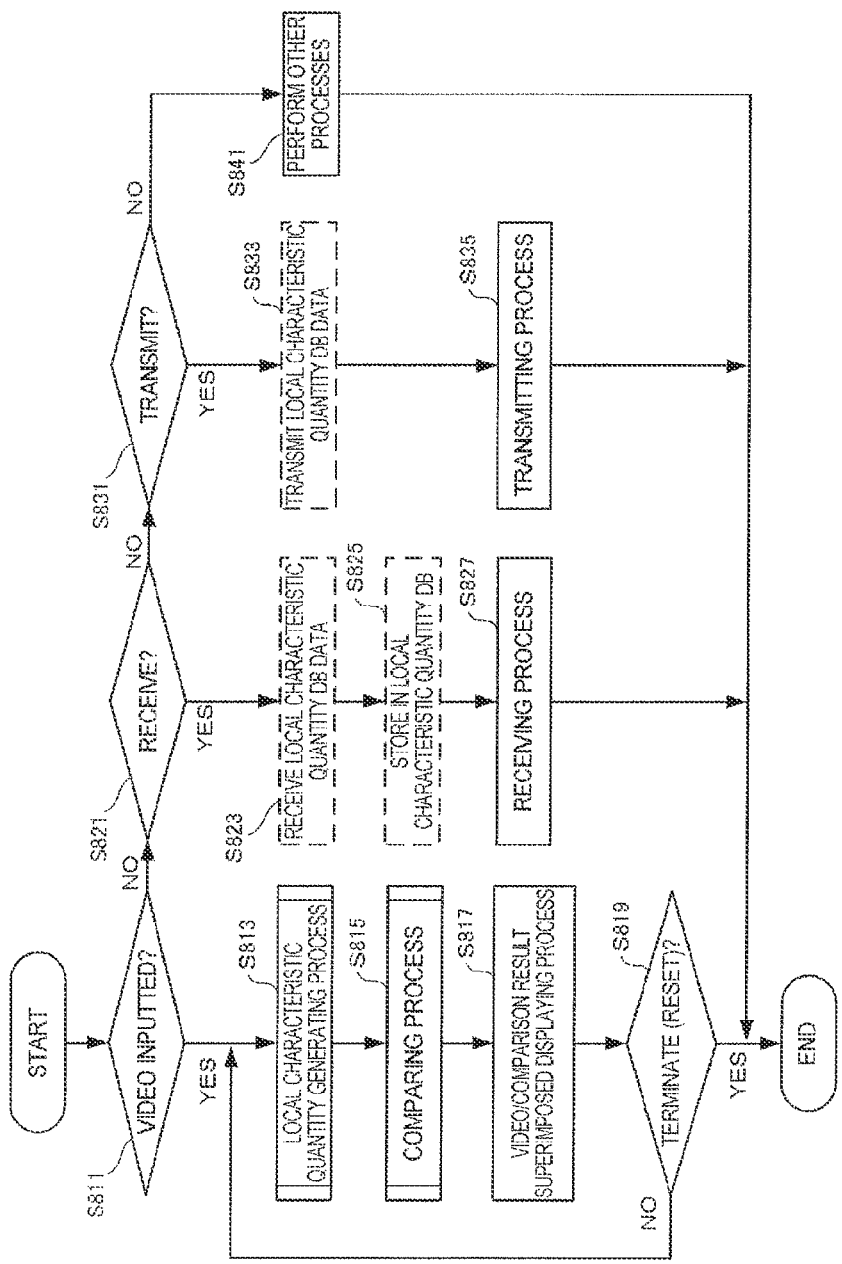
FIG. 8 is a flow chart showing a processing procedure of the video processing device according to the second embodiment of the present invention.

FIG. 8 is a flow chart showing a processing procedure of the video processing device 200 according to the present embodiment. The flow chart is executed by the CPU 710 using the RAM 740, both shown in FIG. 7, to realize the respective functional components shown in FIG. 3.

First, in step S811, a determination is made regarding whether or not a video has been inputted to perform object recognition. In addition, as a function of the mobile terminal, reception is determined in step S821 and transmission is determined in step S831. When neither determination is positive, other processes are performed in step S841.

Figure 9A:
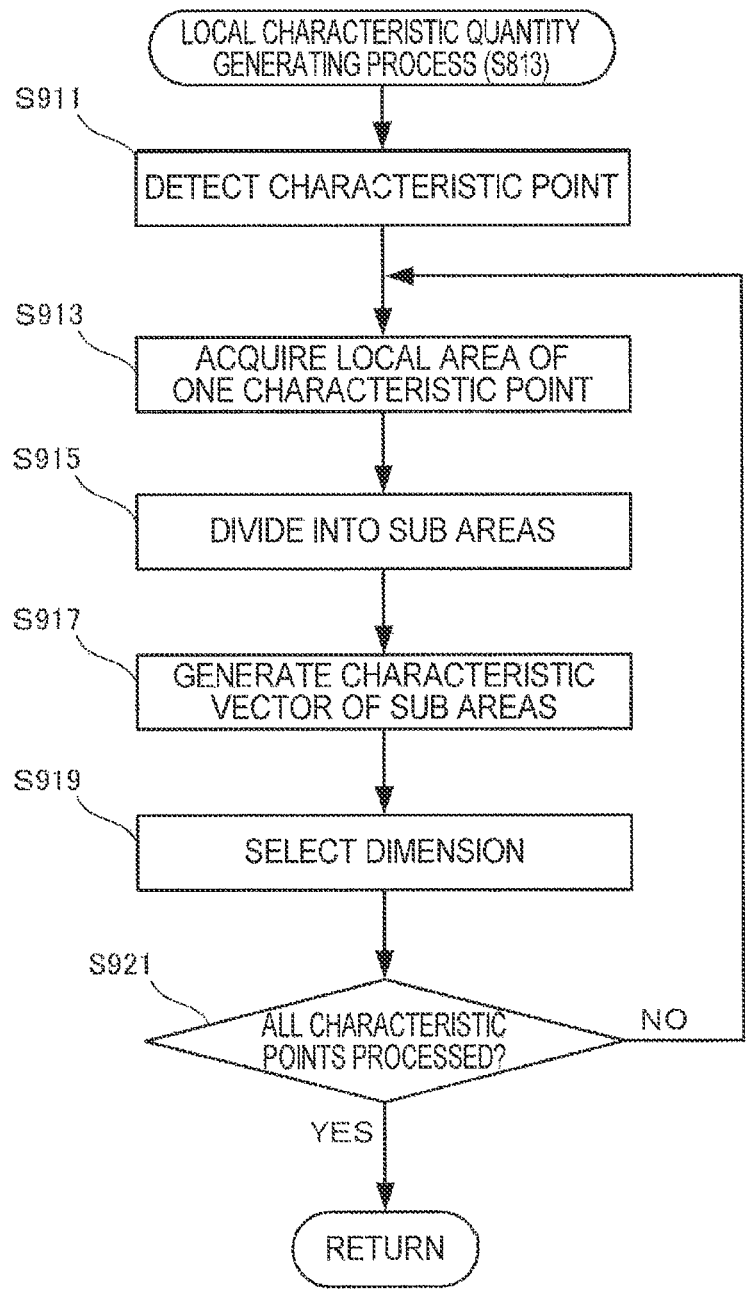
FIG. 9A is a flow chart showing a processing procedure of a local characteristic quantity generating process according to the second embodiment of the present invention.

When a video has been inputted, processing proceeds to step S813 to execute a local characteristic quantity generating process from the input video (refer to FIG. 9A). Next, in step S815, a comparing process is executed (refer to FIG. 9B). In step S817, a result of the comparing process is superimposed on the input video to execute a video/comparison result superimposed displaying process. In step S819, a determination is made regarding whether or not the process for performing object recognition is to be terminated. Termination is performed using, for example, a reset button in the instructing button display area 212 shown in FIG. 2. If not to be terminated, a return is made to step S813 to repeat object recognition of a video input.

In the case of reception and when data for a local characteristic quantity DB is to be downloaded, local characteristic quantity DB data is received in step S823 and stored in the local characteristic quantity DB in step S825. On the other hand, in the case of other kinds of data reception as a mobile terminal, in step S827, a receiving process is performed. Meanwhile, in the case of transmission and when data for the local characteristic quantity DB is to be uploaded, in step S833, the local characteristic quantity generated from the input video is transmitted as local characteristic quantity DB data. On the other hand, in the case of other kinds of data transmission as a mobile terminal, in step S835, a transmitting process is performed. Since data transmitting/receiving processes as a mobile terminal are not features of the present embodiment, a detailed description thereof will be omitted.

(Local Characteristic Quantity Generating Process)

FIG. 9A is a flow chart showing a processing procedure of the local characteristic quantity generating process S813 according to the present embodiment.

First, in step S911, a position coordinate, a scale, and an angle of characteristic points are detected from an input video. In step S913, a local area is acquired with respect to one of the characteristic points detected in step S911. Next, in step S915, the local area is divided into sub areas. In step S917, characteristic vectors of each sub area are generated to generate a characteristic vector of the local area. Processes from steps S911 to S917 are illustrated in FIG. 4B.

Next, in step S919, dimension selection is executed with respect to the characteristic vector of the local area generated in step S917. Dimension selection is illustrated in FIGS. 4D to 4F.

In step S921, a determination is made regarding whether or not local characteristic quantity generation and dimension selection have been completed with respect to all characteristic points detected in step S911. If not, a return is made to step S913 to repeat the processing on a next characteristic point.

(Comparing Process)

Figure 9B:
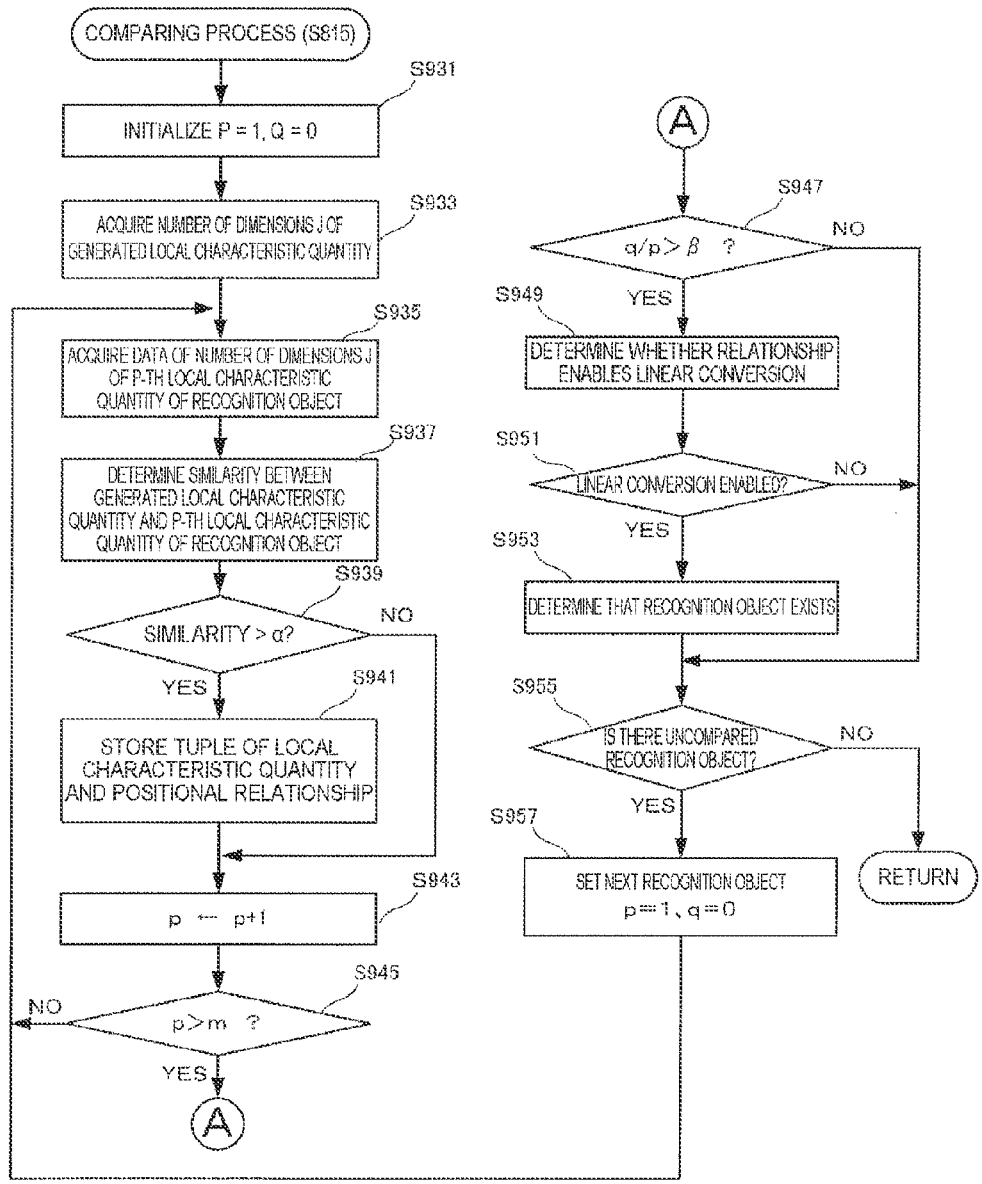
FIG. 9B is a flow chart showing a processing procedure of comparison processing according to the second embodiment of the present invention.

FIG. 9B is a flow chart showing a processing procedure of the comparing process S815 according to the present embodiment.

First, in step S931, parameters p=1 and q=0 are set as initialization. Next, in step S933, the number of dimensions j of local characteristic quantities generated in step S813 is acquired.

In a loop including steps S935 to S945, comparison of each local characteristic quantity is repeated until p>m (where m=the number of characteristic points of a recognition object) is satisfied. First, in step S935, data of number of dimensions j of a p-th local characteristic quantity of a recognition object stored in the local characteristic quantity DB 330 is acquired. In other words, a first 1 to j dimensions are acquired. Next, in step S937, the p-th local characteristic quantity acquired in step S935 and local characteristic quantities of all characteristic points generated from an input video are sequentially compared, and a determination of whether the local characteristic quantities are similar or not is made. In step S939, a determination is made regarding whether or not a similarity exceeds a threshold $\alpha$ based on a result of the comparison between local characteristic quantities, and when the similarity exceeds the threshold $\alpha$, in step S941, a tuple constituted by the local characteristic quantity and a positional relationship of characteristic points that match between the input image and the recognition object is stored. In addition, q that is a parameter representing the number of matched characteristic points is counted up by 1. In step S943, a characteristic point of the recognition object is advanced to a next characteristic point (p←p+1), and when comparison of all characteristic points of the recognition object is not completed (p≤m), a return is made to step S935 to repeat comparison of matching local characteristic quantities. Moreover, the threshold $\alpha$ may be modified in correspondence with a recognition accuracy that is required by the recognition object. In the case of a recognition object with a low correlation with other recognition objects, accurate recognition can be performed even when a low recognition accuracy is set.

Once comparison with all characteristic points of the recognition object is completed, processing proceeds from step S945 to S947. In steps S947 to S953, a determination is made regarding whether or not the recognition object exists in an input video. First, in step S947, a determination is made regarding whether or not a proportion of the number of characteristic points q matching the local characteristic quantities of characteristic points in the input video among the number of characteristic points p of the recognition object exceeds a threshold $\beta$. If so, processing proceeds to step S949 to further determine, as a recognition object candidate, whether or not a positional relationship between the characteristic points of the input video and the characteristic points of the recognition object is a relationship that enables linear conversion. In other words, a determination is made regarding whether a positional relationship between the characteristic points of the input video and the characteristic points of the recognition object which is stored in step S941 as a match among local characteristic quantities is a relationship that is maintained even after changes such as rotation, inversion, viewpoint position alteration, or the like are made or a relationship that is not maintained after such changes. Since methods of making such a determination are geometrically known, a detailed description thereof will be omitted. In step S951, depending on a result of the determination of whether or not linear conversion is enabled, if linear conversion can be performed, processing proceeds to step S953 to determine that the compared recognition object exists in the input video. Moreover, the threshold $\beta$ may be modified in correspondence with a recognition accuracy that is required by the recognition object. In this case, when the recognition object has a low correlation with other recognition objects or when characteristics of the recognition object can be determined even from one portion of the recognition object, accurate recognition can be performed even when the number of matching characteristic points is small. In other words, even if one portion is hidden from view or as long as one characteristic portion is in view, the object can be recognized.

In step S955, a determination is made regarding whether or not uncompared recognition objects remain in the local characteristic quantity DB 330. When uncompared recognition objects remain, in step S957, a next recognition object is set and parameters are initialized to p=1 and q=0, and a return is made to S935 to repeat comparison.

Moreover, as is apparent from the description of the comparing process given above, a process involving storing recognition objects of all fields in the local characteristic quantity DB 330 and comparing all of the recognition objects with a mobile terminal results in a significantly large processing load. In consideration thereof, for example, the user may conceivably select a field of an object from a menu before performing object recognition from an input video and perform comparison by retrieving the selected field from the local characteristic quantity DB 330. Alternatively, the processing load can also be reduced by downloading only local characteristic quantities of a field used by the user (in the example shown in FIG. 2, animals and flowers, insects and plants, architectural structures, and the like) into the local characteristic quantity DB 330.

Third Embodiment

Next, a video processing device according to a third embodiment of the present invention will be described. A mobile terminal as the video processing device according to the present embodiment differs from that of the second embodiment in that, in addition to a name of a recognition object, related information thereof is also notified. Since other configurations and operations are similar to those of the second embodiment, similar configurations and operations will be denoted using similar reference characters and a description thereof will be omitted.

According to the present embodiment, when the user is viewing a video, a recognition result and related information with respect to an object in the video can be notified to the user in the video in real time while maintaining recognition accuracy.

<<Video Processing According to Present Embodiment>>

Figure 10:
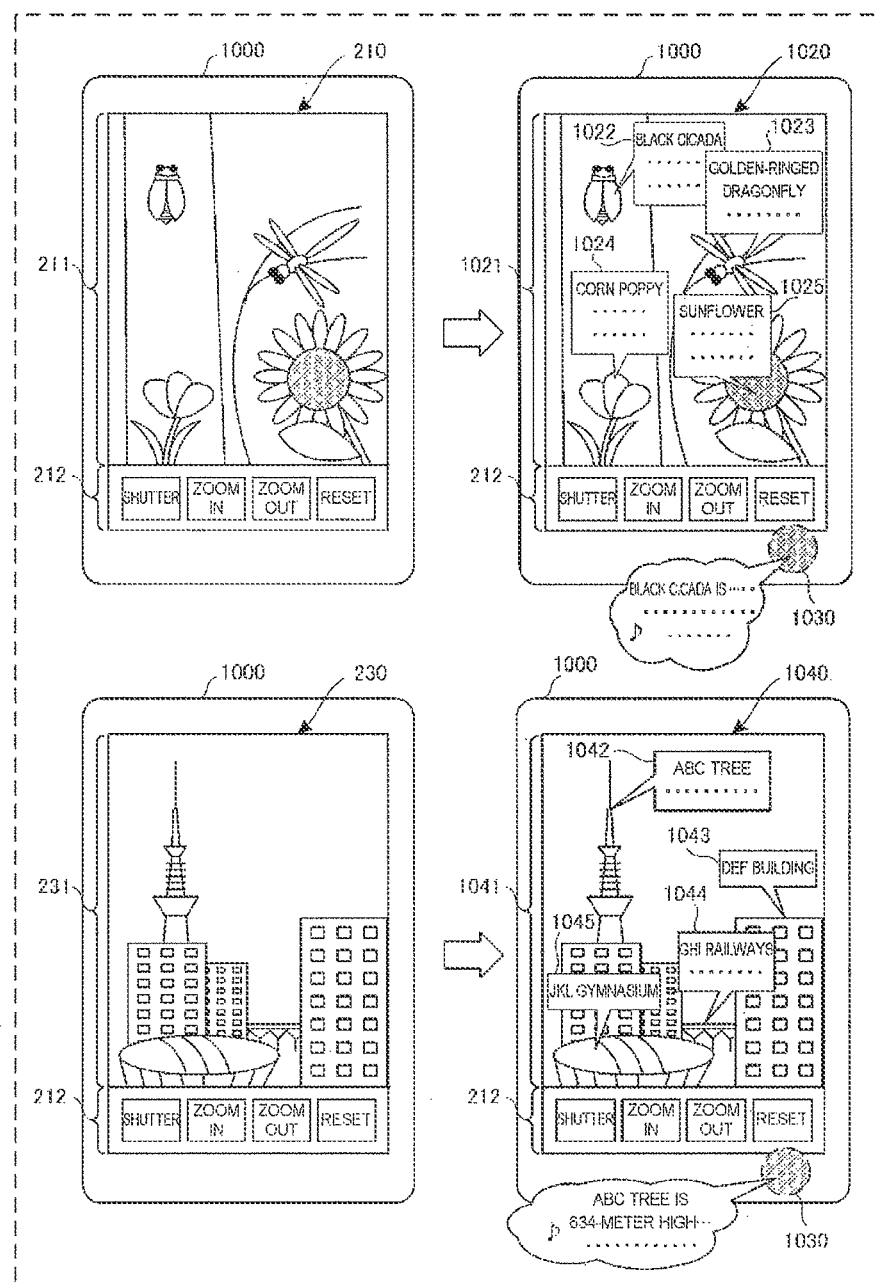
FIG. 10 is a diagram describing video processing by a video processing device according to a third embodiment of the present invention.

FIG. 10 is a diagram illustrating video processing by a video processing device 1000 according to the present embodiment. Moreover, since an input video is similar to that in FIG. 2 according to the second embodiment, similar components will be denoted by similar reference numerals and a description thereof will be omitted.

First, an upper half of the diagram shows an example in which children playing in the fields capture a video of animals and plants with a mobile terminal, insects and flowers that exist in the video are recognized in real time, and related information such as explanations of the insects and flowers that are recognition objects is displayed together with names of the insects and flowers. In the present embodiment, a real-time recognizing process is performed on the displayed video and names and related information 1022 to 1025 of the respective insects and flowers are displayed in a video display area 1021 in a right display screen 1020. Alternatively, in FIG. 10, an explanation may be audibly outputted from an audio generating unit 1030 that is a speaker. The children can find out the names as well as related information such as an explanation of animals and plants in a natural setting without having to collect the animals and plants and look at a field guide or the like at home or without having to carry the field guide out into the field. Moreover, the present embodiment is not limited to animals and plants and can also be applied to non-biological natural material such as minerals or artificial material such as vehicles.

A lower half of the diagram shows an example in which the user such as a tourist captures a video including a recognition object with a mobile terminal when desiring to find out about an architectural structure such as a tower or a building in a field of view or desiring to find out about a destination or a current position of the user. In the present embodiment, a real-time recognizing process is performed on the displayed video, and names and related information such as explanations 1042 to 1045 of the respective architectural structures are displayed in a video display area 1041 in a right display screen 1040. In a similar manner to the upper half, an explanation may be audibly outputted from the audio generating unit 1030 that is a speaker. From the video display area 1041, for example, the user is able to find out about a destination or a current position of the user even without tourist guidance.

<<Functional Configuration of Video Processing Device>>

Figure 11:
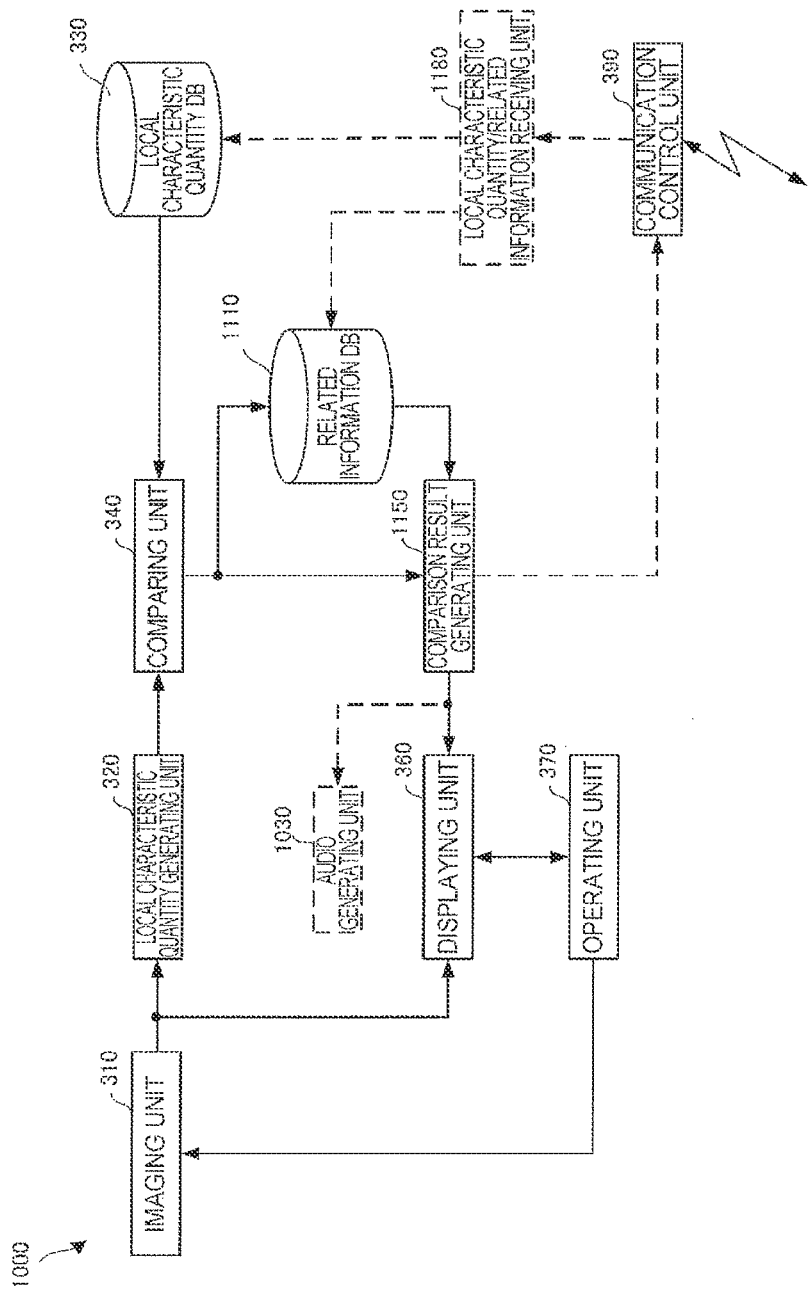
FIG. 11 is a block diagram showing a functional configuration of the video processing device according to the third embodiment of the present invention.

FIG. 11 is a block diagram showing a functional configuration of the video processing device 1000 according to the present embodiment. Moreover, since the functional configuration of the video processing device 1000 is a configuration obtained by adding a configuration for displaying related information to the video processing device 200 according to the second embodiment, similar components will be denoted by similar reference numerals and a description thereof will be omitted.

The video processing device 1000 includes a related information DB 1110 that is a related information storing unit for storing related information (refer to FIG. 12). In accordance with a comparison result of the comparing unit 340, related information retrieved from the related information DB 1110 is used together with a recognition object name of the comparison result by a comparison result generating unit 1150 to generate notification information to be displayed on the displaying unit 360. In addition, if audio output is available, the notification information is outputted from the audio generating unit 1030. Alternatively, a configuration may be adopted in which the related information stored in the related information DB 1110 is downloaded via the communication control unit 390 and received by a local characteristic quantity/related information receiving unit 1180.

(Related Information DB)

FIG. 12 is a diagram showing a configuration of the related information DB 1110 according to the present embodiment.

The related information DB 1110 stores related display data 1203 and related audio data 1204 in association with a recognition object ID 1201 and a recognition object name 1202.

Moreover, while the related information DB 1110 is provided separate from the local characteristic quantity DB 330 in the present embodiment, the two DBs may be prepared as a single shared DB.

Fourth Embodiment

Next, a video processing device according to a fourth embodiment of the present invention will be described. The video processing device according to the present embodiment differs from the second embodiment described above in providing link information that enables access to information related to a recognition object of a recognition result. Since other configurations and operations are similar to those of the second embodiment, similar configurations and operations will be denoted using similar reference characters and a description thereof will be omitted.

According to the present embodiment, when the user is viewing a video, a recognition result and link information with respect to an object in the video can be notified to the user in the video in real time while maintaining recognition accuracy.

Moreover, while an example in which link information is displayed and access is started upon receiving an instruction from the user will be shown in the present embodiment, a configuration in which a link destination is automatically accessed to provide the user with related information can also be readily realized.

<<Video Processing According to Present Embodiment>>

Figure 13:
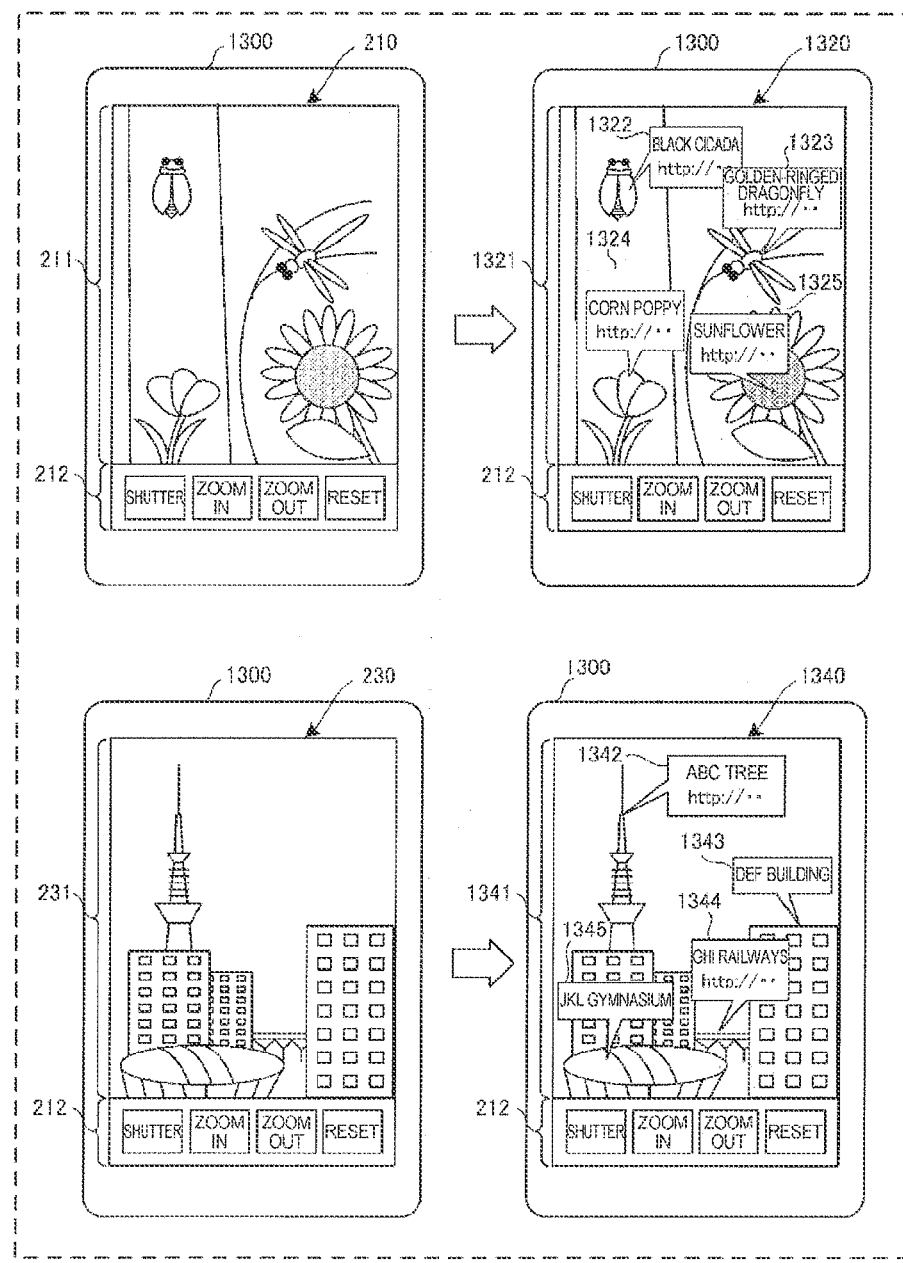
FIG. 13 is a diagram describing video processing by a video processing device according to a fourth embodiment of the present invention.

FIG. 13 is a diagram illustrating video processing by a video processing device 1300 according to the present embodiment. Moreover, since an input video is similar to that in FIG. 2 according to the second embodiment, similar components will be denoted by similar reference numerals and a description thereof will be omitted.

First, an upper half of FIG. 13 shows an example in which children playing in the fields capture a video of animals and plants with a mobile terminal, insects and flowers that exist in the video are recognized in real time, and link information (such as a URL (Uniform Resource Locator) address) that enables access to related information such as explanations of the insects and flowers that are recognition objects is displayed together with names of the insects and flowers. In the present embodiment, a real-time recognizing process is performed on the displayed video and names and link information 1322 to 1325 of the respective insects and flowers are displayed in a video display area 1321 in a right display screen 1320. The children can find out the names of animals and plants in a natural setting without having to collect the animals and plants in the natural setting and look at a field guide or the like at home or without having to carry the field guide out into the field. In addition, by touching the link information, related information can be downloaded. Moreover, the present embodiment is not limited to animals and plants and can also be applied to non-biological natural material such as minerals or artificial material such as vehicles.

A lower half of FIG. 13 shows an example in which the user such as a tourist captures a video including a recognition object with a mobile terminal when desiring to find out about an architectural structure such as a tower or a building in a field of view or desiring to find out about a destination or a current position of the user. In the present embodiment, a real-time recognizing process is performed on the displayed video and names and link information 1342 to 1345 of the respective architectural structures are displayed in a video display area 1341 in a right display screen 1340. From the video display area 1341, for example, the user is able to find out about a destination or a current position of the user even without tourist guidance.

<<Functional Configuration of Video Processing Device>>

Figure 14:
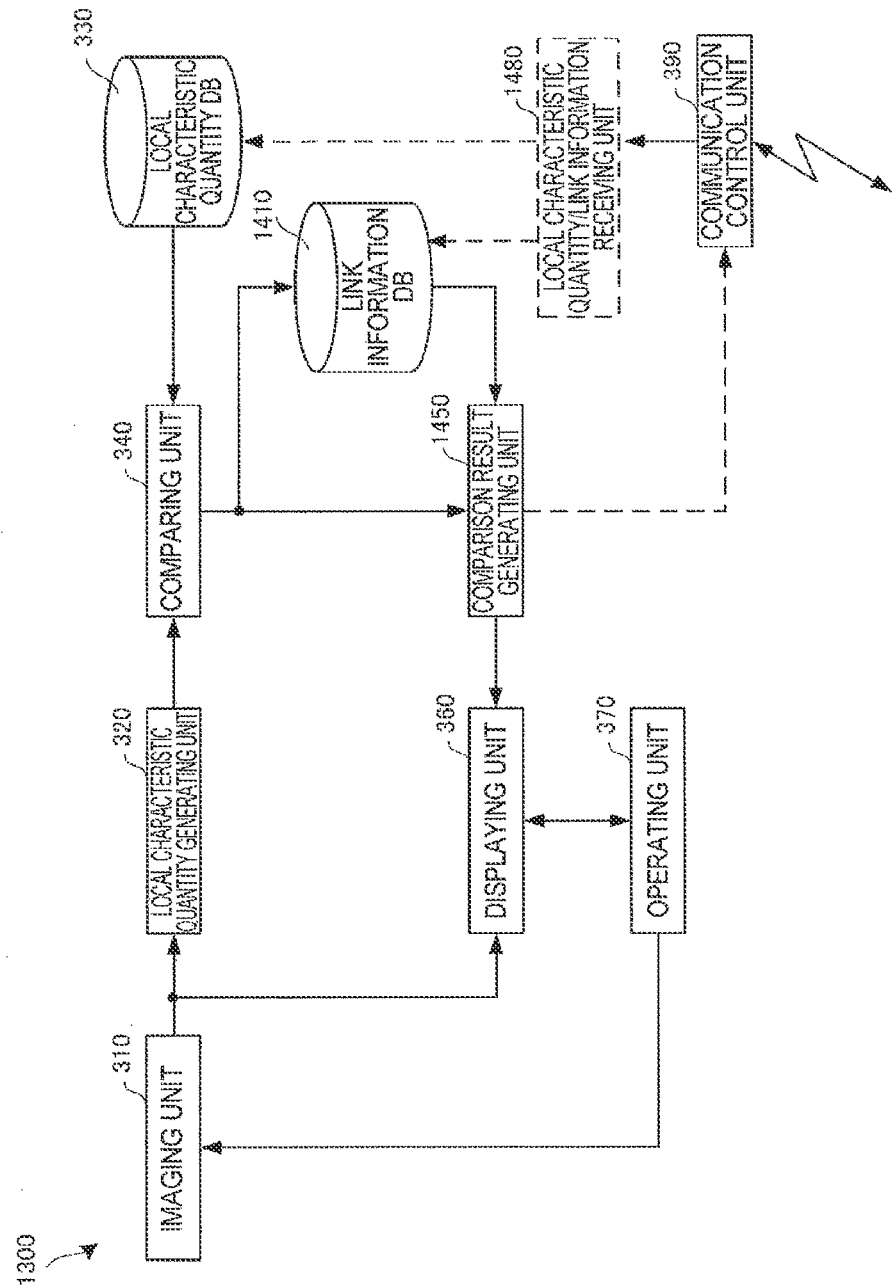
FIG. 14 is a block diagram showing a functional configuration of the video processing device according to the fourth embodiment of the present invention.

FIG. 14 is a block diagram showing a functional configuration of the video processing device 1300 according to the present embodiment. Moreover, since the functional configuration of the video processing device 1300 is a configuration obtained by adding a configuration for displaying related information to the video processing device 200 according to the second embodiment, similar components will be denoted by similar reference numerals and a description thereof will be omitted.

Figure 15:
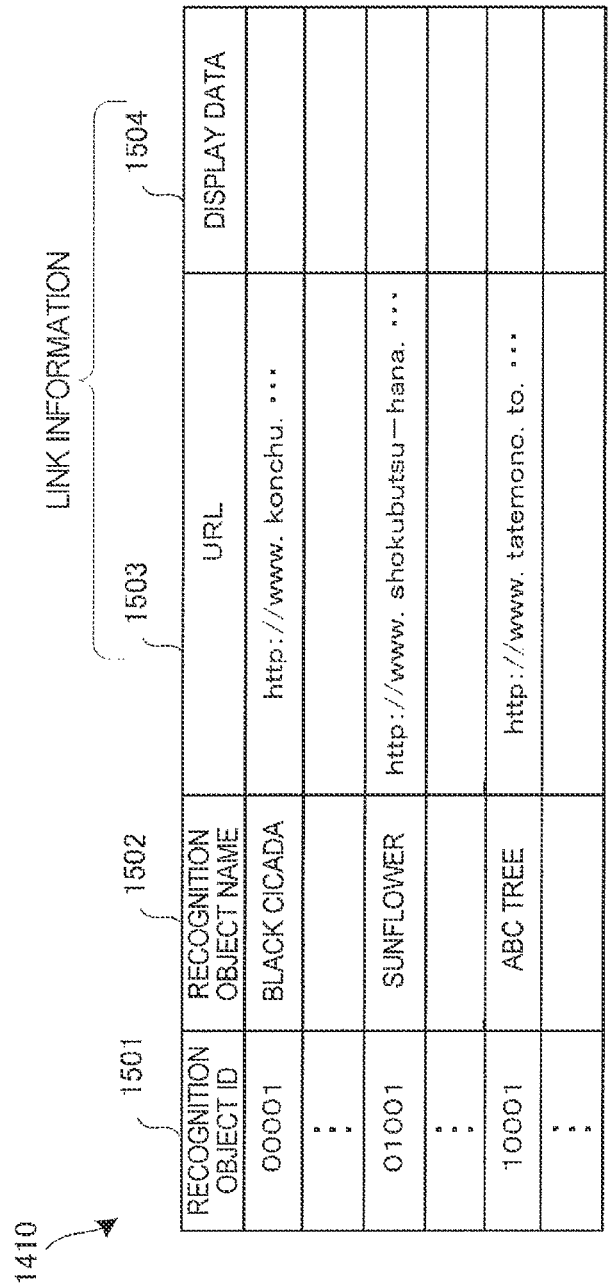
FIG. 15 is a diagram showing a configuration of a link information DB according to the third embodiment of the present invention.

The video processing device 1300 includes a link information DB 1410 that is a link information storing unit for storing related information (refer to FIG. 15). In accordance with a comparison result of the comparing unit 340, link information retrieved from the link information DB 1410 is used together with a recognition object name of the comparison result by a comparison result generating unit 1450 to generate notification information to be displayed on the displaying unit 360.

Alternatively, a configuration may be adopted in which the link information stored in the link information DB 1410 is downloaded via the communication control unit 390 and received by a local characteristic quantity/link information receiving unit 1480.

(Link Information DB)

FIG. 15 is a diagram showing a configuration of the link information DB 1410 according to the present embodiment.

The link information DB 1410 stores, for example, a URL 1503 and display data 1504 as link information in association with a recognition object ID 1501 and a recognition object name 1502.

Moreover, while the link information DB 1410 is provided separate from the local characteristic quantity DB 330 in the present embodiment, the two DBs may be prepared as a single shared DB.

Fifth Embodiment

Next, a video processing system according to a fifth embodiment of the present invention will be described. The video processing system according to the present embodiment differs from the second to fourth embodiments described above in that a mobile terminal generates a local characteristic quantity of a video and transmits the local characteristic quantity to a server and receives a recognition result of a recognition object recognized by the server. With respect to communication between a mobile terminal and a server in the present embodiment, a reduction in capacity with respect to local characteristic quantity generation according to the present embodiment is enabled in real-time processing.

According to the present embodiment, a processing load on a mobile terminal can be reduced, and when the user is viewing a video, a recognition result or link information with respect to an object in the video can be notified to the user in the video in real time while maintaining recognition accuracy.

<<Video Processing According to Present Embodiment>>

Figure 16:
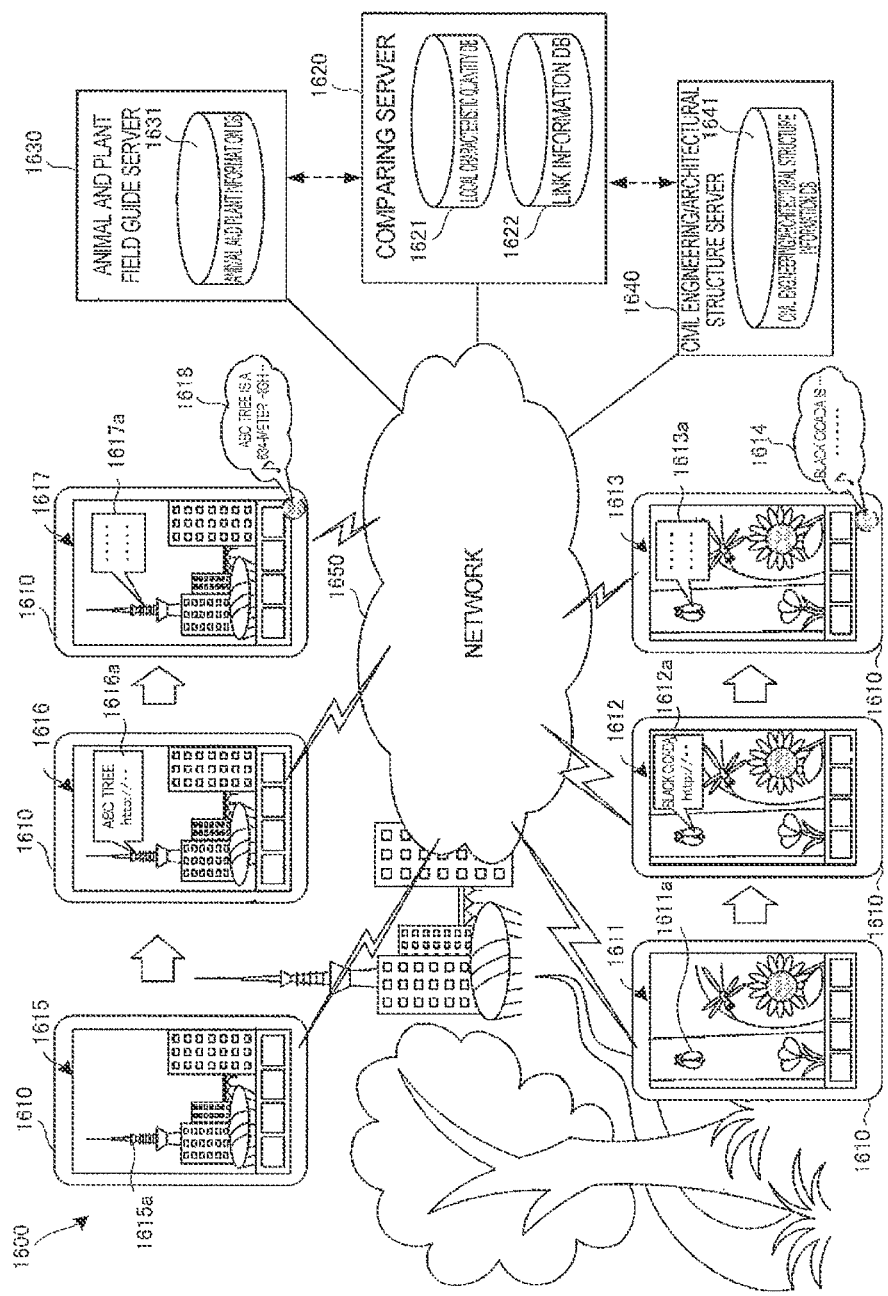
FIG. 16 is a diagram describing video processing by a video processing system according to a fifth embodiment of the present invention.

FIG. 16 is a diagram illustrating video processing by a video processing system 1600 according to the present embodiment.

Unlike the video processing devices that are mobile terminals described in the second to fourth embodiments, the video processing system 1600 does not perform video input, a local characteristic quantity generating process, and a comparing process in a self-contained manner. In other words, a video processing device 1610 that is a mobile terminal performs video input and a local characteristic quantity generating process, and a video processing device 1620 that is a comparing server connected by a network 1650 performs processes with heavy processing loads such as comparison. In such processes, a magnitude of a capacity of a local characteristic quantity to be transferred over the network 1650 affects comparison speed and communication traffic. Due to a reduction in capacity of a local characteristic quantity while retaining accuracy which is generated according to FIGS. 4A and 4F in the present embodiment, a superimposed display of object recognition in an input video and a recognition result on the input video can be performed in real time. Moreover, in the present embodiment, a superimposed display of object recognition in an input video and a recognition result on the input video can be performed speedier by further performing an encoding process.

The video processing system 1600 shown in FIG. 16 includes the video processing device 1610 that is a terminal device and the video processing device 1620 that is a comparing server connected to the video processing device 1610 via the network 1650. In addition, an animal and plant field guide server 1630 which retains information related to animals and plants and which is provided to the user by link information and a civil engineering/architectural structure server 1640 which retains information related to civil engineering and architectural structures and which is provided to the user by link information are also connected to the network 1650. Moreover, the information providing servers correspond to a display screen of the video processing device 1610 shown in FIG. 16 and are not limited to those described above.

The video processing device 1620 that is a comparing server includes a local characteristic quantity DB 1621 that is used for a comparing process and a link information DB 1622 that is used to provide link information. In addition, the animal and plant field guide server 1630 includes an animal and plant information DB 1631 and the civil engineering/architectural structure server 1640 includes a civil engineering/architectural structure information DB 1641.

FIG. 16 shows two processing examples of the video processing device 1610 that is a terminal device. However, these processing examples are not restrictive.

The video processing device 1610 in a lower half of the diagram represents an example in which children playing in the fields capture a video of animals and plants with a mobile terminal, insects and flowers that exist in the video are recognized in real time, and names and link information of the insects and flowers that are recognition objects are displayed. Display screens 1611 to 1613 represent a video input screen, a screen on which a recognition object name and link information are displayed in superposition, and a screen on which related information accessed from link information is displayed in superposition. In FIG. 16, an object 1611*a* on the display screen 1611 of the input video is recognized, while a recognition object name of "black cicada" and link information (URL) 1612*a* are displayed in superposition on the display screen 1612. In addition, by touching the link information (URL) 1612*a*, downloaded related information 1613*a* is displayed in superposition on the display screen 1613. At the same time, if audio information 1614 is available, the audio information 1614 is outputted from a speaker. The children can find out the names of animals and plants in a natural setting without having to collect the animals and plants in the natural setting and look at a field guide or the like at home or without having to carry the field guide out into the field. Moreover, the present embodiment is not limited to animals and plants and can also be applied to non-biological natural material such as minerals or artificial material such as vehicles.

Meanwhile, the video processing device 1610 in an upper half of the diagram shows an example in which the user such as a tourist captures a video including a recognition object with a mobile terminal when desiring to find out about an architectural structure such as a tower or a building in a field of view or desiring to find out about a destination or a current position of the user. Display screens 1615 to 1617 represent a video input screen, a screen on which a recognition object name and link information are displayed in superposition, and a screen on which related information accessed from link information is displayed in superposition, in FIG. 16, an object 1615*a* on the display screen 1615 of the input video is recognized, while a recognition object name of "ABC Tree" and link information (URL) 1616*a* are displayed in superposition on the display screen 1616. In addition, by touching the link information (URL) 1616*a*, downloaded related information 1617*a* is displayed in superposition on the display screen 1617. At the same time, if audio information 1618 is available, the audio information 1618 is outputted from a speaker.

From the display screen 1613, for example, the user is able to find out about a destination or a current position of the user even without tourist guidance.

Moreover, while recognition of single objects have respectively been described as representative examples for the sake of simplicity in FIG. 16, a plurality of objects in an input video are simultaneously recognized and displayed in superposition in real time as shown in FIGS. 2, 10, and 12.

<<Video Processing Procedure of Video Processing System>>

FIG. 17 is a sequence diagram showing a video processing procedure of the video processing system 1600 according to the present embodiment. Moreover, in step S1700, if required, applications related to the present embodiment are downloaded from a comparing server.

First, in step S1701, applications of the mobile terminal and the comparing server are activated and initialized. In step S1703, the mobile terminal captures a video using the imaging unit 310. Next, in step S1705, the mobile terminal generates a local characteristic quantity. In addition, in step S1707, the mobile terminal encodes the generated local characteristic quantity and a position coordinate of a characteristic point and, in step S1709, the encoded local characteristic quantity and position coordinate are transmitted to the comparing server via the network.

In step S1711, the comparing server recognizes an object in the video by comparing a local characteristic quantity of a recognition object in the local characteristic quantity DB 1621 with the received local characteristic quantity. Next, in step S1713, the comparing server refers to the link information DB 1622 and acquires link information corresponding to the recognition object. Subsequently, in step S1715, the recognition object name and the link information are transmitted to the mobile terminal.

In step S1717, the mobile terminal displays the received recognition object and the link information in superposition on the input video (corresponds to the display screen 1612 or 1616 in FIG. 16). In step S1719, a determination is made regarding whether or not a link destination has been specified by touching link information. When a link destination has been specified, processing proceeds to step S1721 to access a link destination server such as the animal and plant field guide server 1630 or the civil engineering/architectural structure server 1640 shown in FIG. 16 based on the recognition object ID.

In step S1723, the link destination server reads out recognition object-related information (a document, a sound, or an image) from a related information DB such as the animal and plant information DB 1631 or the civil engineering/architectural structure information DB 1641. Subsequently, in step S1725, the recognition object-related information is downloaded to the mobile terminal.

In step S1727, the mobile terminal notifies the object in the input video to the user by displaying the received recognition object-related information in superposition on the input video or by performing audio playback of the received recognition object-related information.

In the present embodiment, the series of processes described above is realized in real time and the user can view a recognition object name or related information being displayed on the input video.

<<Functional Configuration of Video Processing Device for Mobile Terminal>>

FIG. 18A is a block diagram showing a functional configuration of the video processing device 1620 for a mobile terminal according to the present embodiment. Moreover, since the functional configuration of the video processing device 1620 is a configuration obtained by removing the configuration related to a comparing process and, instead, adding a configuration for transmitting a local characteristic quantity and a configuration for receiving a comparison result with respect to the video processing device 200 according to the second embodiment, components similar to those in FIG. 3 will be denoted by similar reference numerals and a description thereof will be omitted.

Figure 18B:
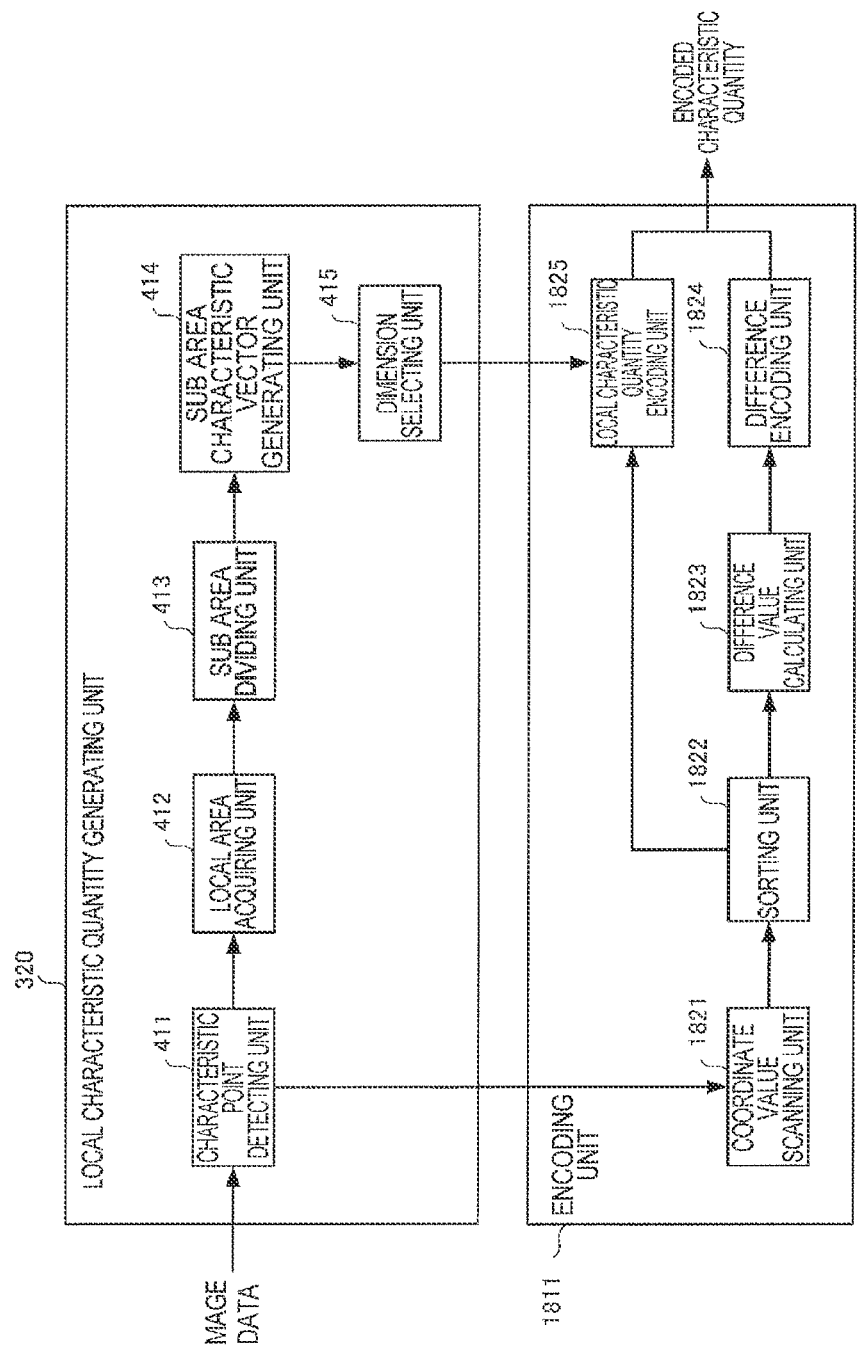
FIG. 18B is a block diagram showing a configuration of an encoding unit according to the fifth embodiment of the present invention.

A video processing device 1610 includes an encoding unit 1811 that encodes a local characteristic quantity and a characteristic point coordinate generated by the local characteristic quantity generating unit 320 in preparation of transmission of the local characteristic quantity and the characteristic point coordinate via the communication control unit 390 (refer to FIG. 18B). In addition, the video processing device 1610 includes a transmission data amount reducing unit 1812 that reduces a transmission data amount of a local characteristic quantity generated by the local characteristic quantity generating unit 320 while maintaining accuracy in addition to the reduction of the data amount of the local characteristic quantity by the dimension selecting unit 415 shown in FIG. 4A.

Meanwhile, the video processing device 1610 includes a recognition object receiving unit 1814 that receives a recognition object name or the like recognized by a comparing server and a link information receiving unit 1815 that receives link information from data received by a receiving unit 1813 via the communication control unit 390. In addition, the video processing device 1610 includes a recognition object-related information receiving unit 1816 that receives related information of the recognition object downloaded from a link destination server. A display screen generating unit 1817 generates a display screen that is superimposed on the input video based on data acquired by the respective acquiring units and displays the display screen on the displaying unit 360. In addition, when related information acquired by the recognition object-related information receiving unit 1816 includes audio data, the audio data is audibly generated by an audio generating unit 1818 and outputted from the speaker 764.

(Encoding Unit)

Figure 18D:
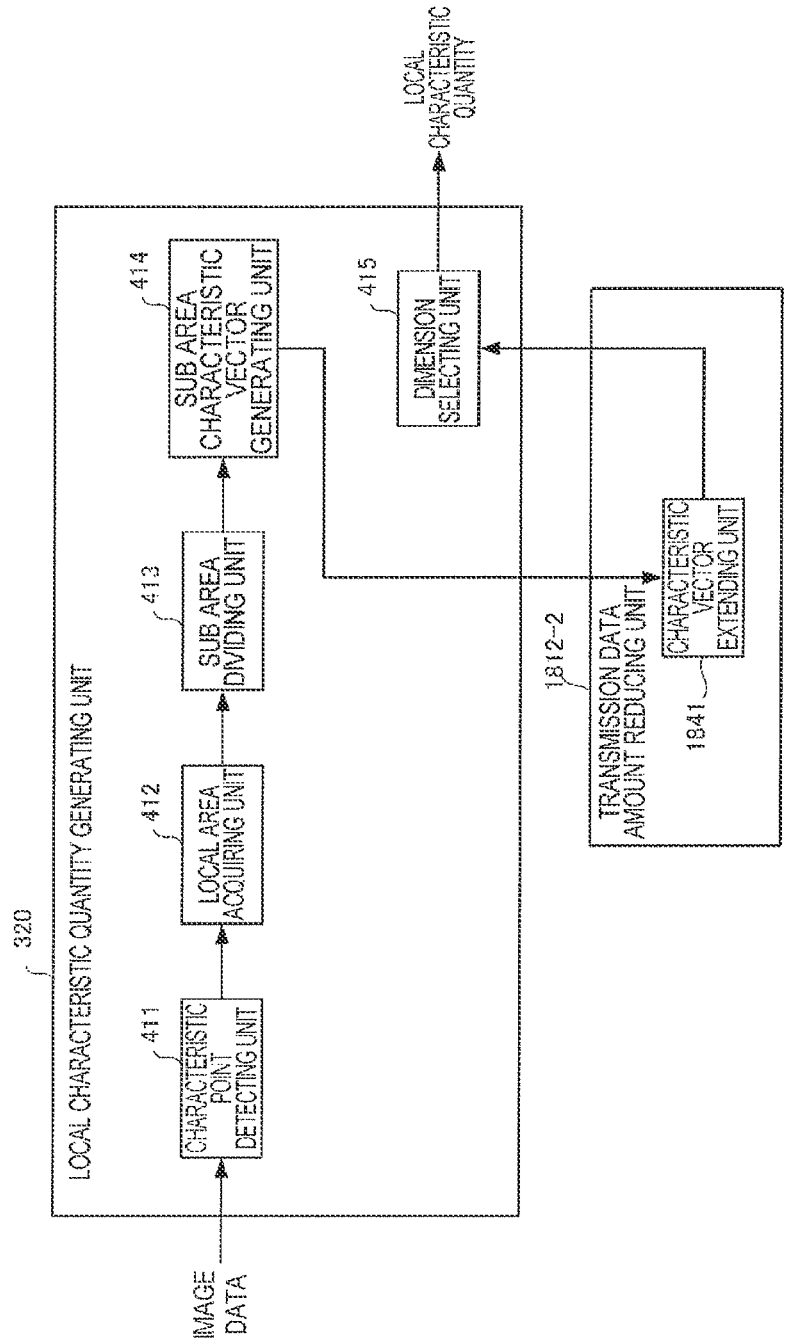
FIG. 18D is a block diagram showing a second configuration of the transmission data amount reducing unit according to the fifth embodiment of the present invention.
Figure 18E:
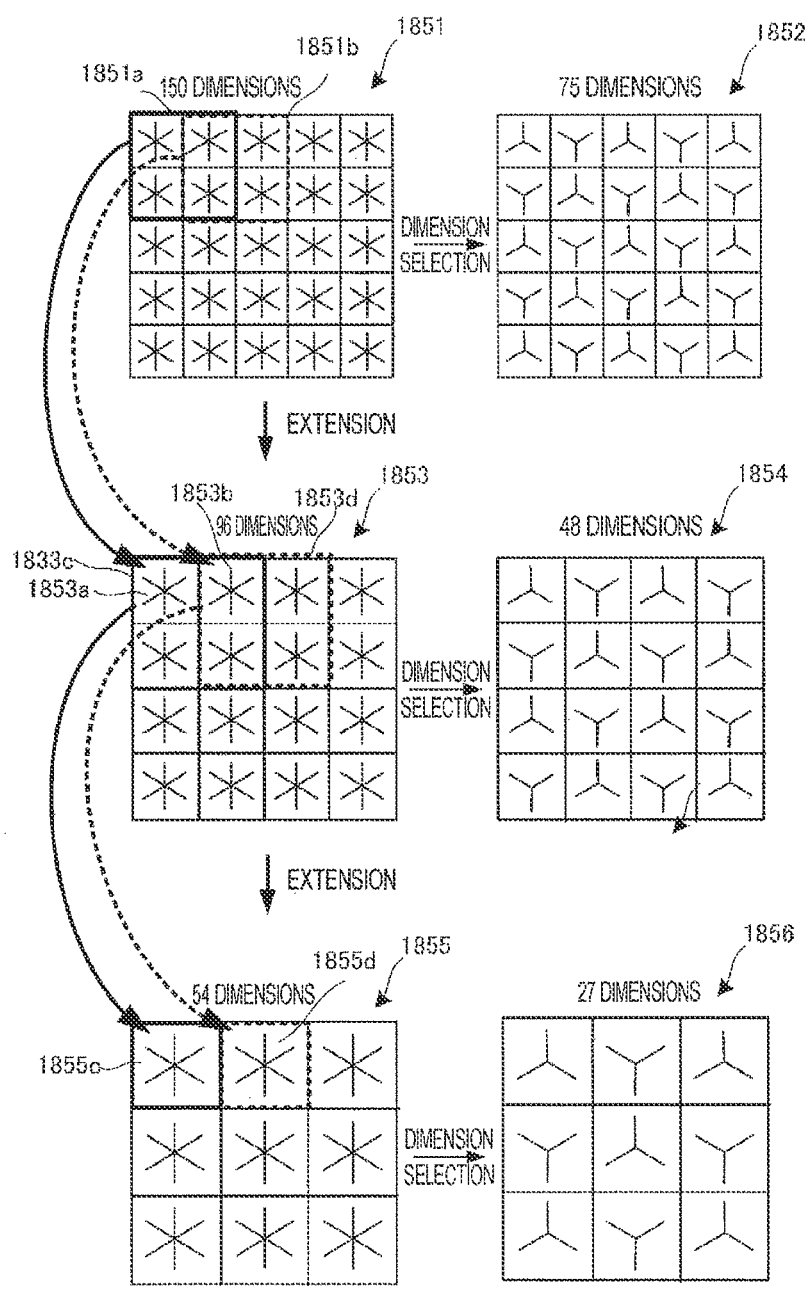
FIG. 18E is a diagram illustrating processes performed by the second configuration of the transmission data amount reducing unit according to the fifth embodiment of the present invention.
Figure 18G:
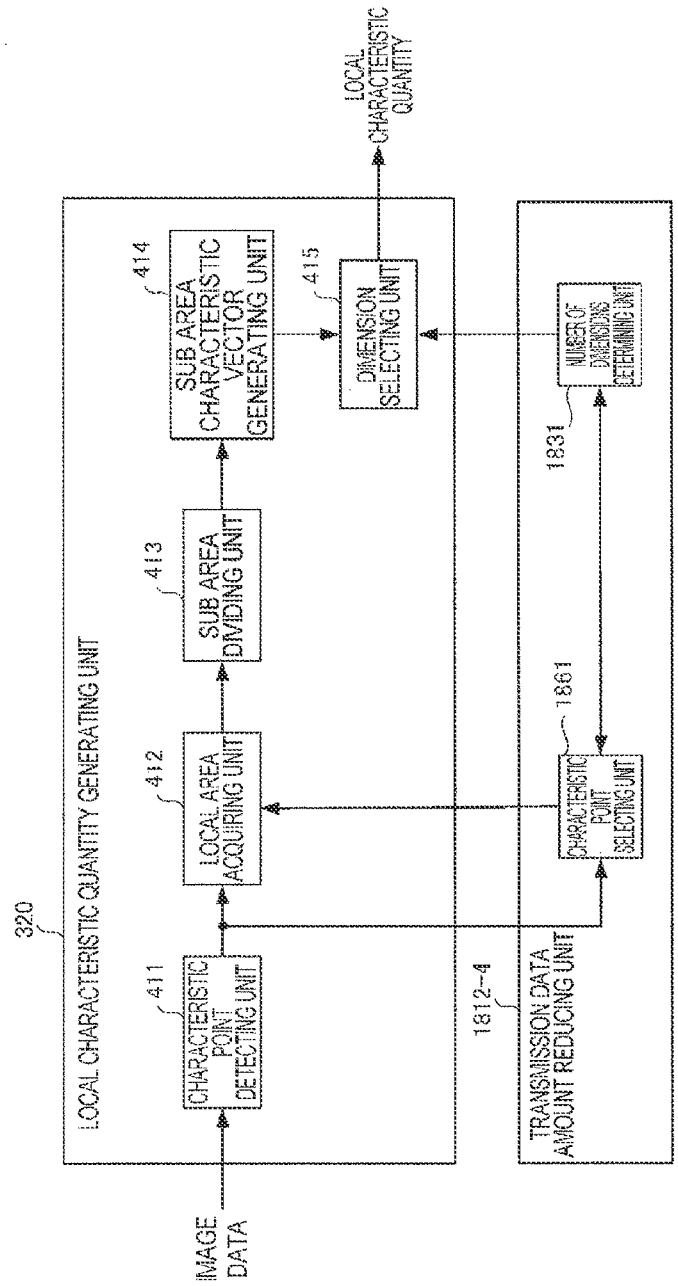
FIG. 18G is a block diagram showing a fourth configuration of the transmission data amount reducing unit according to the fifth embodiment of the present invention.

FIG. 18G is a block diagram showing the encoding unit 1811 according to the present embodiment. Moreover, an encoding unit is not limited to the present example and other encoding processes can also be applied.

The encoding unit 1811 includes a coordinate value scanning unit 1821 to which a coordinate of a characteristic point is inputted from the characteristic point detecting unit 411 of the local characteristic quantity generating unit 320 and which scans a coordinate value. The coordinate value scanning unit 1821 scans an image according to a specific scanning method and converts a two-dimensional coordinate value (X coordinate value and Y coordinate value) of a characteristic point into a one-dimensional index value. The index value represents a scanning distance from an origin of scanning. There are no limitations on scanning directions.

In addition, the encoding unit 1811 includes a sorting unit 1822 which sorts index values of characteristic points and outputs information on a sorted permutation. In this case, for example, the sorting unit 1822 performs sorting in an ascending order. Alternatively, the sorting unit 1822 may perform sorting in a descending order.

Furthermore, the encoding unit 1811 includes a difference value calculating unit 1823 which calculates a difference value between two adjacent index values among the sorted index values and outputs a series of difference values.

In addition, the encoding unit 1811 includes a difference encoding unit 1824 that encodes a series of difference values in a series order. For example, the encoding performed on the series of difference values may be fixed bit length encoding. When encoding with a fixed bit length, the bit length may be defined in advance. However, doing so requires the number of bits necessary for expressing a largest possible difference value and therefore prevents encoding sizes from being reduced. In consideration thereof, when encoding with a fixed bit length, the difference encoding unit 1824 is capable of determining a bit length based on a series of inputted difference values. Specifically, for example, the difference encoding unit 1824 can calculate a maximum difference value from an inputted difference value series, calculate the number of bits necessary for representing (the number of representation bits of) the maximum value, and encode the difference value series using the calculated number of representation bits.

On the other hand, the encoding unit 703a includes a local characteristic quantity encoding unit 1825 that encodes a local characteristic quantity of a corresponding characteristic point with a same permutation as the sorted index values of the characteristic points. By encoding with the same permutation as the sorted index values, coordinate values encoded by the difference encoding unit 1824 and corresponding local characteristic quantities can be associated one to one with each other. In the present embodiment, the local characteristic quantity encoding unit 1825 can subject a local characteristic quantity with a dimension selected from local characteristic quantities of 150 dimensions corresponding to one characteristic point to, for example, encoding with the bytes representing the number of dimensions so that 1 dimension is encoded by 1 byte.

<<Transmission Data Amount Reducing Unit>>

Hereinafter, several configuration examples of the transmission data amount reducing unit 1812 will be described with reference to FIGS. 18C to 18G.

(First Configuration)

FIG. 18C is a block diagram showing a first configuration 1812-1 of the transmission data amount reducing unit 1812 according to the present embodiment. With the first configuration 1812-1 of the transmission data amount reducing unit 1812, the number of dimensions can be determined by a number of dimensions determining unit 1831.

The number of dimensions determining unit 1831 is capable of determining the number of dimensions selected by the dimension selecting unit 415. For example, the number of dimensions determining unit 1831 can determine the number of dimensions by accepting information representing the number of dimensions from the user. Moreover, the information representing the number of dimensions need not necessarily represent the number of dimensions itself and may be, for example, information representing a retrieval accuracy or a retrieval speed. Specifically, for example, when accepting an input that demands a local characteristic quantity generation speed, a communication speed, and a comparison speed to be increased, the number of dimensions determining unit 1831 determines the number of dimensions so as to reduce the number of dimensions.

Moreover, the number of dimensions determining unit 1831 may determine the same number of dimensions for all characteristic points detected from an image or may determine a different number of dimensions for each characteristic point. For example, when importance of characteristic points are provided by external information, the number of dimensions determining unit 1831 may set a larger number of dimensions for a characteristic point with higher importance and may set a smaller number of dimensions for a characteristic point with lower importance. In this manner, since a local characteristic quantity generation speed, a communication speed, and a comparison speed are increased while maintaining accuracy, the number of dimensions can be determined so as to reduce the number of dimensions.

(Second Configuration)

FIG. 18D is a block diagram showing a second configuration 1812-2 of the transmission data amount reducing unit 1812 according to the present embodiment. With the second configuration 1812-2 of the transmission data amount reducing unit 1812, due to a characteristic vector extending unit 1841 that consolidates values of a plurality of dimensions, the number of dimensions can be reduced while maintaining accuracy.

Using characteristic vectors outputted from the sub area characteristic vector generating unit 414 to generate a dimension in a greater scale (extended/divided area), the characteristic vector extending unit 1841 can extend a characteristic vector. Moreover, the characteristic vector extending unit 1841 can extend a characteristic vector using only information regarding characteristic vectors outputted from the sub area characteristic vector generating unit 414. Therefore, since feature extraction need not be performed by reverting to an original image in order to extend a characteristic vector, only a short processing time is required to extend a characteristic vector in comparison to a processing time that is required when generating a characteristic vector from the original image. For example, the characteristic vector extending unit 1841 may generate a new gradient direction histogram by synthesizing gradient direction histograms of adjacent sub areas.

FIG. 18E is a diagram illustrating processing by the second configuration 1812-2 of the transmission data amount reducing unit according to, the present embodiment. In FIG. 18E, the number of dimensions can be reduced while maintaining accuracy by adopting blocks which are respectively an extension of a sum of a gradient histogram of 2×2=4 blocks.

As shown in FIG. 18E, for example, by extending a gradient direction histogram 1851 with 5×5×6 dimensions (150 dimensions), the characteristic vector extending unit 1841 can generate a gradient direction histogram 1853 with 4×4×6 dimensions (96 dimensions). In other words, 4 blocks depicted by a bold line 1851a are consolidated into a single block 1853a. In addition, 4 blocks depicted by a dashed line 1851b are consolidated into a single block 1853b.

In a similar manner, by calculating a sum of adjacent gradient direction histograms with 3×3 blocks from a gradient direction histogram with 5×5×6 dimensions (150 dimensions), the characteristic vector extending unit 1841 can also generate a gradient direction histogram 1855 with 3×3×6 dimensions (54 dimensions). In other words, 4 blocks depicted by a bold line 1853c are consolidated into a single block 1855c. In addition, 4 blocks depicted by a dashed line 1853d are consolidated into a single block 1855d.

Moreover, when the dimension selecting unit 415 performs dimension selection from the gradient direction histogram 1851 with 5×5×6 dimensions (150 dimensions) to a gradient direction histogram 1852 with 5×5×3 dimensions (75 dimensions), the gradient direction histogram 1853 with 4×4×6 dimensions (96 dimensions) becomes a gradient direction histogram 1854 with 4×4×6 dimensions (96 dimensions). In addition, the gradient direction histogram 1855 with 3×3×6 dimensions (54 dimensions) becomes a gradient direction histogram 1856 with 3×3×3 dimensions (27 dimensions).

(Third Configuration)

FIG. 18F is a block diagram showing a third configuration 1812-3 of the transmission data amount reducing unit 1812 according to the present embodiment. In the third configuration 1812-3 of the transmission data amount reducing unit 1812, due to a characteristic point selecting unit 1861 deleting characteristic points and reducing the number of characteristic points by performing characteristic point selection, a data amount of a local characteristic quantity can be reduced while maintaining accuracy.

For example, the characteristic point selecting unit 1861 may store, in advance, specified number information representing a "specified number" of characteristic points to be selected. In addition, the specified number information may be information representing a specified number itself or may be information representing a total size (for example, the number of bytes) of a local characteristic quantity in an image. When the specified number information is information representing a total size of a local characteristic quantity in an image, the characteristic point selecting unit 1861 can calculate a specified number by, for example, dividing the total size by a size of a local characteristic quantity at a single characteristic point. In addition, importance can be randomly attached to all characteristic points, whereby characteristic points can be selected in a descending order of importance. Subsequently, after selecting characteristic points up to the specified number, information related to the selected characteristic points can be outputted as a selection result. Furthermore, based on the characteristic point information, only characteristic points included in a specific scale area among scales of all characteristic points can be selected. In addition, when the number of selected characteristic points exceeds the specified number, for example, the characteristic points may be reduced to the specified number based on importance and information related to the selected characteristic points can be outputted as a selection result.

(Fourth Configuration)

FIG. 18G is a block diagram showing a fourth configuration 1812-4 of the transmission data amount reducing unit 1812 according to the present embodiment. In the fourth configuration 1812-4 of the transmission data amount reducing unit 1812, a number of dimensions determining unit 1831 and a characteristic point selecting unit 1861 cooperate to reduce the amount of data of a local characteristic quantity while maintaining accuracy.

The number of dimensions determining unit 1831 and the characteristic point selecting unit 1861 in the fourth configuration 1812-4 may have various conceivable relationships. For example, the characteristic point selecting unit 1861 may select characteristic points based on the number of characteristic points determined by the number of dimensions determining unit 1831. In addition, the number of dimensions determining unit 1831 may determine the number of selected dimensions based on a specified characteristic quantity size selected by the characteristic point selecting unit 1861 and the number of characteristic points determined by the characteristic point selecting unit 1861 so that a characteristic quantity size equals the specified characteristic quantity size. Furthermore, the characteristic point selecting unit 1861 selects characteristic points based on characteristic point information outputted from the characteristic point detecting unit 411. Subsequently, the characteristic point selecting unit 1861 can output importance information representing an importance of each selected characteristic point to the number of dimensions determining unit 1831, and the number of dimensions determining unit 1831 can determine the number of dimensions to be selected by the dimension selecting unit 415 for each characteristic point based on the importance information.

<<Functional Configuration of Video Processing Device for Server>>

Figure 19:
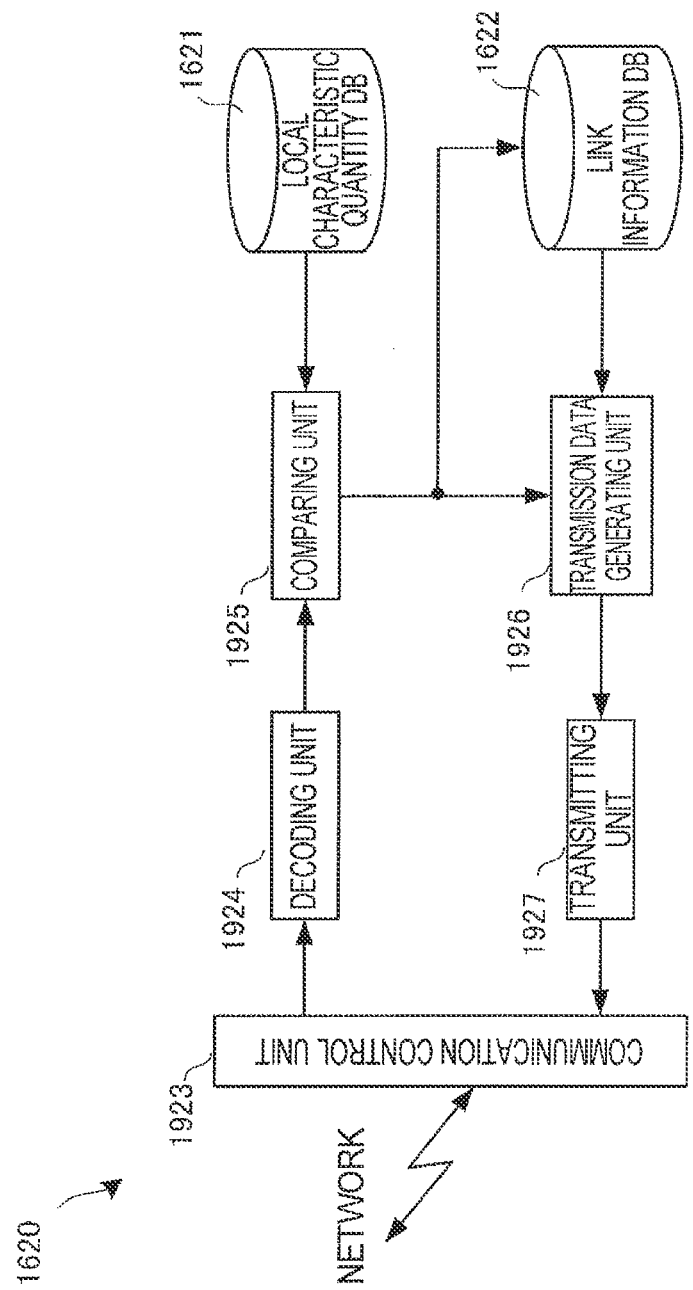
FIG. 19 is a block diagram showing a functional configuration of a video processing device for a server according to the fifth embodiment of the present invention.

FIG. 19 is a block diagram showing a functional configuration of the video processing device 1610 for a server according to the present embodiment.

The video processing device 1610 for a server includes a communication control unit 1923. A decoding unit 1924 decodes an encoded local characteristic quantity and characteristic point coordinate received from the mobile terminal via the communication control unit 1923. In addition, a comparing unit 1925 performs comparison with a local characteristic quantity of a recognition object in the local characteristic quantity DB 1621. A transmission data generating unit 1926 generates transmission data from a recognition object name of a comparison result and link information acquired from the link information DB 1622 in correspondence to the recognition object name of the comparison result. The transmission data is transmitted to the mobile terminal via the communication control unit 1923 from a transmitting unit 1927 that is also a recognition object transmitting unit.

<<Hardware Configuration of Video Processing Device for Mobile Terminal>>

Figure 20:
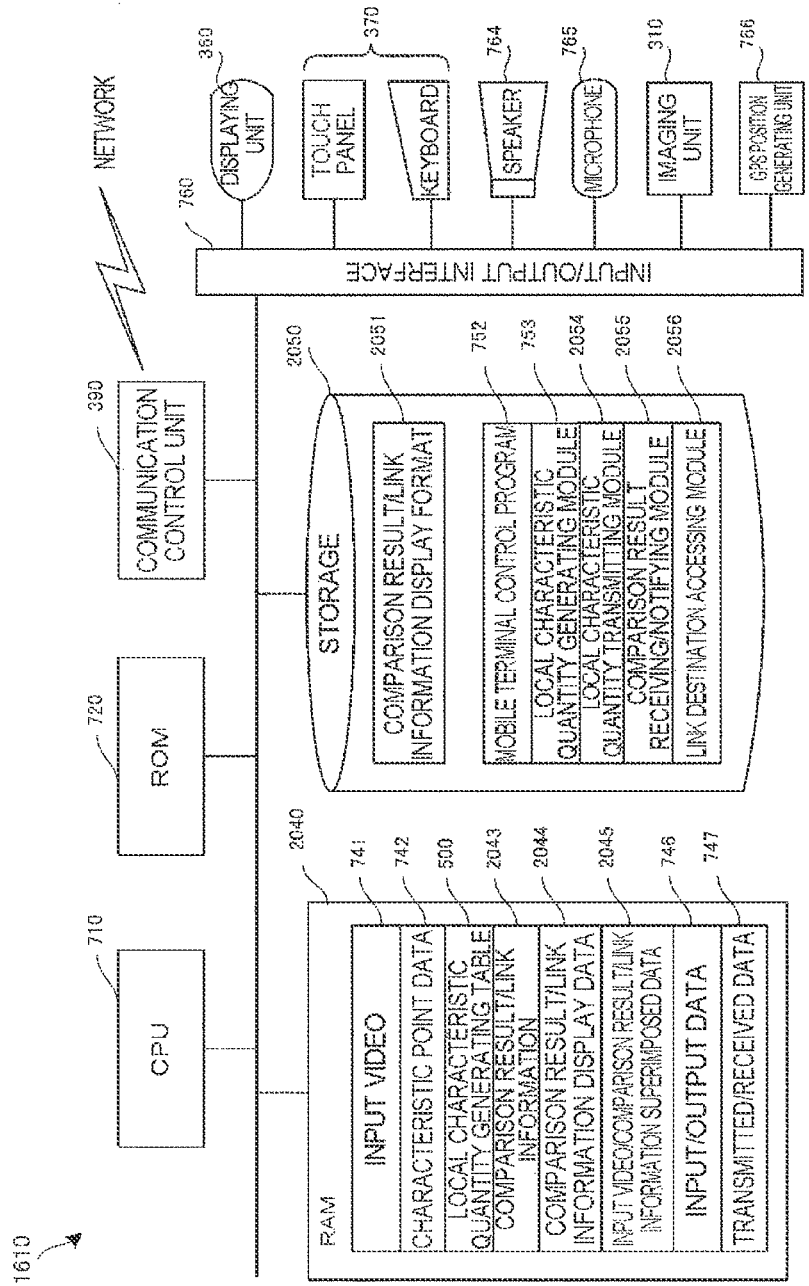
FIG. 20 is a block diagram showing a hardware configuration of the video processing device for a mobile terminal according to the fifth embodiment of the present invention.

FIG. 20 is a block diagram showing a hardware configuration of the video processing device 1620 for a mobile terminal according to the present embodiment. Moreover, since the hardware configuration of the video processing device 1620 for a mobile terminal is a configuration obtained by removing the configuration related to a comparing process and, instead, adding a configuration for transmitting a local characteristic quantity and a configuration for receiving a comparison result with respect to the video processing device 200 according to the second embodiment, components similar to those in FIG. 7 will be denoted by similar reference numerals and a description thereof will be omitted.

A RAM 2040 is a random access memory used by the CPU 710 as a work area for temporary storage. An area for storing data necessary to realize the present embodiment is secured in the RAM 2040. Comparison result/link information 2043 represents an area for storing comparison result/link information received from the comparing server. Comparison result/link information display data 2044 represents an area for storing comparison result/link information display data for notifying the comparison result/link information 2043 to the user. Moreover, when audio output is to be provided, comparison result audio data may be included. Input video/comparison result superimposed data 2045 represents an area for storing input video/comparison result superimposed data which is obtained by superimposing the comparison result/link information 2043 on the input video 741 and which is displayed on the displaying unit 360.

A storage 750 stores databases and various parameters as well as the following data and programs necessary for realizing the present embodiment. A comparison result/link information display format 2051 represents an area for storing a comparison result/link information display format used to generate a format for displaying comparison result/link information.

A storage 2050 stores the following program. A mobile terminal control program 752 represents an area for storing a mobile terminal control program that controls the entire present video processing device 200. A local characteristic quantity transmitting module 2054 represents an area for storing a local characteristic quantity transmitting module that encodes a generated local characteristic quantity and characteristic point coordinate and transmits the encoded local characteristic quantity and characteristic point coordinate to a comparing server in the mobile terminal control program 752. A comparison result receiving/notifying module 2055 represents an area for storing a comparison result receiving/notifying module that receives comparison result/link information and notifies the comparison result/link information to the user by display or audio. A link destination accessing module 2056 represents an area for storing a link destination accessing module which, when displayed link information is specified, accesses a link destination and downloads related information.

Moreover, FIG. 20 only shows data and a program essential to the present embodiment and does not illustrate data and programs unrelated to the present embodiment.

<<Processing Procedure of Video Processing Device for Mobile Terminal>>

Figure 21:
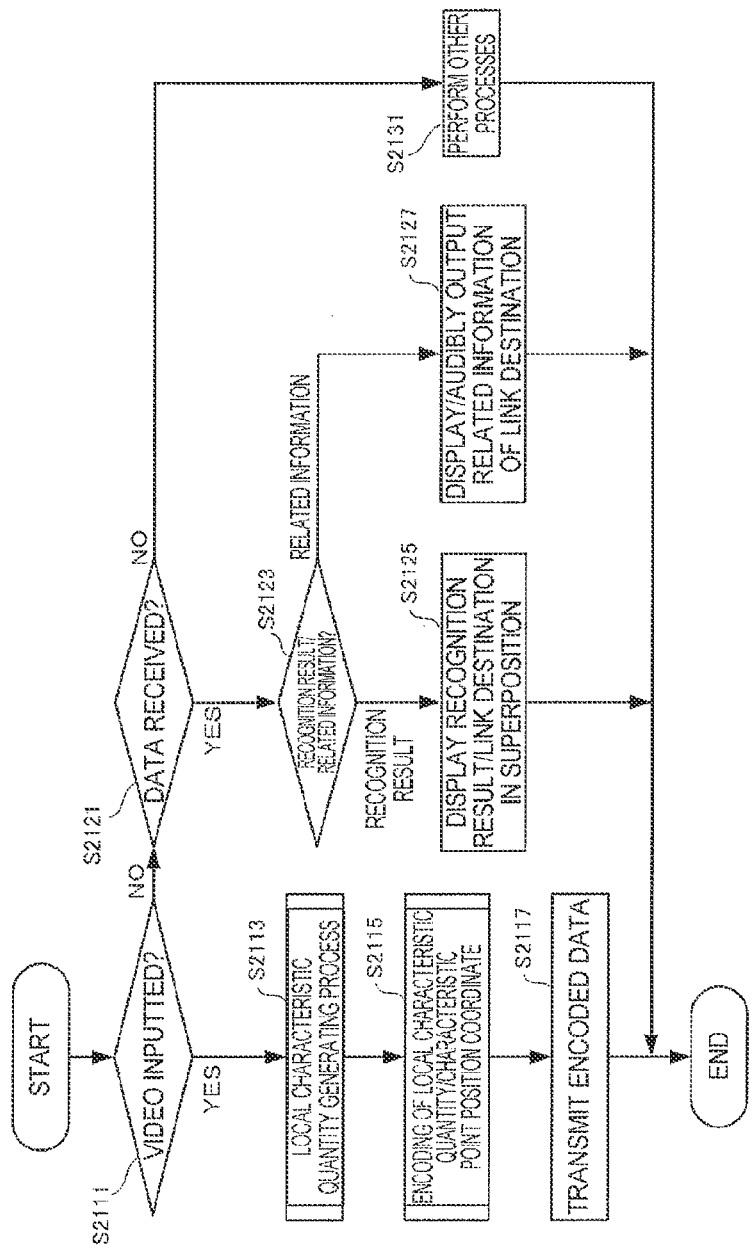
FIG. 21 is a flow chart showing a processing procedure of the video processing device for a mobile terminal according to the fifth embodiment of the present invention.

FIG. 21 is a flow chart showing a processing procedure of the video processing device 1620 for a mobile terminal according to the present embodiment. The flow chart is executed by the CPU 710 using the RAM 2040, both shown in FIG. 20, to realize the respective functional components shown in FIG. 18A.

First, in step S2111, a determination is made regarding whether or not a video has been inputted to perform object recognition. In addition, in step S2121, reception is determined as a function implemented by a mobile terminal. When neither determination is positive, other processes are performed in step S2131. Moreover, a description of an ordinary transmission process will be omitted.

When a video has been inputted, processing proceeds to step S2113 to execute a local characteristic quantity generating process from the input video (refer to FIG. 9A). Next, in step S2115, a local characteristic quantity and a characteristic point coordinate are encoded (refer to FIGS. 22A and 22B). In step S2117, the encoded data is transmitted to a comparison server.

When data has been received, processing proceeds to step S2123 to determine whether a recognition result has been received from a comparison server or related information has been received from a link destination server. In case of a recognition result, processing proceeds, to step S2125 to display the received recognition result and link destination information in superposition on the input video. Meanwhile, in case of related information, processing proceeds to step S2127 to display or audibly output the related information from the link destination server.

(Encoding Process)

Figure 22A:
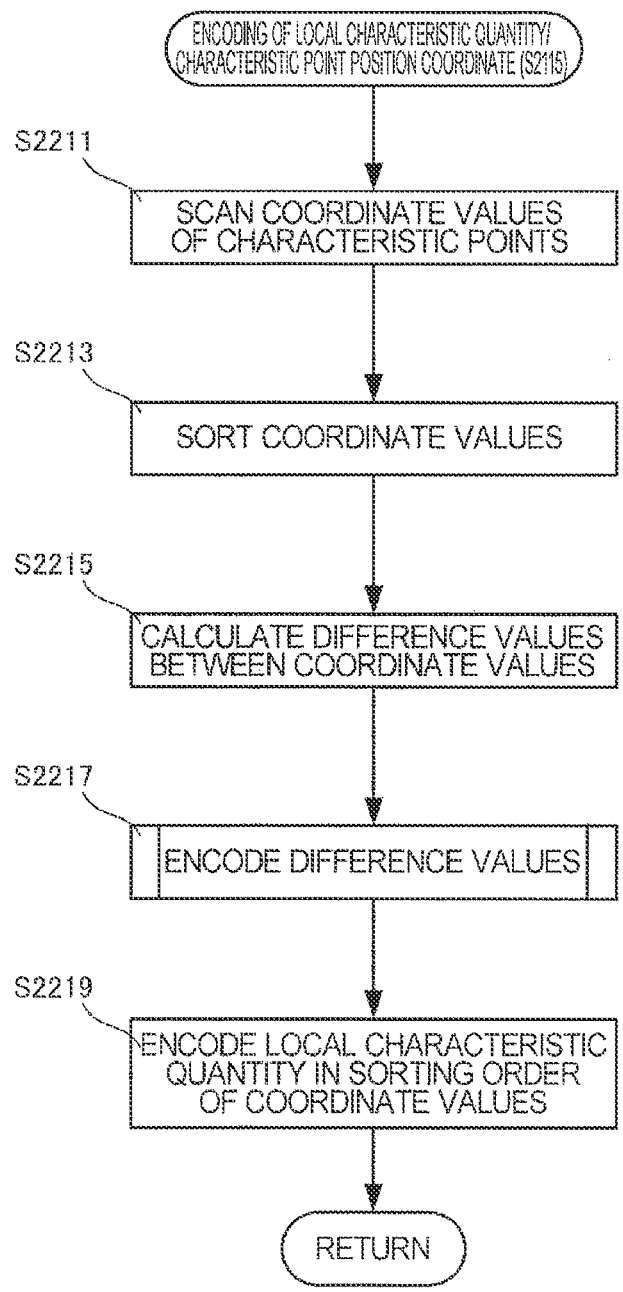
FIG. 22A is a flow chart showing a processing procedure of encoding according to the fifth embodiment of the present invention.

FIG. 22A is a flow chart showing a processing procedure of the encoding process S2115 according to the present embodiment.

First, in step S2211, coordinate values of characteristic points are scanned in a desired order. Next, in step S2213, the scanned coordinate values are sorted. In step S2215, difference values of the coordinate values are calculated in the sorted order. In step S2217, the difference values are encoded (refer to FIG. 22B). Subsequently, in step S2219, local characteristic quantities are encoded in the sorting order of the coordinate values. Moreover, the encoding of the difference values and the encoding of the local characteristic quantities may be performed in parallel.

(Encoding Process of Difference Value)

Figure 22B:
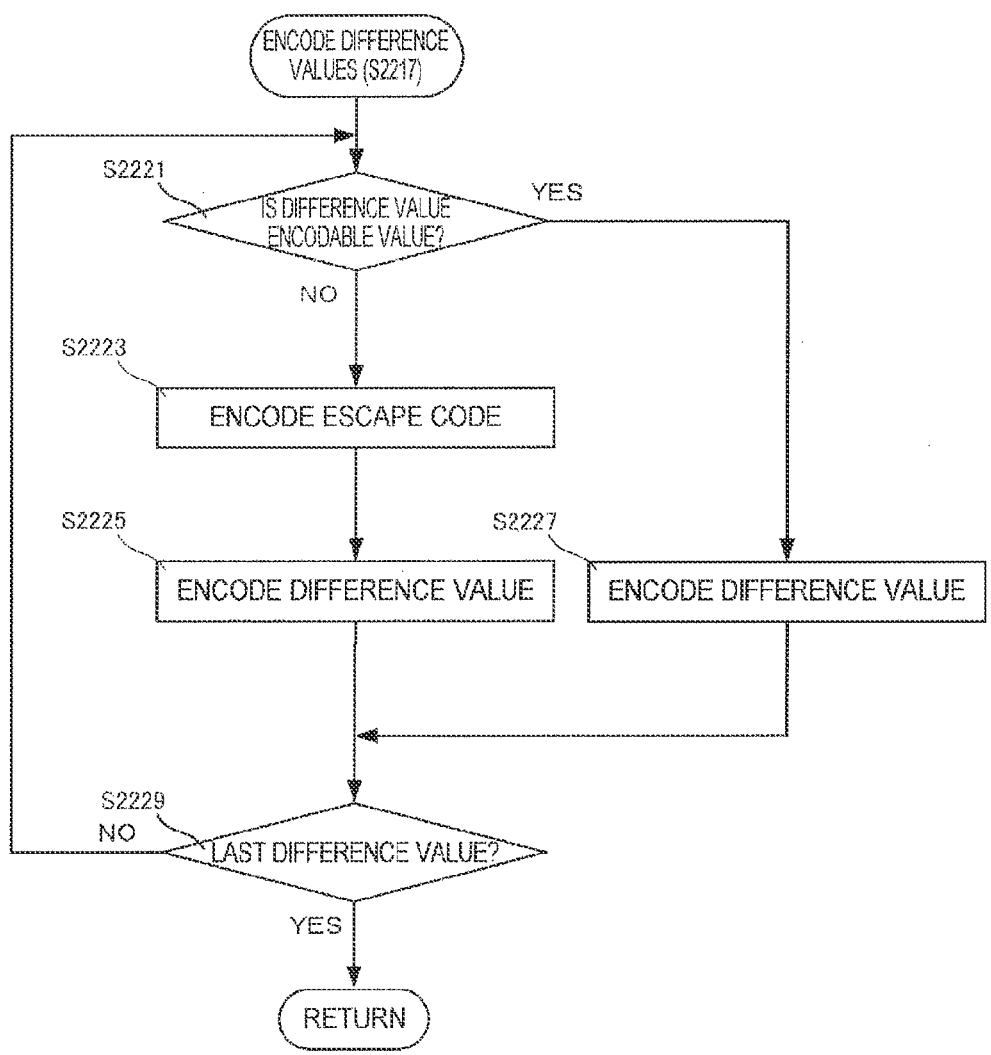
FIG. 22B is a flow chart showing a processing procedure of encoding of a difference value according to the fifth embodiment of the present invention.

FIG. 22B is a flow chart showing a processing procedure of the encoding process S2217 of difference values according to the present embodiment.

First, in step S2221, a determination is made regarding whether or not a difference value is in an encodable range. If within an encodable range, processing proceeds to step S2227 to encode the difference value. Subsequently, a transition is made to step S2229. If not within an encodable range (out of range), processing proceeds to step S2223 to encode an escape code. Subsequently, in step S2225, a difference value is encoded using a different encoding method from the encoding performed in step S2227. Subsequently, a transition is made to step S2229. In step S2229, a determination is made regarding whether or not the processed difference value is a last component in a series of difference values. If so, the processing ends. If not, a return is once again made to step S2221 to execute processing on a next difference value in the series of difference values.

<<Hardware Configuration of Video Processing Device for Server>>

FIG. 23 is a block diagram showing a hardware configuration of the video processing device 1610 for a server according to the present embodiment.

In FIG. 23, a CPU 2310 is an arithmetic control processor which realizes respective functional components of a video processing device 1620 that is a comparing server by executing a program. A ROM 2320 stores initial data, fixed data of the program and the like, and the program. In addition, the communication control unit 1923 is a communication control unit which, in the present embodiment, communicates with other devices via a network. Moreover, the CPU 2310 is not limited to one unit. Alternatively, a plurality of CPUs may be provided or the CPU 2310 may include a CPU for image processing.

A RAM 2340 is a random access memory used by the CPU 2310 as a work area for temporary storage. An area for storing data necessary to realize the present embodiment is secured in the RAM 2340. A received local characteristic quantity 2341 represents an area for storing a local characteristic quantity including a characteristic point coordinate received from a mobile terminal. A read local characteristic quantity 2342 represents an area for storing a local characteristic quantity including a characteristic point coordinate read out from the local characteristic quantity DB 1621. An object comparison result 2343 represents an area for storing an object comparison result recognized by comparing a received local characteristic quantity with a local characteristic quantity stored in the local characteristic quantity DB 330. Link information 2344 represents an area for storing link information retrieved from the link information DB 1622 in correspondence with a recognition object. Transmitted/received data 2345 represents an area for storing transmitted/received data that is transmitted and received via the communication control unit 1923.

A storage 2350 stores databases and various parameters as well as the following data and programs necessary for realizing the present embodiment. The local characteristic quantity DB 1621 represents an area for storing a local characteristic quantity DB similar to that shown in FIG. 6. Moreover, since the comparing server has sufficient processing power and storage capacity, local characteristic quantities of all fields may be stored. The storage 2350 stores the following program. A comparing server control program 2351 represents an area for storing a comparing server control program that controls the entire present video processing device 200. A local characteristic quantity module 2352 represents an area for storing a local characteristic quantity module from an image of a recognition object in the comparing server control program 2351. An object recognition control module 2353 represents an area for storing an object recognition control module that compares a received local characteristic quantity with a local characteristic quantity stored in the local characteristic quantity DB 330 and recognizes an object in the comparing server control program 2351.

Moreover, FIG. 23 only shows data and a program essential to the present embodiment and does not illustrate data and programs unrelated to the present embodiment.

(Link Information DB)

Figure 24:
FIG. 24 is a diagram showing a configuration of a link information DB according to the fifth embodiment of the present invention.

FIG. 24 is a diagram showing a configuration of the link information DB 1622 according to the present embodiment. Basically, the configuration is similar to that of the link information DB 1410 shown in FIG. 15.

The link information DB 1622 stores link information 2403 made up of link destination display data and a link destination address in association with a recognition object ID 2401 and a recognition object name 2402. Moreover, the link information DB 1622 described above may also be integrally prepared with the local characteristic quantity DB 1621.

<<Processing Procedure of Video Processing Device for Server>>

Figure 25:
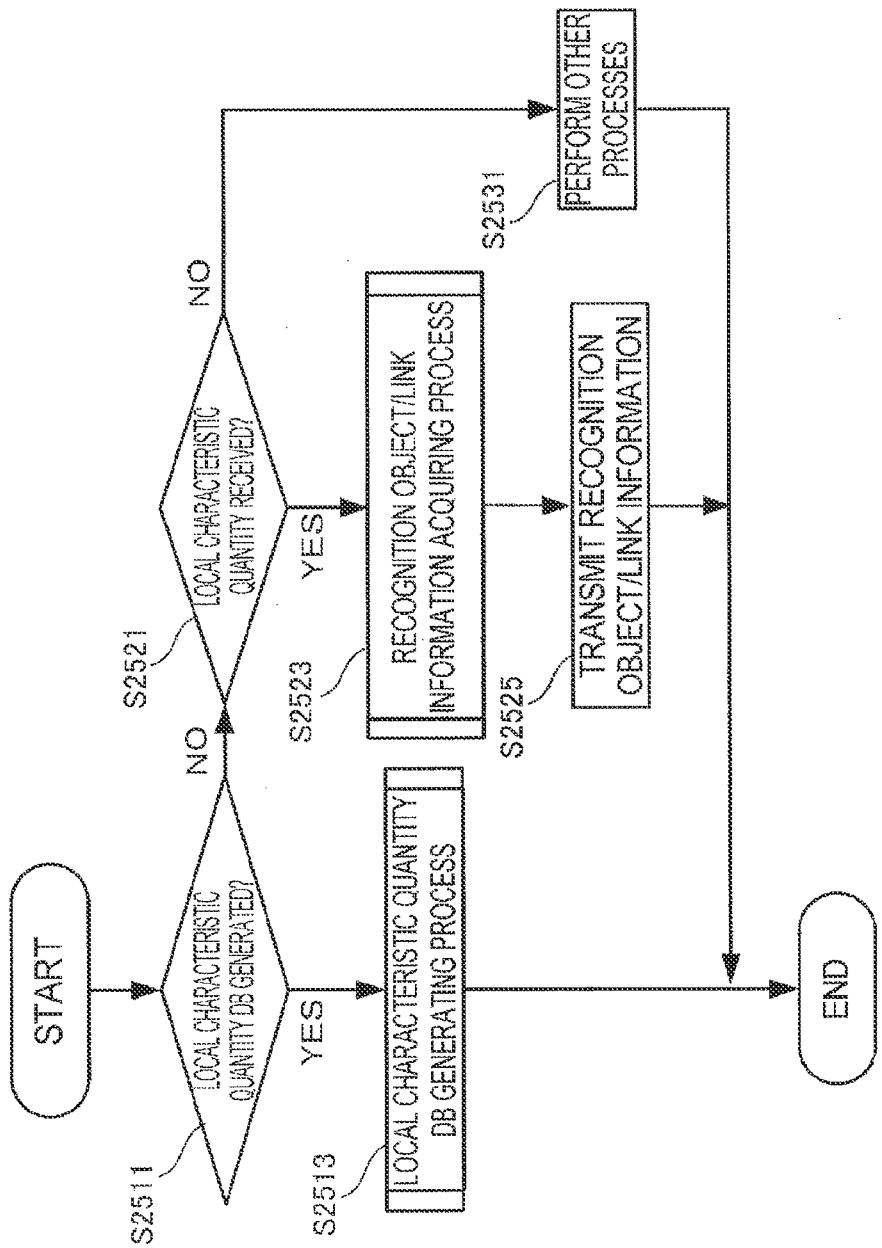
FIG. 25 is a flow chart showing a processing procedure of the video processing device for a server according to the fifth embodiment of the present invention.

FIG. 25 is a flow chart showing a processing procedure of the video processing device 1610 for a server according to the present embodiment. The flow chart is executed by the CPU 2310 using the RAM 2340, both shown in FIG. 23, to realize the respective functional components shown in FIG. 19.

First, in step S2511, a determination is made regarding whether or not a local characteristic quantity DB is to be generated. In addition, in step S2521, a determination is made regarding whether or not a local characteristic quantity is to be received from a mobile terminal. When neither determination is positive, other processes are performed in step S2531.

Figure 26B:
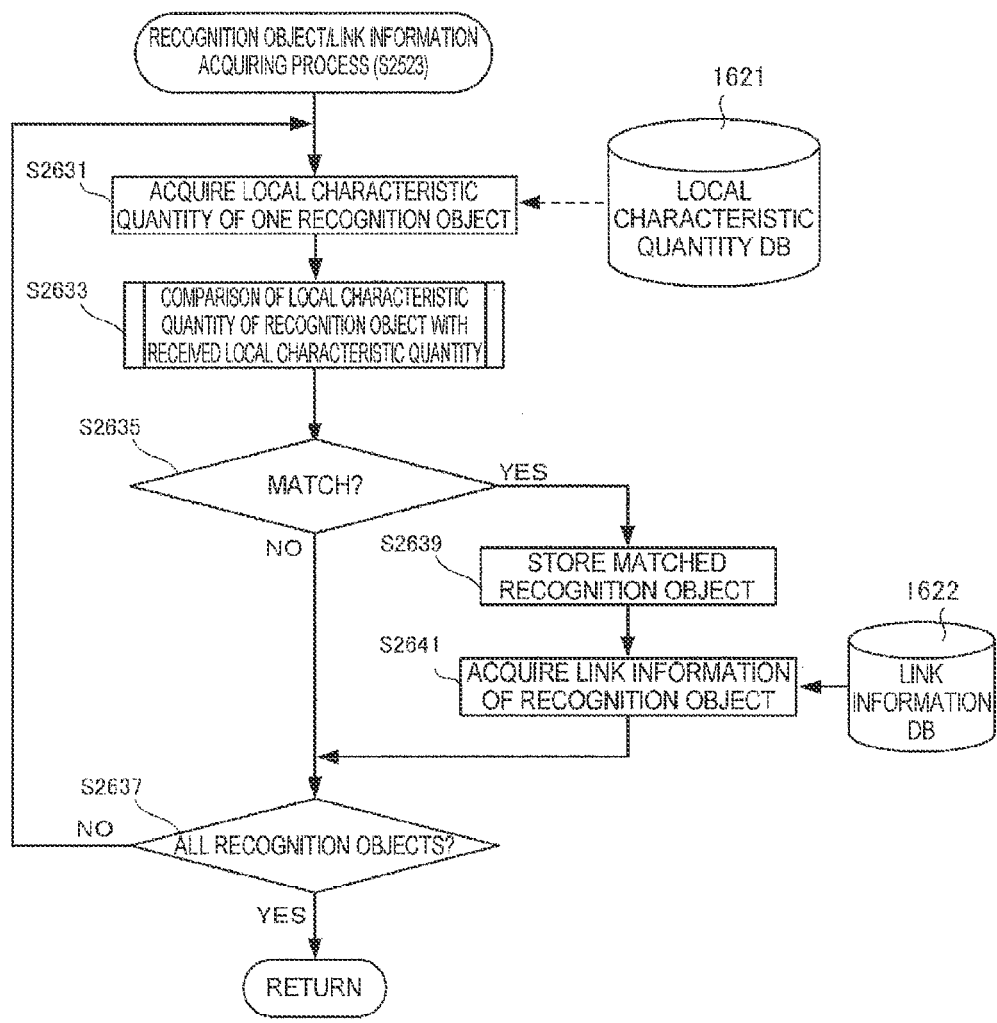
FIG. 26B is a flow chart showing a processing procedure of a recognition object/link information acquiring process according to the fifth embodiment of the present invention.

When a local characteristic quantity DB is to be generated, processing proceeds to step S2513 to execute a local characteristic quantity DB generating process (refer to FIG. 26A). Meanwhile, when a local characteristic quantity is to be received, processing proceeds to step S2523 to execute a recognition object/local characteristic quantity acquiring process (refer to FIG. 26B). Subsequently, in step S2525, the recognition object and the link information are transmitted to the mobile terminal.

(Local Characteristic Quantity DB Generating Process)

FIG. 26A is a flow chart showing a processing procedure of the local characteristic quantity DB generating process S2513 according to the present embodiment.

First, in step S2611, an image of a recognition object is acquired. In step S2613, a position coordinate, a scale, and an angle of characteristic points are detected. In step S2615, a local area is acquired with respect to one of the characteristic points detected in step S2613. Next, in step S2617, the local area is divided into sub areas. In step S2619, characteristic vectors of each sub area are generated to generate a characteristic vector of the local area. Processes from steps S2613 to S2619 are illustrated in FIG. 4B.

Next, in step S2621, dimension selection is executed with respect to the characteristic vector of the local area generated in step S2619. Dimension selection is illustrated in FIGS. 4D to 4F. However, while hierarchization in dimension selection is executed when generating the local characteristic quantity DB 1621, all of the generated characteristic vectors are desirably stored.

In step S2623, a determination is made regarding whether or not local characteristic quantity generation and dimension selection have been completed with respect to all characteristic points detected in step S2613. If not, a return is made to step S2613 to repeat the processing on a next characteristic point. If local characteristic quantity generation and dimension selection have been completed with respect to all characteristic points, processing proceeds to step S2625 to register a local characteristic quantity and a characteristic point coordinate in the local characteristic quantity DB 1621 in association with a piece of recognized merchandise.

In step S2627, a determination is made regarding whether or not there is another recognition object. When there are other pieces of merchandise, a return is made to step S2611 to acquire an image of a recognition object and repeat the processing.

(Recognition Object/Link Information Acquisition Process)

FIG. 26B is a flow chart showing a processing procedure of a recognition object/link information acquisition process S2523 according to the present embodiment.

First, in step S2631, a local characteristic quantity of one recognition object is acquired from the local characteristic quantity DB 1621. Subsequently, in step S2633, a local characteristic quantity of a recognition object is compared with a local characteristic quantity received from the mobile terminal. Moreover, since a comparing process performed in step S2633 is basically similar to the comparing process performed by the mobile terminal in FIG. 9B, a detailed description thereof will be omitted.

In step S2635, a determination is made regarding whether or not the local characteristic quantities match. If so, processing proceeds to step S2639 to store the matched recognition object. Subsequently, in step S2641, link information corresponding to the recognition object is acquired from the link information DB 1622.

In step S2637, a determination is made regarding whether or not all recognition objects have been compared, and if an uncompared piece of merchandise remains, a return is made to step S2631 to repeat comparison on a next recognition object. Alternatively, the comparison may be performed by limiting fields.

Other Embodiments

While the present invention has been described in its preferred embodiments, it is to be understood that the present invention is not limited to the embodiments described above. It will be obvious to those skilled in the art that various changes and modifications may be made to the configurations and details of the present invention within the scope thereof. It is also to be understood that systems and devices that combine independent characteristics included in the respective embodiments in various ways also fall within the scope of the present invention.

In addition, the present invention may be applied to systems constituted by a plurality of devices or to a single apparatus. Furthermore, the present invention is also applicable to cases where a control program that realizes the functions of the embodiments is directly or remotely supplied to a system or an apparatus. Accordingly, a control program to be installed on a computer, a medium storing the control program, and a WWW (World Wide Web) server that enables the control program to be downloaded in order to realize the functions of the present invention on the computer also fall within the scope of the present invention.

This application is based on, and claims priority from, Japanese Patent Application No. 2011-273938, filed on Dec. 14, 2011, the entire contents of which are incorporated herein by reference.

A part of or all of the present embodiment may be described as, but not limited to, the following Appendices.

APPENDIX 1

A video processing device, comprising:
a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other;
a second local characteristic quantity generating unit which extracts n-number of characteristic points from an image in a video and which generates n-number of second local characteristic quantities which are respectively 1-dimensional to j-dimensional characteristic vectors for n-number of local areas including each of the n-number of characteristic points;
a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic Vectors up to the selected number of dimensions correspond to the n-number of second local characteristic quantities which are characteristic vectors up to the selected number of dimensions, and
a displaying unit that displays information representing the recognition object recognized by the recognizing unit in an image in which the recognition object exists in the video.

APPENDIX 2

The video processing device according to Appendix 1, further comprising
a related information storing unit which stores, in association with the recognition object, related information that is related to the recognition object, wherein
the displaying unit further displays the related information in superposition on an image in which the recognition object exists in the video.

APPENDIX 3

The video processing device according to Appendix 1 or 2, further comprising
a link information storing unit which stores, in association with the recognition object, link information for accessing related information that is related to the recognition object, wherein
the displaying unit further displays the link information in superposition on an image in which the recognition object exists in the video.

APPENDIX 4

The video processing device according to Appendix 1 or 2, further comprising:
a link information storing unit which stores, in association with the recognition object, link information for accessing related information that is related to the recognition object; and
a downloading unit which accesses the related information in accordance with the link information, wherein the displaying unit further displays the related information in superposition on an image in which the recognition object exists in the video.

APPENDIX 5

The video processing device according to any one of Appendices 1 to 4, wherein
the first local characteristic quantity storing unit stores a tuple constituted by the m-number of first local characteristic quantities and position coordinates of the m-number of characteristic points in an image of the recognition object,
the second local characteristic quantity generating unit stores a tuple constituted by the n-number of second local characteristic quantities and position coordinates of the n-number of characteristic points in an image in the video, and
the recognizing unit recognizes that the recognition object exists in the image in the video when determining that a set of a tuple of the n-number of second local characteristic quantities and position coordinates thereof and a set of a prescribed proportion or more of a tuple of the m-number of first local characteristic quantities and position coordinates thereof have a linear conversion relationship.

APPENDIX 6

The video processing device according to any one of Appendices 1 to 5, wherein the first local characteristic quantities and the second local characteristic quantities are generated by dividing a local area including a characteristic point extracted from an image into a plurality of sub areas and generating characteristic vectors of a plurality of dimensions constituted by a gradient direction histogram in the plurality of sub areas.

APPENDIX 7

The video processing device according to Appendix 6, wherein the first local characteristic quantities and the second local characteristic quantities are generated by deleting dimensions with a higher correlation between adjacent sub areas from the generated characteristic vectors of the plurality of dimensions.

APPENDIX 8

The video processing device according to Appendix 6 or 7, wherein the first local characteristic quantities and the second local characteristic quantities are generated by deleting a characteristic point determined to have low importance from the plurality of characteristic points extracted from an image.

APPENDIX 9

The video processing device, according to any one of Appendices 6 to 8, wherein the plurality of dimensions of the characteristic vectors are arranged to circumnavigate the local area for every prescribed number of dimensions so that the plurality of dimensions of the characteristic vectors can be selected sequentially from the dimensions contributing to a characteristic of the characteristic point and sequentially from a 1st dimension in accordance with an increase in accuracy required with respect to the local characteristic quantities.

APPENDIX 10

A control method of a video processing device including a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other,
the control method of a video processing device comprising:
a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;
a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and
a displaying step of displaying information representing the recognition object recognized in the recognizing step in superposition on an image in which the recognition object exists in the video.

APPENDIX 11

A control program for executing a control method in a video processing device including a first local characteristic, quantity storing unit that stores m-number of first local characteristic quantities which are respectively 1-dimensional to i-dimensional characteristic vectors and which are generated for each of m-number of local areas including each of m-number of characteristic points in an image of a recognition object, with the m-number of first local characteristic quantities being associated with the recognition object,
the control method comprising:
a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;
a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a displaying step of displaying information representing the recognition object recognized in the recognizing step in superposition on an image in which the recognition object exists in the video.

APPENDIX 12

A video processing system including a video processing device for a mobile terminal and a video processing device for a server which are connected to each other via a network, the video processing system comprising:

a first local characteristic quantity storing unit that stores m-number of first local characteristic quantities which are which are respectively 1-dimensional to i-dimensional characteristic vectors and which are generated for each of m-number of local areas including each of m-number of characteristic points in an image of a recognition object, with the m-number of first local characteristic quantities being associated with the recognition object;

a second local characteristic quantity generating unit which extracts n-number of characteristic points from an image in a video and which generates n-number of second local characteristic quantities which are respectively 1-dimensional to j-dimensional characteristic vectors for n-number of local areas including each of the n-number of characteristic points;

a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are by characteristic vectors up to the selected number of dimensions and which are stored in the first local characteristic quantity storing unit correspond to the n-number of second local characteristic quantities which are characteristic vectors up to the selected number of dimensions and which are generated by the second local characteristic quantity generating unit; and a displaying unit that displays information representing the recognition object recognized by the recognizing unit in superposition on an image in which the recognition object exists in the video.

APPENDIX 13

The video processing system according to Appendix 12, wherein the video processing device for a mobile terminal comprises:

the second local characteristic quantity generating unit;

a second local characteristic quantity transmitting unit which encodes the n-number of second local characteristic quantities and which transmits the encoded n-number of second local characteristic quantities to the video processing device for a server via the network;

a recognition object receiving unit which receives information representing a recognition object recognized by the video processing device for a server from the video processing device for a server; and a displaying unit that displays information representing the received recognition object in superposition on an image in which the recognition object exists in the video, and the video processing device for a server comprises:

the first local characteristic quantity storing unit;

second local characteristic quantity receiving unit which receives the encoded n-number of second local characteristic quantities from the video processing device for a mobile terminal and decodes the encoded n-number of second local characteristic quantities;

the recognizing unit; and a recognition object transmitting unit which transmits information representing the recognition object recognized by the recognizing unit to the video processing device for a mobile terminal via the network.

APPENDIX 14

The video processing system according to Appendix 12 or 13, further comprising a link information storing unit which stores, in association with the recognition object, link information for accessing related information that is related to the recognition object, wherein the displaying unit further displays the link information in superposition on an image in which the recognition object exists in the video.

APPENDIX 15

The video processing system according to Appendix 12 or 13, further comprising:

a link information storing unit which stores, in association with the recognition object, link information for accessing related information that is related to the recognition object; and a downloading unit which accesses the related information in accordance with the link information, wherein the displaying unit further displays the related information in superposition on an image in which the recognition object exists in the video.

APPENDIX 16

A video processing device for a mobile terminal in the video processing system according to any one of Appendices 12 to 15, the video processing device for a mobile terminal comprising:

a second local characteristic quantity generating unit which extracts n-number of characteristic points from an image in a video and which generates n-number of second local characteristic quantities which are respectively 1-dimensional to j-dimensional characteristic vectors for n-number of local areas including each of the n-number of characteristic points;

a second local characteristic quantity transmitting unit which encodes the n-number of second local characteristic quantities and which transmits the encoded n-number of second local characteristic quantities to a video processing device for a server via a network;

a recognition object receiving unit which receives information representing a recognition object recognized by the video processing device for a server from the video processing device for a server; and a displaying unit that displays information representing the received recognition object in superposition on an image in which the recognition object exists in the video.

APPENDIX 17

A control method of a video processing device for a mobile terminal in the video processing system according to any one of Appendices 12 to 15, the control method of a video processing device for a mobile terminal comprising:

a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;

a second local characteristic quantity transmitting step of encoding the n-number of second local characteristic quantities and transmitting the encoded n-number of second local characteristic quantities to a video processing device for a server via a network;

a recognition object receiving step of receiving information representing a recognition object recognized by the video processing device for a server from the video processing device for a server; and a displaying step of displaying information representing the received recognition object in superposition on an image in which the recognition object exists in the video.

APPENDIX 18

A control program of a video processing device for a mobile terminal in the video processing system according to any one of Appendices 12 to 15, the control program causing a computer to execute:

a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;

a second local characteristic quantity transmitting step of encoding the n-number of second local characteristic quantities and transmitting the encoded n-number of second local characteristic quantities to a video processing device for a server via a network;

a recognition object receiving step of receiving information representing a recognition object recognized by the video processing device for a server from the video processing device for a server; and a displaying step of displaying information representing the received recognition object in superposition on an image in which the recognition object exists in the video.

APPENDIX 19

A video processing device for a server in the video processing system according to any one of Appendices 12 to 15, the video processing device for a server comprising:

a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other;

a second local characteristic quantity receiving unit which receives the encoded n-number of second local characteristic quantities from a video processing device for a mobile terminal and decodes the encoded n-number of second local characteristic quantities;

a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a recognition object transmitting unit which transmits information representing the recognition object recognized by the recognizing unit to the video processing device for a mobile terminal via a network.

APPENDIX 20

A control method of a video processing device for a server in the video processing system according to any one of the Appendices 12 to 15 including a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other, the control method of a video processing device for a server comprising:

a second local characteristic quantity receiving step of receiving the encoded n-number of second local characteristic quantities from a video processing device for a mobile terminal and decoding the encoded n-number of second local characteristic quantities;

a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a recognition object transmitting step of transmitting information representing the recognition object recognized in the recognizing step to the video processing device for a mobile terminal via a network.

APPENDIX 21

A control program of a video processing device for a server in the video processing system according to any one of the Appendices 12 to 15 including a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other, the control program causing a computer to execute:

a second local characteristic quantity receiving step of receiving the encoded n-number of second local characteristic quantities from a video processing device for a mobile terminal and decoding the encoded n-number of second local characteristic quantities;

a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a recognition object transmitting step of transmitting information representing the recognition object recognized in the recognizing step to the video processing device for a mobile terminal via a network.

APPENDIX 22

A video processing method in a video processing system which includes a video processing device a for a mobile terminal and a video processing device for a server which are connected to each other via a network and which includes a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the first local characteristic quantities being associated with the recognition object, the video processing method comprising:

a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;

a recognizing unit which selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions and which are stored in the first local characteristic quantity storing unit correspond to the n-number of second local characteristic quantities which are characteristic vectors up to the selected number of dimensions and which are generated by the second local characteristic quantity generating unit; and a displaying unit that displays information representing the recognition object recognized by the recognizing unit in superposition on an image in which the recognition object exists in the video.

The invention claimed is:

1. A video processing device, comprising:
a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other;
a second local characteristic quantity generating unit that extracts n-number of characteristic points from an image in a video and that generates n-number of second local characteristic quantities which are respectively 1-dimensional to j-dimensional characteristic vectors for n-number of local areas including each of the n-number of characteristic points;
a recognizing unit that selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and
a displaying unit that displays information representing the recognition object recognized by the recognizing unit in an image in which the recognition object exists in the video.

2. The video processing device according to claim 1, further comprising
a related information storing unit that stores, in association with the recognition object, related information that is related to the recognition object,
wherein the displaying unit further displays the related information in superposition on an image in which the recognition object exists in the video.

3. The video processing device according to claim 1, further comprising:
a link information storing unit that stores, in association with the recognition object, link information for accessing related information that is related to the recognition object,
wherein the displaying unit further displays the link information in superposition on an image in which the recognition object exists in the video.

4. The video processing device according to claim 1, further comprising:
a link information storing unit that stores, in association with the recognition object, link information for accessing related information that is related to the recognition object; and
a downloading unit that accesses the related information in accordance with the link information,
wherein the displaying unit further displays the related information in superposition on an image in which the recognition object exists in the video.

5. The video processing device according to claim 1, wherein
the first local characteristic quantity storing unit stores a tuple constituted by the m-number of first local characteristic quantities and position coordinates of the m-number of characteristic points in an image of the recognition object,
the second local characteristic quantity generating unit stores a tuple constituted by the n-number of second local characteristic quantities and position coordinates of the n-number of characteristic points in an image in the video, and
the recognizing unit recognizes that the recognition object exists in the image in the video when determining that a set of a tuple of the n-number of second local characteristic quantities and position coordinates thereof and a set of a prescribed proportion or more of a tuple of the m-number of first local characteristic quantities and position coordinates thereof have a linear conversion relationship.

6. The video processing device according to claim 1, wherein the first local characteristic quantities and the second local characteristic quantities are generated by dividing a local area including a characteristic point extracted from an image into a plurality of sub areas and generating characteristic vectors of a plurality of dimensions constituted by a gradient direction histogram in the plurality of sub areas.

7. The video processing device according to claim 6, wherein the first local characteristic quantities and the second local characteristic quantities are generated by deleting dimensions with a higher correlation between adjacent sub areas from the generated characteristic vectors of the plurality of dimensions.

8. The video processing device according to claim 6, wherein the first local characteristic quantities and the second local characteristic quantities are generated by deleting a characteristic point determined to have low importance from the plurality of characteristic points extracted from an image.

9. The video processing device according to claim 6, wherein the plurality of dimensions of the characteristic vectors are arranged to circumnavigate the local area for every prescribed number of dimensions so that the plurality of dimensions of the characteristic vectors can be selected sequentially from the dimensions contributing to a characteristic of the characteristic point and sequentially from a 1st dimension in accordance with an increase in accuracy required with respect to the local characteristic quantities.

10. A control method of a video processing device including a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other,
the control method of a video processing device comprising:
a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;
a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and
a displaying step of displaying information representing the recognition object recognized in the recognizing step in superposition on an image in which the recognition object exists in the video.

11. A non-transitory computer-readable storage medium having a control program in a video processing device including a first local characteristic quantity storing unit that stores m-number of first local characteristic quantities which are respectively 1-dimensional to i-dimensional characteristic vectors and which are generated for each of m-number of local areas including each of m-number of characteristic points in an image of a recognition object, with the m-number of first local characteristic quantities being associated with the recognition object, the control method comprising:
a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;
a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and
a displaying step of displaying information representing the recognition object recognized in the recognizing step in superposition on an image in which the recognition object exists in the video.

12. A video processing system including a video processing device for a mobile terminal and a video processing device for a server which are connected to each other via a network,
the video processing system comprising:
a first local characteristic quantity storing unit that stores m-number of first local characteristic quantities which are respectively which are 1-dimensional to i-dimensional characteristic vectors and which are generated for each of m-number of local areas including each of m-number of characteristic points in an image of a recognition object, with the m-number of first local characteristic quantities being associated with the recognition object;
a second local characteristic quantity generating unit that extracts n-number of characteristic points from an image in a video and that generates n-number of second local characteristic quantities which are respectively 1-dimensional to j-dimensional characteristic vectors for n-number of local areas including each of the n-number of characteristic points;

a recognizing unit that selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are by characteristic vectors up to the selected number of dimensions and which are stored in the first local characteristic quantity storing unit correspond to the n-number of second local characteristic quantities which are characteristic vectors up to the selected number of dimensions and which are generated by the second local characteristic quantity generating unit; and a displaying unit that displays information representing the recognition object recognized by the recognizing unit in superposition on an image in which the recognition object exists in the video.

13. The video processing system according to claim 12, wherein the video processing device for a mobile terminal comprises:

the second local characteristic quantity generating unit;

a second local characteristic quantity transmitting unit which encodes the n-number of second local characteristic quantities and which transmits the encoded n-number of second local characteristic quantities to the video processing device for a server via the network;

a recognition object receiving unit which receives information representing a recognition object recognized by the video processing device for a server from the video processing device for a server; and a displaying unit that displays information representing the received recognition object in superposition on an image in which the recognition object exists in the video, and the video processing device for a server comprises:

the first local characteristic quantity storing unit;

second local characteristic quantity receiving unit which receives the encoded n-number of second local characteristic quantities from the video processing device for a mobile terminal and decodes the encoded n-number of second local characteristic quantities;

the recognizing unit; and a recognition object transmitting unit which transmits information representing the recognition object recognized by the recognizing unit to the video processing device for a mobile terminal via the network.

14. The video processing system according to claim 12, further comprising:

a link information storing unit which stores, in association with the recognition object, link information for accessing related information that is related to the recognition object, wherein the displaying unit further displays the link information in superposition on an image in which the recognition object exists in the video.

15. The video processing system according to claim 12, further comprising:

a link information storing unit which stores, in association with the recognition object, link information for accessing related information that is related to the recognition object; and a downloading unit which accesses the related information in accordance with the link information, wherein the displaying unit further displays the related information in superposition on an image in which the recognition object exists in the video.

16. A video processing device for a mobile terminal in the video processing system according to claim 12, the video processing device for a mobile terminal comprising:

a second local characteristic quantity generating unit that extracts n-number of characteristic points from an image in a video and that generates n-number of second local characteristic quantities which are respectively 1-dimensional to j-dimensional characteristic vectors for n-number of local areas including each of the n-number of characteristic points;

a second local characteristic quantity transmitting unit that encodes the n-number of second local characteristic quantities and which transmits the encoded n-number of second local characteristic quantities to a video processing device for a server via a network;

a recognition object receiving unit that receives information representing a recognition object recognized by the video processing device for a server from the video processing device for a server; and a displaying unit that displays information representing the received recognition object in superposition on an image in which the recognition object exists in the video.

17. A control method of a video processing device for a mobile terminal in the video processing system according to claim 12, comprising:

a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;

a second local characteristic quantity transmitting step of encoding the n-number of second local characteristic quantities and transmitting the encoded n-number of second local characteristic quantities to a video processing device for a server via a network;

a recognition object receiving step of receiving information representing a recognition object recognized by the video processing device for a server from the video processing device for a server; and a displaying step of displaying information representing the received recognition object in superposition on an image in which the recognition object exists in the video.

18. A control program of a video processing device for a mobile terminal in the video processing system according to claim 12, the control program causing a computer to execute:

a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;

a second local characteristic quantity transmitting step of encoding the n-number of second local characteristic quantities and transmitting the encoded n-number of second local characteristic quantities to a video processing device for a server via a network;

a recognition object receiving step of receiving information representing a recognition object recognized by the video processing device for a server from the video processing device for a server; and a displaying step of displaying information representing the received recognition object in superposition on an image in which the recognition object exists in the video.

19. A video processing device for a server in the video processing system according to claim 12, the video processing device for a server comprising:

a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other;

a second local characteristic quantity receiving unit that receives the encoded n-number of second local characteristic quantities from a video processing device for a mobile terminal and decodes the encoded n-number of second local characteristic quantities;

a recognizing unit that selects a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a recognition object transmitting unit that transmits information representing the recognition object recognized by the recognizing unit to the video processing device for a mobile terminal via a network.

20. A control method of a video processing device for a server in the video processing system according to claim 12, the video processing device including a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other, the control method comprising:

a second local characteristic quantity receiving step of receiving the encoded n-number of second local characteristic quantities from a video processing device for a mobile terminal and decoding the encoded n-number of second local characteristic quantities;

a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a recognition object transmitting step of transmitting information representing the recognition object recognized in the recognizing step to the video processing device for a mobile terminal via a network.

21. A non-transitory computer-readable storage medium having a control program of a video processing device for a server in the video processing system according to claim 12, the video processing device including a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the recognition object and m-number of first local characteristic quantities being associated with each other, the control program causing a computer to execute:

a second local characteristic quantity receiving step of receiving the encoded n-number of second local characteristic quantities from a video processing device for a mobile terminal and decoding the encoded n-number of second local characteristic quantities;

a recognizing step of selecting a smaller number of dimensions among the number of dimensions i of the characteristic vectors of the first local characteristic quantities and the number of dimensions j of the characteristic vectors of the second local characteristic quantities, and recognizing that the recognition object exists in the image in the video when determining that a prescribed proportion or more of the m-number of first local characteristic quantities which are characteristic vectors up to the selected number of dimensions correspond to the n-number of second local characteristic quantities which are characteristic vectors up to the selected number of dimensions, and a recognition object transmitting step of transmitting information representing the recognition object recognized in the recognizing step to the video processing device for a mobile terminal via a network.

22. A video processing method in a video processing system which includes a video processing device a for a mobile terminal and a video processing device for a server which are connected to each other via a network and which includes a first local characteristic quantity storing unit that stores a recognition object and m-number of first local characteristic quantities which are respectively 1-dimensional to i-dimensional characteristic vectors and which are generated for each of m-number of local areas including each of m-number of characteristic points in an image of the recognition object, with the first local characteristic quantities being associated with the recognition object, the video processing method comprising:

a second local characteristic quantity generating step of extracting n-number of characteristic points from an image in a video and generating n-number of second local characteristic quantities which are respectively 1-dimensional to j-dimensional characteristic vectors for n-number of local areas including each of the n-number of characteristic points;

a recognizing step of selecting a smaller number of dimensions among the number of dimensions i of the characteristic vectors of the first local characteristic quantities and the number of dimensions j of the characteristic vectors of the second local characteristic quantities, and recognizes that the recognition object exists in the image in the video when determining that a prescribed proportion or more of the m-number of first local characteristic quantities which are characteristic vectors up to the selected number of dimensions and which are stored in the first local characteristic quantity storing unit correspond to the n-number of second local characteristic quantities which are characteristic vectors up to the selected number of dimensions and which are generated by the second local characteristic quantity generating unit; and a displaying step of displaying information representing the recognition object recognized by the recognizing unit in superposition on an image in which the recognition object exists in the video.

* * * * *